United States Patent
Mariott et al.

(10) Patent No.: US 10,155,831 B2
(45) Date of Patent: Dec. 18, 2018

(54) PROCESS CONTROL FOR LONG CHAIN BRANCHING CONTROL IN POLYETHYLENE PRODUCTION

(71) Applicant: Univation Technologies, LLC, Houston, TX (US)

(72) Inventors: Wesley R. Mariott, Freeport, TX (US); Kevin J. Cann, Tierra Verde, FL (US); John H. Moorhouse, Middlesex, NJ (US); Mark G. Goode, S. Charleston, WV (US); Thomas Oswald, Gold Beach, OR (US)

(73) Assignee: Univation Technologies, LLC, Houston, TX (US)

( * ) Notice: Subject to any disclaimer, the term of this patent is extended or adjusted under 35 U.S.C. 154(b) by 43 days.

(21) Appl. No.: 15/277,726

(22) Filed: Sep. 27, 2016

(65) Prior Publication Data

US 2017/0015768 A1    Jan. 19, 2017

Related U.S. Application Data

(63) Continuation-in-part of application No. 14/911,665, filed as application No. PCT/US2014/053652 on Sep. 2, 2014, now Pat. No. 9,856,339.

(51) Int. Cl.
*C08F 210/16* (2006.01)
*C08F 110/02* (2006.01)
(Continued)

(52) U.S. Cl.
CPC ............ *C08F 210/16* (2013.01); *C08F 4/645* (2013.01); *C08F 4/76* (2013.01); *C08F 110/02* (2013.01);
(Continued)

(58) Field of Classification Search
CPC .. C08F 4/642; C08F 2400/02; C08F 2500/09; C08F 110/02
See application file for complete search history.

(56) References Cited

U.S. PATENT DOCUMENTS 5,847,053 A     12/1998  Chum et al.
5,880,055 A *   3/1999   Knuuttila ............ B01J 37/0238
                                                      427/248.1
(Continued)

FOREIGN PATENT DOCUMENTS

CA      2267939 A1 *  11/1999
EP      0784062       7/1997
(Continued)

OTHER PUBLICATIONS

International Search Report and Written Opinion for related PCT Application PCT/US2014/053652, dated Nov. 12, 2014 (7 pgs).
(Continued)

*Primary Examiner* — Brieann R Johnston
(74) *Attorney, Agent, or Firm* — Brooks, Cameron & Huebsch, PLLC

(57) ABSTRACT

Polymerization process control methods for making polyethylene are provided. The process control methods include performing a polymerization reaction in a polymerization reactor to produce the polyethylene, where ethylene, and optionally one or more comonomers, in the polymerization reaction is catalyzed by an electron donor-free Ziegler-Natta catalyst and an alkyl aluminum co-catalyst. A melt flow ratio $(I_{21}/I_2)$ of the polyethylene removed from the polymerization reactor is measured and an amount of long chain branching (LCB) of the polyethylene from the polymerization reactor is controlled by adjusting a weight concentration
(Continued)

of the alkyl aluminum co-catalyst present in the polymerization reactor. In addition, an electron donor-free Ziegler-Natta catalyst productivity of the polyethylene being produced in the polymerization reactor is measured from which the amount of LCB of the polyethylene from the polymerization reactor is determined using the measured electron donor-free Ziegler-Natta catalyst productivity and a predetermined relationship between the electron donor-free Ziegler-Natta catalyst productivity and the LCB.

10 Claims, 14 Drawing Sheets

Related U.S. Application Data

(60) Provisional application No. 61/873,988, filed on Sep. 5, 2013.

(51) Int. Cl.
*C08F 4/76* (2006.01)
*C08F 4/645* (2006.01)

(52) U.S. Cl.
CPC ...... *C08F 2400/02* (2013.01); *C08F 2500/09* (2013.01)

(56) References Cited

U.S. PATENT DOCUMENTS

| | | | |
|---|---|---|---|
| 6,187,866 B1* | 2/2001 | Jorgensen | C08F 210/16 525/197 |
| 6,573,343 B1 | 6/2003 | Follestad | |
| 2002/0107342 A1* | 8/2002 | Mawson | B01J 4/002 526/129 |
| 2003/0088021 A1 | 5/2003 | Van Dun et al. | |
| 2005/0228150 A1 | 10/2005 | Parrish et al. | |
| 2006/0281647 A1* | 12/2006 | Hazelton | C10M 143/04 508/591 |
| 2011/0218307 A1* | 9/2011 | Goode | C08F 210/16 526/113 |
| 2015/0011719 A1 | 1/2015 | Mariott et al. | |

FOREIGN PATENT DOCUMENTS

| | | | |
|---|---|---|---|
| EP | 1285934 A1 * | 2/2003 | C08F 10/00 |
| WO | 00/35970 | 6/2000 | |
| WO | 2013/133956 | 9/2013 | |
| WO | 2015034804 | 3/2015 | |

OTHER PUBLICATIONS

International Preliminary Report on Patentability for related PCT Application PCT/US2014/053652, dated Mar. 8, 2016 (5 pgs).
International Search Report and Written Opinion for related PCT Application PCT/US2017/053462, dated Dec. 15, 2017 (10 pgs).

* cited by examiner

PROCESS CONTROL FOR LONG CHAIN BRANCHING CONTROL IN POLYETHYLENE PRODUCTION

This application is a Continuation-In-Part of application Ser. No. 14/911,665, filed Feb. 11, 2016 and published as U.S. Pub. No. 2016/0194421 on Jul. 7, 2016, which claims priority to International Application PCT/US2014/053652, filed Sep. 2, 2014 and published as WO 2015/034804 on Mar. 12, 2015, which claims the benefit of U.S. Provisional Application Ser. No. 61/873,988 filed Sep. 5, 2013, the entire contents of which are incorporated herein by reference in their entirety.

BACKGROUND

Ziegler-Natta catalysts are widely used to produce polyethylene and copolymers thereof. There are many varieties and methods for making Ziegler-Natta catalysts, such as depositing a titanium complex on a solid support such as magnesium chloride and/or silica. Ziegler-Natta catalysts are fairly inexpensive to produce and usually generate polymer products at high levels of productivity.

Typical Ziegler-Natta products have a molecular weight distribution (MWD) greater than about 2.0, more commonly greater than about 3.0, and a melt flow ratio (MFR) defined as $I_{21}/I_2$ ranging from about 24 to about 28. Polyethylene films produced from Ziegler-Natta catalyzed resins are known for excellent toughness and tear properties. Processing properties of polyethylene produced using Ziegler-Natta catalysts are also affected by long-chain branching. For example, long-chain branches, even at very low concentrations, have a strong effect on the polymer melt behavior and, thereby, the processing properties.

There is a need, therefore, for the ability to control the amount of long-chain branching that occurs during the production of polyethylene resins using Ziegler-Natta catalysts.

SUMMARY

Disclosed herein are polymerization process control methods for making polyethylene in which an amount of long-chain branching (LCB) in the polyethylene is controlled by adjusting an amount of an alkyl aluminum co-catalyst used with an electron donor-free Ziegler-Natta catalyst during the production of the polyethylene. As discussed herein, the process control methods of the present disclosure include performing a polymerization reaction in a polymerization reactor to produce the polyethylene, where ethylene, and optionally one or more comonomers, in the polymerization reaction is catalyzed by an electron donor-free Ziegler-Natta catalyst and an alkyl aluminum co-catalyst. The concentration of the alkyl aluminum co-catalyst is adjusted to both manipulate and control the electron donor-free Ziegler-Natta catalyst productivity and a melt flow ratio (MFR) ($I_{21}/I_2$) of the polyethylene. Surprisingly, it has been discovered that the amount of LCB in the polyethylene is also controlled by the concentration of the alkyl aluminum co-catalyst used in the polymerization process. As discussed herein, the alkyl aluminum co-catalyst can be triethylaluminum (TEAl).

The present disclosure also provides that the polymer MFR and/or the electron donor-free Ziegler-Natta catalyst productivity may be used for process control as an indication of the instant LCB (in the absence of LCB measurement during the polymerization reaction), where the weight concentration of the alkyl aluminum co-catalyst present in the polymerization reactor and/or the alkyl aluminum co-catalyst to Ziegler-Natta active metal molar ratio can be adjusted to control the amount of LCB in the polyethylene polymer. It has also been discovered as the concentration of the alkyl aluminum co-catalyst is reduced for a given polymerization process, both the electron donor-free Ziegler-Natta catalyst productivity and the MFR of the polyethylene increase.

The present disclosure also provides for a polymerization process control method that includes performing a polymerization reaction in a polymerization reactor to produce a polyethylene, where the polymerization reaction is catalyzed by the electron donor-free Ziegler-Natta catalyst and the alkyl aluminum co-catalyst with ethylene and optionally one or more comonomers to produce the polyethylene. A portion of the polyethylene is removed from the polymerization reactor and the MFR ($I_{21}/I_2$) of the polyethylene removed from the polymerization reactor is measured and the amount of LCB of the polyethylene from the polymerization reactor is determined using the measured MFR and a predetermined relationship between the melt flow ratio ($I_{21}/I_2$) and the LCB. A weight concentration of the alkyl aluminum co-catalyst present in the polymerization reactor can be adjusted to control the LCB of the polyethylene produced in the polymerization reactor. For example, controlling the amount of LCB includes decreasing the weight concentration of the alkyl aluminum co-catalyst present in the polymerization reactor to increase the LCB of the polyethylene produced in the polymerization reactor.

The present disclosure additionally provides for a polymerization process control method that includes performing a polymerization reaction in a polymerization reactor to produce polyethylene, where the polymerization reaction is catalyzed by the electron donor-free Ziegler-Natta catalyst and the alkyl aluminum co-catalyst with ethylene and optionally one or more comonomers to produce the polyethylene. A portion of the polyethylene is removed from the polymerization reactor. The catalyst productivity of the electron donor-free Ziegler-Natta catalyst making the polyethylene in the polymerization reactor is measured and an amount of LCB of the polyethylene removed from the polymerization reactor is determined using the measured electron donor-free Ziegler-Natta catalyst productivity and a predetermined relationship between the electron donor-free Ziegler-Natta catalyst productivity and the LCB.

DETAILED DESCRIPTION

Figure 1:
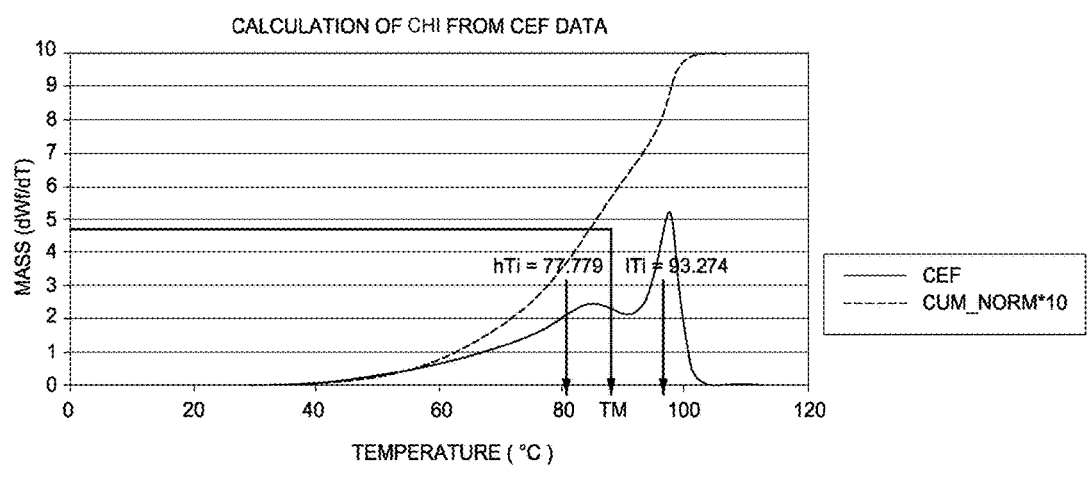
FIG. 1 depicts a graphical representation of the Crystallization Elution Fractionation (CEF) data used to calculate the comonomer heterogeneity index (CHI) for Example 19.

Disclosed herein are polymerization process control methods for making polyethylene in which an amount of long-chain branching (LCB) in the polyethylene is controlled by adjusting an amount of an alkyl aluminum co-catalyst used with an electron donor-free Ziegler-Natta catalyst during the production of the polyethylene. As discussed herein, the process control methods of the present disclosure include performing a polymerization reaction in a polymerization reactor to produce the polyethylene, where ethylene, and optionally one or more comonomers, in the polymerization reaction is catalyzed by an electron donor-free Ziegler-Natta catalyst and an alkyl aluminum co-catalyst. The concentration of the alkyl aluminum co-catalyst is adjusted to both manipulate and control the electron donor-free Ziegler-Natta catalyst productivity and a melt flow ratio (MFR) ($I_{21}/I_2$) of the polyethylene. Surprisingly, it has been discovered that the amount of LCB in the polyethylene is controlled by the concentration of alkyl aluminum co-catalyst used in the polymerization process.

The present disclosure also provides that the polymer MFR and/or the electron donor-free Ziegler-Natta catalyst productivity may be used for process control as an indication of the instant LCB (in the absence of LCB measurement during the polymerization reaction), where the weight concentration of the alkyl aluminum co-catalyst present in the polymerization reactor and/or the alkyl aluminum co-catalyst to Ziegler-Natta active metal molar ratio can be adjusted to control the amount of LCB in the polyethylene polymer. It has also been discovered as the concentration of the alkyl aluminum co-catalyst is reduced for a given polymerization process, both the electron donor-free Ziegler-Natta catalyst productivity and the MFR of the polyethylene increase.

The present disclosure also provides for a polymerization process control method that includes performing the polymerization reaction in the polymerization reactor to produce polyethylene, where the polymerization reaction is catalyzed by the electron donor-free Ziegler-Natta catalyst and the alkyl aluminum co-catalyst with ethylene, and optionally one or more comonomers, to produce the polyethylene. A portion of the polyethylene is removed from the polymerization reactor. The MFR ($I_{21}/I_2$) of the polyethylene removed from the polymerization reactor is measured and the amount of LCB of the polyethylene from the polymerization reactor is determined using the measured MFR and a predetermined relationship between the MFR ($I_{21}/I_2$) and the LCB. A weight concentration of the alkyl aluminum co-catalyst present in the polymerization reactor is adjusted to control the LCB of the polyethylene produced in the polymerization reactor. For example, controlling the amount of LCB includes decreasing the weight concentration of the alkyl aluminum co-catalyst present in the polymerization reactor to increase the LCB of the polyethylene produced in the polymerization reactor.

The present disclosure also provides methods for making the electron donor-free Ziegler-Natta catalyst. The method may comprise combining one or more supports with one or more magnesium-containing compounds under reaction conditions to form a first reacted product. The first reacted product may then be combined with one or more chlorinating compounds selected from one or more aluminum alkyl chlorides, one or more chloro substituted silanes, and combinations thereof to form a second reacted product. The second reacted product may then be combined with one or more titanium-containing compounds selected from one or more titanium alkoxides, one or more titanium halides, and combinations thereof under reaction conditions to form the electron donor-free Ziegler-Natta catalyst.

In some embodiments, the method of forming the electron donor-free Ziegler-Natta catalyst may comprise combining one or more supports with one or more magnesium-containing compounds under reaction conditions to form a first reacted product; combining one or more aluminum alkyl chlorides with the first reacted product under reaction conditions to form a second reacted product; and combining one or more titanium alkoxides with the second reacted product under reaction conditions to form the electron donor-free Ziegler-Natta catalyst.

In some embodiments, the method of forming the electron donor-free Ziegler-Natta catalyst may comprise combining one or more supports with one or more magnesium-containing compounds under reaction conditions to form a first reacted product; combining one or more chloro substituted silanes with the first reacted product under reaction conditions to form a second reacted product; and combining one or more titanium halides with the second reacted product under reaction conditions to form the electron donor-free Ziegler-Natta catalyst.

In the above described methods of forming the electron donor-free Ziegler-Natta catalyst, the one or more supports and the one or more magnesium-containing compounds may be combined with one another in the presence of one or more diluents. For example, the magnesium-containing compound and the support may be combined with one another in the presence of one or more alkanes, one or more aromatic hydrocarbons, one or more cycloalkanes, or any combination thereof.

In the above described methods of forming the electron donor-free Ziegler-Natta catalyst, the first reacted product and the one or more chlorinating compounds may be combined with one another in the presence of one or more diluents.

Additionally, the second reacted product and the one or more titanium-containing compounds may be combined with one another in the presence of one or more diluents. For example the second reacted product and the one or more titanium-containing compounds may be combined with one another in the presence of one or more diluents to provide the electron donor-free Ziegler-Natta catalyst mixed with the one or more diluents. In such an embodiment, the method for making the electron donor-free Ziegler-Natta catalyst may then further comprise removing the one or more diluents from the electron donor-free Ziegler-Natta catalyst to provide the electron donor-free Ziegler-Natta catalyst in a powder form.

The electron donor-free Ziegler-Natta catalyst formed by the methods described herein may be essentially free of donor compounds. For example, the electron donor-free Ziegler-Natta catalyst may be essentially free of donor compounds selected from the group consisting of alcohols, thiols, amines, phosphines, ethers, ketones, and esters.

In some embodiments, the one or more supports and the one or more magnesium-containing compounds may be combined with one another at a temperature of about 20° C. to about 120° C. and mixed for a time ranging from about 30 minutes to about 24 hours to form the first reacted product. The one or more chlorinating compounds and the first reacted product may then be combined with one another at a temperature of about 20° C. to about 120° C. and mixed for a time ranging from about 30 minutes to about 24 hours to form the second reacted product. The one or more titanium-containing compounds and the second reacted product may then be combined with one another at a temperature of about 20° C. to about 120° C. and mixed for a time ranging from about 30 minutes to about 24 hours to form the electron donor-free Ziegler-Natta catalyst.

The above described electron donor-free Ziegler-Natta catalysts may be combined with ethylene in a polymerization reactor at conditions sufficient to produce polyethylene having improved properties. The polyethylene may be a homopolymer, or may be a copolymer derived from ethylene and one or more $C_3$ to $C_{20}$ alpha-olefin comonomers, or may be a copolymer derived from ethylene and one or more $C_3$ to $C_6$ alpha-olefin comonomer The polyethylene may have a molecular weight distribution (MWD) of about 4.5 to about 14, as measured with light scattering detector; a slope of strain hardening greater than about 0.75, as measured by extensional viscosity fixture (EVF); and a melt flow ratio ($I_{21}/I_2$) greater than or equal to 8.33+(4.17×MWD). The polyethylene may also have a long chain branching (LCB) greater than about 0.01 per 1,000 carbon atoms and less than about 0.07 per 1,000 carbon atoms. In preferred embodiments, the long chain branches are composed of more than 6 carbon atoms. The polyethylene may also have a comonomer homogeneity index (CHI) of less than about 0.5.

As discussed herein, the amount of LCB in the polyethylene may be controlled during the polymerization process by adjusting an amount of the alkyl aluminum co-catalyst used with the electron donor-free Ziegler-Natta catalyst during the production of the polyethylene. Adjusting the amount of the alkyl aluminum co-catalyst includes increasing the amount used and/or decreasing the amount of the alkyl aluminum co-catalyst used with the electron donor-free Ziegler-Natta catalyst during the production of the polyethylene to make the desired change in LCB of the polyethylene. The concentration of the alkyl aluminum co-catalyst is adjusted to both manipulate and control the electron donor-free Ziegler-Natta catalyst productivity and a melt flow ratio (MFR) ($I_{21}/I_2$) of the polyethylene. Surprisingly, as the concentration of the alkyl aluminum co-catalyst is reduced for a given polymerization process, both the electron donor-free Ziegler-Natta catalyst productivity and the MFR of the polyethylene increase. In addition, the amount of LCB in the polyethylene is controlled by the concentration of alkyl aluminum co-catalyst used in the polymerization process. The polyethylene may have a density greater than or equal to 0.945 g/cm³ and a melt strength greater than or equal to a×(3.7463×exp(-1.485×log(MI))), wherein a is equal to 1.5, or 1.75, or 1.9 and where the logarithm is base 10.

The polyethylene may have a density less than or equal to 0.945 g/cm³ and a melt strength greater than or equal to a×(3.7463×exp(-1.485×log(MI))), wherein a is equal to 1.2, or 1.5, or 1.9 and where the logarithm is base 10.

Support

As used herein, the terms "support" and "carrier" are used interchangeably and refer to any support material or combination of support materials. The support can be or include one or more porous materials, such as talc, inorganic oxides, and inorganic chlorides. Other supports can be or include resinous materials such as polystyrene, functionalized or crosslinked organic polymers such as polystyrene divinyl benzene polyolefins or other polymeric compounds, or any other organic or inorganic support material, or mixtures thereof. The support can be an amorphous material, crystalline material, or a mixture of amorphous and crystalline material. Illustrative inorganic oxides can include one or more metal oxides of Group 2, 3, 4, 5, 12, 13, or 14 elements. For example, the inorganic oxide can include, but is not limited to, alumina, silica, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. In at least one example, the support can be or include alumina, silica, or a combination thereof. As used herein, all reference to the Periodic Table of the Elements and groups thereof is to the New Notation published in "Hawley's Condensed Chemical Dictionary," Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The support can include one or more hydroxyl groups, e.g., a support containing silica can include silanol (Si—OH) groups, in and/or on the support. The hydroxyl groups can be present in an amount ranging from a low of about 0.1 millimoles (mmol), about 0.2 mmol, about 0.3 mmol, about 0.4 mmol, or about 0.5 mmol to a high of about 1 mmol, about 2 mmol, about 3 mmol, about 4 mmol, or about 5 mmol per gram of the support. For example, the hydroxyl groups can be present in an amount of about 0.3 mmol to about 5 mmol, about 0.5 mmol to about 2 mmol, about 0.5 mmol to about 0.9 mmol, or about 0.6 mmol to about 1 mmol per gram of the support. If the number of hydroxyl groups present on the support is greater than a desired amount, the excess hydroxyl groups can be removed by heating the carrier for a sufficient time at a sufficient temperature. For example, a relatively small number of hydroxyl groups can be removed by heating the support to a temperature of about 150° C. to about 250° C., whereas a relatively large number of hydroxyl groups may be removed by heating at a temperature of about 500° C. to about 800° C., or about 550° C. to 650° C. The support can be heated for a time ranging from about 1 hour to about 20 hours, or about 4 hours to about 16 hours, for example. The surface hydroxyl concentration in silica can be determined according to J. B. Peri, and A. L. Hensley, Jr., *J. Phys. Chem.*, vol. 72, No. 8, p. 2926 (1968). An alternative to heating the support to remove at least a portion of any hydroxyl groups can include chemical means. For example, a desired fraction of hydroxyl groups can be reacted with a chemical agent such as a hydroxyl-reactive organoaluminum compound, e.g., triethylaluminum.

Supports that include two or more inorganic oxides can have any ratio or amount of each inorganic oxide, relative to one another. For example, an alumina-silica catalyst support can include from about 1 wt % alumina to about 99 wt % alumina, based on the total amount of alumina and silica. In another example, an alumina-silica catalyst support can have an alumina concentration ranging from a low of about 2 wt %, about 5 wt %, about 15 wt %, or about 25 wt % to a high of about 50 wt %, about 60 wt %, about 70 wt %, or about 90 wt %, based on the total amount of alumina and silica. A mixed inorganic oxide support can be prepared using any suitable method. For example, a silica support can be mixed, blended, contacted, or otherwise combined with one or more aluminum compounds to produce a silica support and aluminum compound(s) mixture. In another example, the silica support can be mixed with the one or more aluminum compounds in a water and/or alcohol solution and dried to produce the silica support and aluminum compound(s) mixture. Suitable alcohols can include, but are not limited to, alcohols having from 1 to 5 carbon atoms, and mixtures or combinations thereof. For example, the alcohol can be or include methanol, ethanol, propan-1-ol, propan-2-ol, and the like. Suitable aluminum compounds can include, but are not limited to, aluminum monoacetate ($(HO)_2AlC_2H_3O_2$), aluminum diacetate ($HOAl(C_2H_3O_2)_2$), and aluminum triacetate ($Al(C_2H_3O_2)_3$), aluminum hydroxide ($Al(OH)_3$), aluminum diacetate hydroxide ($Al(OAc)_2OH$), aluminum triacetylacetonate, aluminum fluoride ($AlF_3$), sodium hexafluoroaluminate ($Na_3AlF_6$), or any combination thereof.

The silica support and aluminum compound(s) mixture can be heated (calcined) in the presence of one or more inert gases, oxidants, reducing gases, or in any order/combination thereof to produce an alumina-silica catalyst support. As used herein, the term "oxidant" can include, but is not limited to, air, oxygen, ultra-zero air, oxygen/inert gas mixtures, or any combination thereof. Inert gases can include, but are not limited to, nitrogen, helium, argon, or combinations thereof. Reducing gases can include, but are not limited to, hydrogen, carbon monoxide, or combinations thereof.

The silica support and aluminum compound(s) mixture can be heated to a first temperature under nitrogen gas or other inert gas. After heating to the first temperature the nitrogen gas can be stopped, one or more oxidants can be introduced, and the temperature can be increased to a second temperature. For example, the silica support and aluminum compound(s) mixture can be heated under an inert atmosphere to a temperature of about 200° C., the oxidant can be introduced, and the mixture can then be heated to a temperature of from about 450° C. to about 1,500° C. to produce an alumina-silica catalyst support. The second temperature can range from a low of about 250° C., about 300° C., about 400° C., or about 500° C. to a high of about 600° C., about 650° C., about 700° C., about 800° C., or about 900° C. For example, the second temperature can range from about 400° C. to about 850° C., about 800° C. to about 900° C., about 600° C. to about 850° C., or about 810° C. to about 890° C. The silica support and aluminum compound(s) mixture can be heated and held at the second temperature for a period of time ranging from about 1 minute to about 100 hours. For example, the silica support and alumina compound(s) mixture can be heated and held at the second temperature for a time ranging from a low of about 30 minutes, about 1 hour, or about 3 hours to a high of about 10 hours, about 20 hours, or about 50 hours. In one or more embodiments, the silica support and alumina compound(s) mixture can be heated from ambient temperature to the second or upper temperature without heating to an intermediate or first temperature. The silica support and alumina compound(s) mixture can be heated under a nitrogen or other inert atmosphere initially, which can be modified to include the one or more oxidants or the atmosphere can be or include the one or more oxidants at the initial heating from ambient temperature.

The support can be mixed, blended, contacted, or otherwise combined with one or more sources of halide ions, sulfate ions, or a combination of anions to produce an inorganic oxide catalyst support and anion mixture, which can be heated or calcined to produce a suitable support. The support can be contacted with bromine, fluorine, chlorine, compounds containing bromine, fluorine, and/or chlorine, or any combination thereof. Suitable supports can include, but are not limited to, brominated silica, brominated silica-titanic, fluorinated silica, fluorinated silica-alumina, fluorinated silica-zirconia, fluorinated-chlorinated silica, fluorinated silica-titania, chlorinated silica, sulfated silica, or any combination thereof. The support can also be treated with one or more metal ions in addition to or in lieu of the one or more halide ion sources and/or sulfate ion sources. Illustrative metal ions can include, but are not limited to, copper, gallium, molybdenum, silver, tin, tungsten, vanadium, zinc, or any combination thereof. Suitable activated supports can include those discussed and described in PCT Publication No. WO 2011/103402.

The support can have an average particle size ranging from a low of about 0.1 μm, about 0.3 μm, about 0.5 μm, about 1 μm, about 5 μm, about 10 μm, or about 20 μm to a high of about 50 μm, about 100 μm, about 200 μm, or about 500 μm. The support can have an average pore size ranging from about 10 Å to about 1,000 Å, preferably from about 50 Å to about 500 Å, and more preferably from about 75 Å to about 350 Å. The support can have a pore volume ranging from a low of about 0.01 cm$^3$/g, about 0.1 cm$^3$/g, about 0.8 cm$^3$/g, or about 1 cm$^3$/g to a high of about 2 cm$^3$/g, about 2.5 cm$^3$/g, about 3 cm$^3$/g, or about 4 cm$^3$/g. Internal porosity of the support can be determined by a technique termed BET-technique, described by S. Brunauer, P. Emmett and E. Teller in Journal of the American Chemical Society, 60, pp. 209-319 (1938). The support can have a surface area ranging from a low of about 1 m$^2$/g, about 50 m$^2$/g, or about 100 m$^2$/g to a high of about 400 m$^2$/g, about 500 m$^2$/g, or about 800 m$^2$/g. The surface area of the support can be measured in accordance with the above-mentioned BET-technique, with use of the standardized method as described in British Standards BS 4359, Volume 1, (1969).

Suitable commercially available silica supports can include, but are not limited to, ES757, ES70, and ES70W available from PQ Corporation. Additional suitable commercially available silica supports can include, but are not limited to, Sylopol® 948, Sylopol® 952, and Sylopol® 955, available from W.R. Grace & Co. Suitable commercially available silica-alumina supports can include, but are not limited to, SIRAL® 1, SIRAL® 5, SIRAL® 10, SIRAL®

20, SIRAL® 28M, SIRAL® 30, and SIRAL® 40, available from SASOL®. Suitable supports can be as described in U.S. Pat. Nos. 4,173,547; 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032; and 5,770,664; and WO 95/32995; WO 95/14044; WO 96/06187; and WO 97/02297.

Magnesium-Containing Compound

The one or more magnesium-containing compounds can be represented by the formula $R^1$—Mg—$R^2$, where $R^1$ and $R^2$ are independently selected from the group consisting of hydrocarbyl groups, and halogen atoms. Suitable hydrocarbyl groups can include, but are not limited to, alkyl groups, aryl groups, and alkoxy groups. The alkyl groups, and/or alkoxy groups can include from 1 to 12 carbon atoms, or from 1 to 10 carbon atoms, or from 1 to 8 carbon atoms, or from 1 to 6 carbon atoms, or from 1 to 4 carbon atoms. The aryl groups can include from 6 to 12 carbon atoms, or from 6 to 10 carbon atoms, or from 6 to 8 carbon atoms. Suitable halogens can include fluoride, chloride, and bromide.

Illustrative magnesium-containing compounds can include, but are not limited to, dialkylmagnesiums, dicycloalkylmagnesiums, diarylmagnesiums, alkylmagnesium halides, or any combination thereof. Illustrative dialkylmagnesiums can include, but are not limited to, diethylmagnesium, dipropylmagnesium, di-isopropylmagnesium, di-n-butylmagnesium, di-isobutylmagnesium, diamylmagnesium, di-n-octylmagnesium, di-n-hexylmagnesium, di-n-decylmagnesium, di-n-dodecylmagnesium, or any combination thereof. Illustrative dicycloalkylmagnesiums can include, but are not limited to, dicyclohexylmagnesium, dicyclopentylmagnesium, or any combination thereof. Illustrative diarylmagnesiums can include, but are not limited to, dibenzylmagnesium, ditolylmagnesium, dixylylmagnesium, or any combination thereof. Illustrative magnesium alkyls that include two different alkyl groups can include, but are not limited to, ethyl-n-propylmagnesium, ethyl-n-butylmagnesium, amyl-n-hexylmagnesium, n-butyl-s-butylmagnesium, n-butyl-n-octylmagnesium, or any combination thereof. Illustrative alkymagnesium halides can include, but are not limited to, methylmagnesium chloride, ethylmagnesium chloride, n-butylmagnesium chloride, t-butylmagnesium chloride, isopropylmagnesium chloride, methylmagnesium bromide, ethylmagnesium bromide, n-butylmagnesium bromide, or any combination thereof.

It should be noted that magnesium alkyls may contain a mixture of molecules. For example, ethylmagnesium chloride may contain a mixture of molecules other than ethylmagnesium chloride, per se. For example, if a liquid or solvent is combined with ethylmagnesium chloride, the ethylmagnesium chloride may disproportionate to form a mixture of magnesium dichloride and diethylmagnesium. Such mixtures are encompassed within the general formula $R^1MgR^2$. Accordingly, it should be understood that compositions of the formula $R^1$—Mg—$R^2$ and compositions representative thereof are intended to represent the overall empirical formula of these compositions rather than to set forth the molecular formula of these compositions.

First Reacted Product

The support and the magnesium-containing compound can be combined with one another to provide or form a first mixture or first reacted product. The support and the magnesium-containing compound can at least partially react with one another during mixing thereof. Said another way, the support and the magnesium-containing compound can be combined with one another under reaction conditions such that the support and the magnesium containing compound at least partially react with one another to form a reacted first mixture or reacted first product. For example, if the support contains one or more hydroxyl groups, the magnesium-containing compound can react with at least some of the hydroxyl groups to produce a reacted first mixture or first reacted product.

The mixture of the support and the magnesium-containing compound can be heated to a temperature ranging from a low of about 20° C., about 25° C., or about 30° C. to a high of about 60° C., about 75° C., or about 120° C., for example, with suitable ranges comprising the combination of any lower temperature and any upper temperature. If the diluent is present, the temperature of the mixture can be maintained below a boiling point of the diluent. The support and the magnesium-containing compound can be mixed, blended, stirred, or otherwise agitated for a time ranging from a low of about 15 minutes, about 30 minutes, about 1 hour, about 2 hours, or about 3 hours to a high of about 5 hours, about 10 hours, about 15 hours, about 20 hours, about 25 hours, or more. The support and the magnesium-containing compound can be combined with one another and mixed under a vacuum, e.g., 50 kPa. The support and the magnesium-containing compound can be combined with one another and mixed at atmospheric pressure. The support and the magnesium-containing compound can be combined with one another and mixed under pressure, e.g., a pressure ranging from about 102 kPa to about 500 kPa. The support and the magnesium-containing compound can be combined with one another under an inert atmosphere. Inert atmospheres can be or include, but are not limited to, nitrogen, argon, helium, or any combination thereof. The amount of the magnesium-containing compound combined with the support can range from a low of about 0.2 mmol, about 0.5 mmol, about 1 mmol, about 1.5 mmol, or about 2 mmol to a high of about 3 mmol, about 4 mmol, about 6 mmol, about 8 mmol, or about 12 mmol per gram of the support, with suitable ranges comprising the combination of any lower amount and any upper amount. For example, the amount of the magnesium-containing compound combined with the support can range from about 0.3 mmol to about 10 mmol, about 1 mmol to about 7 mmol, about 1.5 mmol to about 5 mmol, about 1.5 mmol to about 4 mmol, or about 2 mmol to about 3 mmol of the magnesium-containing compound per gram of the support.

If the support is added to the magnesium-containing compound or the magnesium-containing compound is added to the support, the support or the magnesium-containing compound can be added all at once or over a period of time. The magnesium-containing compound can be added over a period of time ranging from a low of about 1 minute, about 5 minutes, about 10 minutes or about 15 minutes to a high of about 45 minutes, about 1 hour, about 2 hours, about 4 hours, about 6 hours or more. For example, the magnesium-containing compound can be added to the support over a time period of about 15 minutes to about 45 minutes, about 20 minutes to about 1 hour, or about 30 minutes to about 1.5 hours. The support and the magnesium-containing compound can be continuously or intermittently stirred during the time the magnesium-containing compound is added to the support.

The support and the magnesium-containing compound can be combined with one another in the presence of one or more diluents to form a solution or slurry thereof. The diluent, if present, can be any liquid medium or combination of liquid mediums suitable for forming a slurry of the support, the magnesium-containing compound, or the mixture of the support and magnesium-containing compound. Illustrative diluents can include, but are not limited to, one or more alkanes, one or more aromatic hydrocarbons, one or more cycloalkanes, or any combination thereof. Illustrative alkanes can include, but are not limited to, pentane, hexane, heptane, octane, nonane, decane, structural isomers thereof, stereoisomers thereof, enantomers thereof, or any combination thereof. Illustrative aromatic hydrocarbons can include, but are not limited to, benzene, toluene, xylenes, o-xylene, m-xylene, p-xylene, or any combination thereof. Illustrative cycloalkanes can include, but are not limited to, cyclohexane, methylcyclohexane, or a combination thereof.

The amount of the diluent, if present, can be sufficient to produce a slurry of the support and the magnesium-containing compound. The amount of diluent can range from a low of about 0.5 g, about 1 g, about 2 g, or about 2.5 g to a high of about 5 g, about 7 g, about 10 g, or about 25 g per gram of the support, with suitable ranges comprising the combination of any lower amount and any upper amount. For example, the amount of diluent, if present, can range from about 1.5 g to about 25 g, about 2 g to about 20 g, about 1 g to about 15 g, about 2.5 g to about 6 g, about 0.5 g to about 8 g, or about 2.5 g to about 5.5 g per gram of the support.

The support and the magnesium-containing compound can be combined with one another in any suitable container or vessel. The container can be a container capable of being closed or sealed. The container can include one or more devices, systems, or combination thereof capable of mixing, blending, or otherwise agitating the mixture of the support and the magnesium-containing compound. For example, the container can include one or more mixing devices such as one or more mechanical/power mixers and/or acoustic mixers such as sonic mixers. The container can include one or more heating jackets, heating coils, internal heating elements, cooling jackets, cooling coils, internal cooling elements, or the like, capable of controlling or adjusting a temperature therein.

Second Reacted Product

After the support and magnesium-containing compound have been mixed and/or at least partially reacted with one another for a desired amount of time, one or more chlorinating compounds can be combined with the first mixture or the first reacted product to produce or form a second mixture or second reacted product. Illustrative chlorinating compounds can be or include, but are not limited to, aluminum alkyl chlorides, halo substituted silanes containing one or more chlorine atoms, fluorine atoms, bromine atoms, or any combination thereof, organic chlorides, or any combination thereof. Illustrative aluminum alkyl chlorides can include, but are not limited to, diethylaluminum chloride, diisobutylaluminum chloride, ethylaluminum dichloride, ethylaluminum sesquichloride, isobutylaluminum dichloride, diethylaluminum bromide, or any combination thereof. Illustrative halo substituted silanes can include, but are not limited to, dimethyldichlorosilane, chlorotrimethylsilane, methyltrichlorosilane, diethyldichlorosilane, t-butyldimethylsilyl chloride, n-butyltrichlorosilane, triethoxysilylchloride, trimethoxysilylchloride, tetrachlorosilane, tetrabromosilane, dimethyldibromosilane, trimethylbromosilane, or any combination thereof. Illustrative organic chlorides can include, but are not limited to, t-butyl chloride, tetrachloromethane, chloroform, methyl chloride, tribromomethane, tetrabromomethane, or any combination thereof. In one or more embodiments, the one or more chlorinating compounds can be limited to either one or more aluminum alkyl chlorides or one or more halo substituted silanes. In one or more embodiments, the one or more chlorinating compounds can include at least one aluminum alkyl chloride and at least one halo substituted silane.

The chlorinating compound and the first reacted product can at least partially react with one another to produce a second reacted product. Said another way, the mixture of the first reacted product and the chlorinating compound can be combined with one another under reaction conditions such that the first reacted product and the chlorinating compound at least partially react with one another to form a reacted second mixture or reacted second product. For example, the chlorinating compound can react with the magnesium containing compound in the first reacted product to produce the reacted second mixture or second reacted product.

The chlorinating compound can be added to the first reacted product or conversely the first reacted product can be added to the chlorinating compound. The chlorinating compound can be combined directly with the first reacted product or the chlorinating compound can be in the form of a solution or slurry. For example, the chlorinating compound can be combined with one or more diluents to form a solution or slurry thereof. The solution or slurry of the chlorinating compound can be combined with the first reacted product to produce the second mixture or second reacted product. Suitable diluents can include, but are not limited to, the one or more alkanes, the one or more aromatic hydrocarbons, the one or more cycloalkanes, or any combination thereof, discussed and described above.

The chlorinating compound and the first reacted product can be combined with one another in any suitable container or vessel. For example, the chlorinating compound can be combined with the first reacted product within the same vessel the first reacted product was produced in. The chlorinating compound and the first reacted product can be simultaneously combined with one another in the container or vessel. If the chlorinating compound is added to the first reacted product or the first reacted product is added to the chlorinating compound, the chlorinating compound or the first reacted product can be added all at once or over a period of time. For example, the chlorinating compound can be added to the first reacted product all at one time. In another example, the chlorinating compound can be added to the first reacted product over a period of time ranging from a low of about 1 minute, about 5 minutes, about 10 minutes, or about 15 minutes to a high of about 45 minutes, about 1 hour, about 2 hours, about 4 hours, about 6 hours, or more. In another example, the chlorinating compound can be added to the first reacted product over a period of time of about 15 minutes to about 45 minutes, about 20 minutes to about 1 hour, or about 30 minutes to about 1.5 hours. The chlorinating compound and the first reacted product can be continuously or intermittently stirred during the time the chlorinating compound is added to the first reacted product.

The amount of the chlorinating compound combined with the first reacted product can range from a low of about 0.2 mmol, about 0.5 mmol, about 1 mmol, about 1.5 mmol, or about 2 mmol to a high of about 5 mmol, about 7 mmol, about 10 mmol, about 15 mmol, or about 20 mmol per gram of the support, with suitable ranges comprising the combination of any lower amount and any upper amount. For example, the second reacted product can contain about 0.25 mmol to about 20 mmol, about 1 mmol to about 10 mmol, about 1.5 mmol to about 7 mmol, or about 2 mmol to about 5 mmol of the chlorinating compound per gram of the support.

The mixture of the first reacted product and the chlorinating compound can be heated to a temperature ranging from a low of about 20° C., about 25° C., or about 30° C. to a high of about 60° C., about 75° C., or about 120° C., for example, with suitable ranges comprising the combination of any lower temperature and any upper temperature. If the diluent is present, the temperature of the second mixture can be maintained below a boiling point of the diluent. The chlorinating compound and the first reacted product can be mixed, blended, stirred, or otherwise agitated for a time ranging from a low of about 15 minutes, about 30 minutes, about 1 hour, about 2 hours, or about 3 hours to a high of about 5 hours, about 10 hours, about 15 hours, about 20 hours, about 25 hours, or more. The chlorinating compound and the first reacted product can be combined with one another and mixed under a vacuum, e.g., 50 kPa. The chlorinating compound and the first reacted product can be combined with one another and mixed at atmospheric pressure. The chlorinating compound and the first reacted product can be combined with one another and mixed under pressure, e.g., a pressure ranging from about 102 kPa to about 500 kPa. The support and the first reacted product and the chlorinating compound can be combined with one another under an inert atmosphere.

Third Reacted Product

After the chlorinating compound and the first reacted product have been mixed and/or reacted with one another for a desired amount of time, one or more titanium-containing compounds can be combined with the second mixture or second reacted product to produce or form the electron donor-free Ziegler-Natta catalyst. The titanium-containing compound and the second reacted product can at least partially react with one another during mixing thereof. Said another way, the second reacted product can be combined with the one or more titanium-containing compounds under reaction conditions to produce or form the electron donor-free Ziegler-Natta catalyst. For example, the titanium-containing compound can react with the second reacted product to produce a reacted third mixture or catalyst. The electron donor-free Ziegler-Natta catalyst can include the reaction product between the titanium-containing compound and the second reacted product.

Illustrative titanium-containing compounds can include, but are not limited to, one or more titanium halides, one or more titanium alkoxides, one or more titanium amides, or any combination thereof. Illustrative titanium halides can include, but are not limited to, titanium (IV) chloride, titanium (IV) bromide, titanium (IV) fluoride, titanium (IV) iodide, or any combination thereof. Illustrative titanium alkoxides can include, but are not limited to, tetraisopropyltitanate, titanium (IV) ethoxide, titanium (IV) n-butoxide, titanium (IV) t-butoxide, or any combination thereof. Illustrative titanium amides can include, but are not limited to, tetrakis(dimethylamine)titanium(IV).

The one or more titanium-containing compounds can be added to the second reacted product or conversely the second reacted product can be added to the titanium-containing compounds. The titanium-containing compound can be combined directly with the second reacted product or the titanium-containing compound can be in the form of a solution or slurry. For example, the titanium-containing compound can be combined with one or more diluents to form a solution or slurry thereof. The solution or slurry of the titanium-containing compound can be combined with the second reacted product to produce the electron donor-free Ziegler-Natta catalyst. Suitable diluents can include, but are not limited to, the one or more alkanes, the one or more aromatic hydrocarbons, the one or more cycloalkanes, or any combination thereof, discussed and described above.

The titanium-containing compound and the second reacted product can be combined with one another in any suitable container or vessel. For example, the titanium-containing compound can be combined with the second reacted product within the same vessel the second reacted product was produced in. The titanium-containing compound and the second reacted product can be simultaneously combined with one another in the container or vessel. If the titanium-containing compound is added to the second reacted product or the second reacted product is added to the titanium-containing compound, the titanium-containing compound or the second reacted product can be added all at once or over a period of time. For example, the titanium-containing compound can be added to the second reacted product all at one time. In another example, the titanium-containing compound can be added to the second reacted product over a period of time ranging from a low of about 1 minute, about 5 minutes, about 10 minutes or about 15 minutes to a high of about 45 minutes, about 1 hour, about 2 hours, about 4 hours, about 6 hours or more. In another example, the titanium-containing compound can be added to the second reacted product over a time period of about 15 minutes to about 45 minutes, about 20 minutes to about 1 hour, or about 30 minutes to about 1.5 hours. The titanium-containing compound and the second reacted product can be continuously or intermittently stirred during the time the titanium-containing compound is added to the second reacted product.

The amount of the titanium-containing compound in the electron donor-free Ziegler-Natta catalyst can range from a low of about 0.05 mmol, about 0.1 mmol, about 0.5 mmol, about 1 mmol, or about 2 mmol to a high of about 3 mmol, about 4 mmol, about 6 mmol, about 8 mmol, or about 12 mmol per gram of the support, with suitable ranges comprising the combination of any lower amount and any upper amount. For example, the electron donor-free Ziegler-Natta catalyst can contain about 0.1 mmol to about 8 mmol, about 0.5 mmol to about 6 mmol, about 1 mmol to about 4 mmol, or about 2 mmol to about 3 mmol of the titanium-containing compound per gram of the support.

The mixture of the titanium-containing compound and second reacted product can be heated to a temperature ranging from a low of about 20° C., about 25° C., or about 30° C. to a high of about 60° C., about 75° C., or about 120° C., for example, with suitable ranges comprising the combination of any lower temperature and any upper temperature. If the diluent is present, the temperature of the second mixture can be maintained below a boiling point of the diluent. The titanium-containing compound and the second reacted product can be mixed, blended, stirred, or otherwise agitated for a time ranging from a low of about 15 minutes, about 30 minutes, about 1 hour, about 2 hours, or about 3 hours to a high of about 5 hours, about 10 hours, about 15 hours, about 20 hours, about 25 hours, or more. The titanium-containing compound and the second reacted product can be combined with one another and mixed under a vacuum, e.g., 50 kPa. The titanium-containing compound and the second reacted product can be combined with one another and mixed at atmospheric pressure. The titanium-containing compound and the second reacted product can be combined with one another and mixed under pressure, e.g., a pressure ranging from about 102 kPa to about 500 kPa. The second reacted product and the titanium-containing compound can be combined with one another under an inert atmosphere. Inert atmospheres can be or include, but are not limited to, nitrogen, argon, or a combination thereof.

It is also possible within the practice of the invention to control the co-catalyst not only as a mole ratio to the titanium or other active metal on the electron donor-free Ziegler-Natta catalyst, but also or alternatively on the basis of the co-catalyst concentration in the resin on a weight basis. This may prove advantageous where the electron donor-free Ziegler-Natta catalyst productivity is changing, causing the denominator in the ratio to move.

If a diluent is used in preparation of the electron donor-free Ziegler-Natta catalyst, e.g., in the preparation of the first reacted product, the second reacted product, and/or the mixture of the titanium-containing compound and the second reacted product, at least a portion of the diluent can be removed. The diluent can be removed using any suitable process. For example, the diluent can be removed from the electron donor-free Ziegler-Natta catalyst by placing the slurried catalyst under a vacuum, heating the slurry to a temperature sufficient to vaporize the diluent, or a combination thereof to produce a dried, free-flowing catalyst. As such, the electron donor-free Ziegler-Natta catalyst can be in the form of a slurry, i.e., the diluent was used in producing the electron donor-free Ziegler-Natta catalyst, or the electron donor-free Ziegler-Natta catalyst can be in the form of a powder, i.e., either no diluent was used or, if the diluent was present a sufficient amount of the diluent was removed therefrom to produce the powdered catalyst. In one or more embodiments, the electron donor-free Ziegler-Natta catalyst can have a crystalline phase or structure, an amorphous phase or structure, or a mixture of crystalline and amorphous phases.

In one or more embodiments, if the electron donor-free Ziegler-Natta catalyst includes one or more aluminum alkyl chlorides as the chlorinating compound, the titanium-containing compound can include the one or more titanium alkoxides, the one or more titanium amides, or the combination thereof. In one or more embodiments, if the electron donor-free Ziegler-Natta catalyst includes one or more substituted silanes as the chlorinating compound, the titanium-containing compound can include one or more titanium halides. Said another way, when the titanium-containing compound is a titanium halide, the chlorinating compound can be one or more substituted silanes. Likewise, when the titanium-containing compound is a titanium alkoxide and/or a titanium amide, the chlorinating compound can be one or more aluminum alkyl chlorides. In at least one specific embodiment, when the chlorinating compound includes one or more aluminum alkyl chlorides, the chlorinating compound can be free of or essentially free of any intentionally added substituted silanes. In at least one other specific embodiment, when the chlorinating compound includes one or more substituted silanes, the chlorinating compound can be free of or essentially free of any intentionally added aluminum alkyl chlorides.

In one or more embodiments, the electron donor-free Ziegler-Natta catalyst is free or essentially free from any electron donors or donor compounds. As used herein the terms "essentially free from any electron donors" and "essentially free from any donor compounds" are used interchangeably and mean that the electron donor-free Ziegler-Natta catalyst contains less than about 1 wt % of an electron donor, based on the total weight of the electron donor-free Ziegler-Natta catalyst. For example, catalyst essentially free from any electron donors can contain less than about 1 wt %, less than about 0.7 wt %, less than about 0.5 wt %, less than about 0.3 wt %, less than about 0.1 wt %, or less than about 0.05 wt % of an electron donor, based on the total weight of the electron donor-free Ziegler-Natta catalyst. As used herein, the term "electron donor" refers to compounds that donate one or more electrons used in chemical covalent and/or dative bond and/or adduct formation. Electron donors include alcohols, thiols, amines, phosphines, ethers, ketones, and esters.

As used herein, the term "alcohol" refers to a chemical compound having the formula ROH, where R is any substituted or unsubstituted hydrocarbyl group. Illustrative alcohols include aliphatic alcohols, cyclic alcohols, and aromatic alcohols. Aliphatic alcohols can have from 1 to about 25 carbon atoms, for example. Illustrative aliphatic alcohols include methanol, ethanol, propanol, isopropanol, butanol, 2-ethylhexanol, and 1-dodecanol. Illustrative cyclic alcohols include cyclohexanol. Illustrative aromatic alcohols include t-butyl phenol.

As used herein the term "ether" refers to a chemical compound having the formula R—O—R', where R and R' are independently selected from substituted and unsubstituted hydrocarbyl groups, or R and R' form a fused ring, where the fused ring is saturated or unsaturated. Illustrative ethers that contain hydrocarbyl groups include diethyl ether, diisopropyl ether, di-n-butyl ether, ethylisopropyl ether, methylbutyl ether, methylallyl ether, and ethylvinyl ether. Illustrative ethers that contain a fused ring include tetrahydrofuran, and 2-methyl tetrahydrofuran.

As used herein, the term "ketone" refers to a chemical compound having the formula $R(C=O)R'$, where R and R' are independently selected from substituted and unsubstituted hydrocarbyl groups and as otherwise described above with reference to ethers. Illustrative ketones include acetone, methylethyl ketone, cyclohexanone, cyclopentylmethyl ketone, 3-bromo-4-heptanone, and 2-chlorocyclopentanone. Other suitable ketones may include other functional groups such as unsaturations, as in allylmethyl ketone.

As used herein, the term "ester" refers to a chemical compound having the formula $R(C=O)OR'$, where the carbon atom of the carbonyl group forms one bond to a carbon atom and another bond to an oxygen atom, and where R and R' are independently selected from substituted or unsubstituted hydrocarbyl groups. Illustrative esters can include alkyl esters of aliphatic and aromatic carboxylic acids, cyclic esters, saturated esters, and halogenated esters. Specific examples of esters can include methyl acetate, ethyl acetate, ethyl propionate, methyl propionate, and ethyl benzoate.

One or more alkyl aluminum co-catalysts or activators can be combined with the electron donor-free Ziegler-Natta catalyst. Suitable co-catalysts can include, but are not limited to, organometallic compounds such as aluminum alkyl compounds. Illustrative aluminum alkyl compounds can include, but are not limited to, dialkylaluminum halides e.g., dialkyaluminum chlorides, dialkylaluminum hydrides, alkylaluminum halides, e.g. alkylaluminum chlorides, and trialkylaluminum compounds. The alkyl group in aluminum alkyl compounds can include from 1 to 18 or from 1 to 12, or from 1 to 10, or from 1 to 8, or from 1 to 6 carbon atoms. For example, the alkyl group in aluminum alkyl compounds can be methyl, ethyl, propyl, butyl, isobutyl, pentyl, hexyl, heptyl, or octyl. Preferably, the alkyl aluminum co-catalyst can be or include trialkylaluminum compounds, in which the alkyl group includes from 1 to 18 or from 1 to 12, or from 1 to 10, or from 1 to 8, or from 1 to 6 carbon atoms. Illustrative trialkylaluminum compounds can include, but are not limited to, triethylaluminum, triisobutylaluminum, tri-n-butylaluminum, tri-n-hexylaluminum, tri-n-octylaluminum, trimethylaluminum, or any combination thereof. A preferred alkyl aluminum co-catalyst is triethylaluminum (TEAl). Other suitable alkyl aluminum co-catalysts can include those discussed and described in U.S. Pat. Nos. 3,787,384; 4,148,754; and 4,481,301.

The amount of the alkyl aluminum co-catalyst that can be combined with the electron donor-free Ziegler-Natta catalyst can range from a low of about 0.1 mmol, about 0.5 mmol, about 1 mmol, about 2 mmol, or about 3 mmol to a high of about 10 mmol, about 20 mmol, about 50 mmol, about 100 mmol, or about 500 mmol per mmol of titanium contained in the electron donor-free Ziegler-Natta catalyst. For example, the concentration of the alkyl aluminum co-catalyst in the electron donor-free Ziegler-Natta catalyst/co-catalyst mixture can range from about 0.5 mmol to about 150 mmol, about 1 mmol to about 100 mmol, about 1 mmol to about 75 mmol, about 1 mmol to about 50 mmol, about 2 mmol to about 30 mmol, about 2 mmol to about 20 mmol, about 3 mmol to about 15 mmol, or about 3 mmol to about 10 mmol per mmol of titanium contained in the electron donor-free Ziegler-Natta catalyst. The concentration of the alkyl aluminum co-catalyst on a polyethylene weight basis that can be combined with the electron donor-free Ziegler-Natta catalyst may range from about 5 $ppm_w$ or lower to about 200 $ppm_w$ or higher, about 5 $ppm_w$ to about 150 $ppm_w$, or about 10 $ppm_w$ to about 150 $ppm_w$.

It has been surprising and unexpectedly discovered that polyethylene and polyethylene copolymers produced with one or more of the catalysts discussed and described herein have unique properties. For example, it has been surprisingly and unexpectedly discovered that polyethylenes and copolymers thereof produced with one or more catalysts discussed and described herein can have long chain branching (LCB) and a broad molecular weight distribution (MWD). This combination of properties is believed to be unique among polyethylenes produced with Ziegler-Natta catalysts. The LCB is inherent to the granular polymer produced within the reactor. The LCB and the resulting melt strength and other associated properties are not significantly modified during the pelletization process. The combination of the broad MWD and the LCB results in a polymer with substantially increased extrusion processibility and consequent reduction in pelletization costs with reduced power consumption and/or increased rate of production.

The term "polyethylene" refers to a polymer having at least 50 wt % ethylene-derived units. For example, a polyethylene can have at least 50 wt % ethylene-derived units, at least 70 wt % ethylene-derived units, at least 80 wt % ethylene-derived units, at least 90 wt % ethylene-derived units, at least 95 wt % ethylene-derived units, or at least 100 wt % ethylene-derived units. The polyethylene can be a homopolymer or a copolymer, including a terpolymer, having one or more other monomeric units. As such, the polyethylene can include, for example, one or more other olefin(s) and/or alpha-olefin comonomer(s). Illustrative alpha-olefin comonomers can include, but are not limited to, those having from 3 to about 20 carbon atoms, such as $C_3$-$C_{20}$ alpha-olefins, $C_3$-$C_{12}$ alpha-olefins, $C_3$-$C_8$ alpha-olefins, $C_3$-$C_6$ alpha olefins, $C_3$-$C_5$ alpha olefins, $C_4$-$C_6$ alpha olefins, $C_4$-$C_5$ alpha olefins, or $C_4$ alpha olefins. Suitable alpha-olefin comonomers can be linear or branched or can include two unsaturated carbon-carbon bonds (dienes). Two or more comonomers can be used. Examples of suitable comonomers can include, but are not limited to, linear $C_3$-$C_{12}$ alpha-olefins and alpha-olefins having one or more $C_1$-$C_3$ alkyl branches or an aryl group.

Examples of useful comonomers include propylene; 1-butene; 3-methyl-1-butene; 3,3-dimethyl-1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene; and combinations thereof. Particularly preferred comonomers include 1-butene, 1-hexene, and 1-octene.

If one or more comonomers are used, the monomer, i.e. ethylene, can be polymerized in a proportion of from about 50 wt % to about 99.9 wt % of monomer, preferably from about 70 wt % to about 99 wt % of monomer, and more preferably, from about 80 wt % to about 98 wt % of monomer, with from about 0.1 wt % to about 50 wt % of the one or more comonomers, preferably from about 1 wt % to about 30 wt % of the one or more comonomers, and more preferably from about 2 wt % to about 20 wt % of the one or more comonomers.

The polyethylene can have a density of about 0.900 g/cm³ to about 0.970 g/cm³. For example, the polyethylene can have a density ranging from a low of about 0.910 g/cm³, about 0.915 g/cm³, about 0.920 g/cm³, or about 0.925 g/cm³ to a high of about 0.940 g/cm³, about 0.945 g/cm³, about 0.950 g/cm³, about 0.955 g/cm³, about 0.960 g/cm³, about 0.965 g/cm³, or about 0.970 g/cm³. In another example, the polyethylene can have a density of about 0.915 g/cm³ to about 0.935 g/cm³, or about 0.920 g/cm³ to about 0.930 g/cm³, or about 0.935 g/cm³ to about 0.960 g/cm³, or about 0.945 g/cm³ to about 0.957 g/cm³, or about 0.915 g/cm³ to about 0.960 g/cm³, or about 0.920 g/cm³ to about 0.955 g/cm³. Density can be determined in accordance with ASTM D-792.

The terms "molecular weight distribution" and "MWD" mean the same thing as polydispersity index (PDI). The molecular weight distribution (MWD) is the ratio of weight-average molecular weight (Mw) to number-average molecular weight (Mn), i.e., Mw/Mn. The polyethylene can have a molecular weight distribution (Mw/Mn) or (MWD) ranging from about 4 to about 14. For example, the polyethylene can have a molecular weight distribution (Mw/Mn) ranging from a low of about 4.1, about 4.3, about 4.5, about 4.7, about 4.9, about 5, about 5.5, about 6.0, about 6.5, about 6.8, about 6.9, about 7.0, or about 7.1 to a high of about 5.7, about 5.9, about 6, about 6.1, about 6.3, about 6.5, about 6.8, about 7.0, about 7.3, about 7.5, about 8.0 about 9.0, about 10.0, about 11.0, about 12.0, about 13.0, or about 14.0. In another example, the polyethylene can have a molecular weight distribution (Mw/Mn) of about 4.5 to about 6.5, about 4.6 to about 6.3, about 4.9 to about 6.3, about 5 to about 6.4, or about 4.5 to about 6.8. In another example, the polyethylene can have a molecular weight distribution (Mw/Mn) of about 4.5 to 14, 6.8 to 14, 6.9 to 14, or 7.0 to 14.

The polyethylene can have an Mz/Mw value of from about 3.0 to about 5.5. For example, the polyethylene can have an Mz/Mw value ranging from a low of about 3.3, about 3.6, about 3.7, about 3.8, about 3.9, or about 4.0 to a high of about 4.6, about 4.7, about 4.8, about 4.9, about 5.0, or about 5.3. In another example, the Mz/Mw value of the polyethylene can range from about 3.65 to about 4.85, from about 3.55 to about 4.75, from about 3.7 to about 4.7, or from about 3.6 to about 4.5.

Mw, Mn, and z-average molecular weight (Mz) can be measured using gel permeation chromatography (GPC), also known as size exclusion chromatography (SEC). This technique utilizes an instrument containing columns packed with porous beads, an elution solvent, and detector in order to separate polymer molecules of different sizes. Measurement of molecular weight by SEC is well known in the art and is discussed in more detail in, for example, Slade, P. E. Ed., Polymer Molecular Weights Part II, Marcel Dekker, Inc., NY, (1975) 287-368; Rodriguez, F., Principles of Polymer Systems 3rd ed., Hemisphere Pub. Corp., NY, (1989) 155-160; U.S. Pat. No. 4,540,753; and Verstrate et al., *Macromolecules*, vol. 21, (1988) 3360; T. Sun et al., Macromolecules, vol. 34, (2001) 6812-6820.

The polyethylene can have a melt index (MI) or ($I_2$) ranging from about 0.05 g/10 min to about 100 g/10 min. For example, the polyethylene can have a MI ($I_2$) ranging from a low of about 0.10 g/10 min, about 0.4 g/10 min, about 0.9 g/10 min, about 1.1 g/10 min, or about 1.5 g/10 min to a high of about 60 g/10 min, about 70 g/10 min, about 80 g/10 min, about 90 g/10 min, or about 100 g/10 min. In another example, the polyethylene can have a MI ($I_2$) of about 0.40 g/10 min to about 6 g/10 min, about 0.8 g/10 min to about 3 g/10 min, about 0.3 g/10 min to about 2 g/10 min, or about 0.4 g/10 min to about 3.5 g/10 min. In another example, the polyethylene can have a MI ($I_2$) of about 0.5 g/10 min to about 45 g/10 min, about 5 g/10 min to about 30 g/10 min, about 10 g/10 min to about 80 g/10 min, about 40 g/10 min to about 90 g/10 min, about 1 g/10 min to about 5 g/10 min, or about 0.05 g/10 min to about 10 g/10 min. The MI ($I_2$) can be measured in accordance with ASTM D-1238-E (at 190° C., 2.16 kg weight).

The polyethylene can have a flow index (FI) or ($I_{21}$) ranging from about 10 g/10 min to about 1,000 g/10 min. For example, the polyethylene can have a FI ($I_{21}$) ranging from a low of about 10 g/10 min, about 15 g/10 min, or about 20 g/10 min to a high of about 100 g/10 min, about 200 g/10 min, about 300 g/10 min, about 400 g/10 min, or about 500 g/10 min. In another example, the polyethylene can have a FI ($I_{21}$) of about 30 g/10 min to about 200 g/10 min, about 40 g/10 min to about 150 g/10 min, about 50 g/10 min to about 100 g/10 min, or about 100 g/10 min to about 200 g/10 min. The FI ($I_{21}$) can be measured in accordance with ASTM D-1238-F (at 190° C., 21.6 kg weight).

The terms "melt index ratio," "MIR," "melt flow ratio," "MFR," and "$I_{21}/I_2$," are used interchangeably and refer to the ratio of the flow index ($I_{21}$) to melt index ($I_2$), The polyethylene can have a MFR ($I_{21}/I_2$) ranging from about 30 to about 60. For example, the polyethylene can have a MFR ranging from about 31 to about 42, or about 32 to about 40, or about 33 to about 37, or about 34 to about 44, about 35 to about 45, about 30 to about 60, about 35 to about 55, about 45 to about 60, about 46 to about 60, about 47 to about 60, about 48 to about 60, about 49 to about 60, or about 50 to about 60. The polyethylene can have a melt flow ratio (MFR) greater than or equal to 8.33+(4.17×MWD).

Various methods are known for determining the presence of long chain branches. For example, long chain branching can be determined by using $^{13}$C nuclear magnetic resonance (NMR) spectroscopy and to a limited extent, e.g., for ethylene homopolymers and for certain copolymers, it can be quantified using the method of Randall, (*Journal of Macromolecular Science: Rev. Macromol. Chem. Phys.*, C29 (2&3), p. 285-297 (1989)). Although conventional $^{13}$C nuclear magnetic resonance spectroscopy can determine the length of a long chain branch for up to six carbon atoms, when more than about six carbon atoms are present, there are other known techniques useful for quantifying or determining the presence of long chain branches in ethylene polymers, such as ethylene/1-octene interpolymers. For those interpolymers where the $^{13}$C resonances of the comonomer overlap completely with the $^{13}$C resonances of the long-chain branches, either the comonomer or the other monomers (such as ethylene) can be isotopically labeled so that the long chain branching can be distinguished from the comonomer. For example, a copolymer of ethylene and 1-octene can be prepared using $^{13}$C-labeled ethylene. In this case, the long chain branching resonances associated with macromer incorporation will be significantly enhanced in intensity and will show coupling to neighboring $^{13}$C carbons, whereas the octene resonances will be unenhanced. Other methods include the technique disclosed in U.S. Pat. No. 4,500,648, which discloses that long chain branching frequency (LCBF) can be represented by the equation LCBF=b/$M_w$, where b is the weight average number of long chain branches per molecule and $M_w$ is the weight average molecular weight. The molecular weight averages and the long chain branching characteristics can be determined by gel permeation chromatography and intrinsic viscosity methods, respectively.

The polyethylene can have long chain branching (LCB). The level or amount of long chain branching refers to the number of long chain branches per 1,000 carbon atoms. The long chain branches can have a length of 4 or greater, 5 or greater, or 6 or greater carbon atoms and up to as long as the length of the polymer back-bone. For example, the number of carbon atoms on the long chain branches can range from a low of about 4, about 5, about 6, about 7, about 8, or about 9 to a high of about 10, about 50, about 100, about 1,000, about 10,000 or more, depending, at least in part, on the polymerization conditions. The polyethylene can have long chain branching (LCB) greater than about 0.01 per 1,000 carbon atoms and less than about 0.07 per 1,000 carbon atoms. For example, the polyethylene can have long chain branches ranging from a low of about 0.01, about 0.015, about 0.02, about 0.025, about 0.03, about 0.04, about 0.05, about 0.055, or about 0.06 to a high of about 0.035, about 0.040, about 0.045, about 0.05, about 0.06, or about 0.07 per 1,000 carbon atoms.

Branches introduced as a result of comonomer incorporation, such as branches 8 carbons long when using n-decene as a comonomer, are not considered "Long Chain Branches" as conventionally understood in the art. In the presence of such comonomer, LCB in the polyethylene can be determined by preparative temperature rising elution fractionation (pTREF), where the homopolymer or crystalline fraction eluting above 95° C. is separated from the rest of the polymer. Additional details for the pTREF technique can be as discussed and described in U.S. Patent Application Publication No.: 2012/0028065. Using the NMR techniques described, the amount of LCB in the homopolymer fraction can be determined. The LCB in this fraction can be in the range 0.01 per 1000 carbon atoms to 0.07 branches per 1,000 carbon atoms.

Two other useful methods for quantifying or determining the presence of long chain branches in ethylene polymers, such as ethylene/1-octene interpolymers, can include gel permeation chromatography coupled with a low angle laser light scattering detector (GPC-LALLS) and gel permeation chromatography coupled with a differential viscometer detector (GPC-DV). The use of these techniques for long chain branch detection and the underlying theories are discussed and described in the literature. See, e.g., G. H. Zimm, and W. H. Stockmayer, *J. Chem. Phys.*, vol. 17, p. 1301 (1949); and A. Rudin, "Modern Methods of Polymer Characterization," John Wiley & Sons, New York (1991) p.

103. Still another method for determining long chain branching can include GPC-FTIR as described by E. J. Markel, et al. *Macromolecules*, vol. 33, p. 8541 (2000).

The present disclosure allows for control of LCB in polyethylene by adjusting an amount of an alkyl aluminum co-catalyst used with an electron donor-free Ziegler-Natta catalyst during the production of the polyethylene. Measured values of the MFR ($I_{21}/I_2$) can also be used with a predetermined relationship to provide values for the LCB in the polyethylene. The predetermined relationship between the MFR ($I_{21}/I_2$) and the LCB can be produced from data of both the MFR ($I_{21}/I_2$) and the LCB derived from varying the weight concentration of the alkyl aluminum co-catalyst in the polymerization reactor while performing the polymerization reaction.

Figure 6:
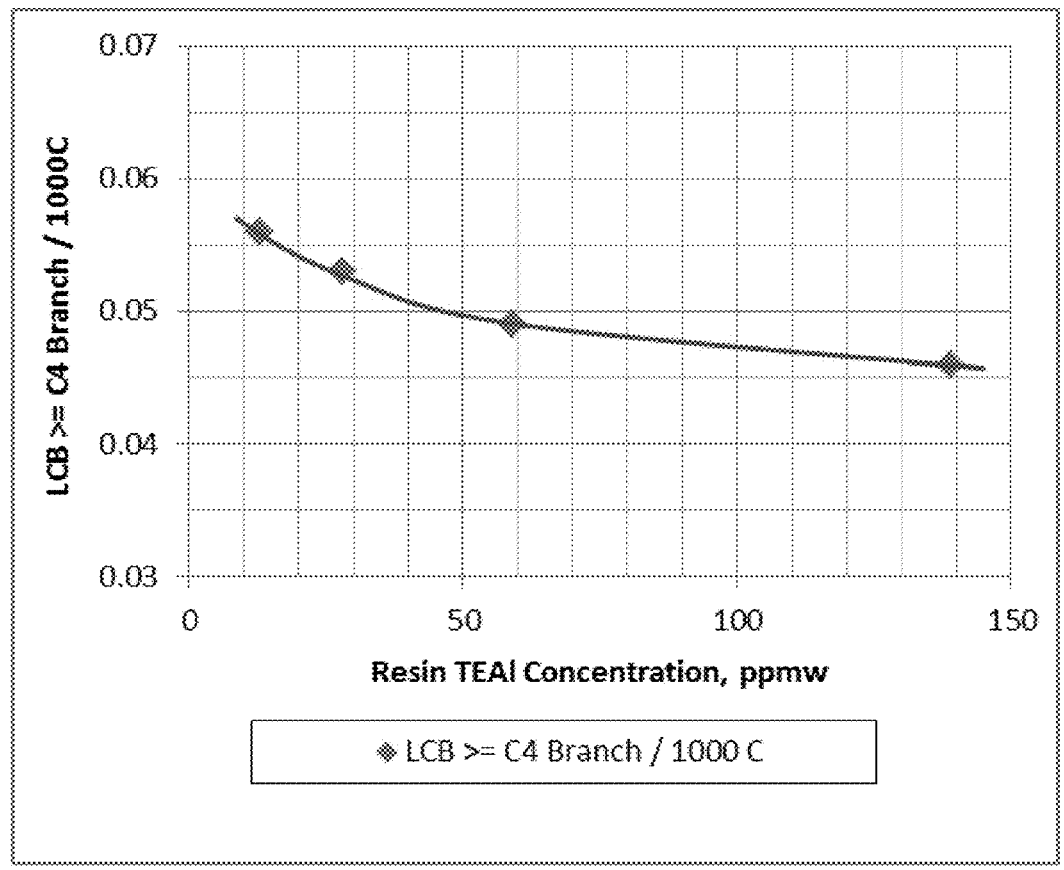
FIG. 6 depicts a graphical representation of the polymer Long Chain Branching (LCB) vs. the concentration of co-catalyst in the resin for Example 20 through Example 23.
Figure 7:
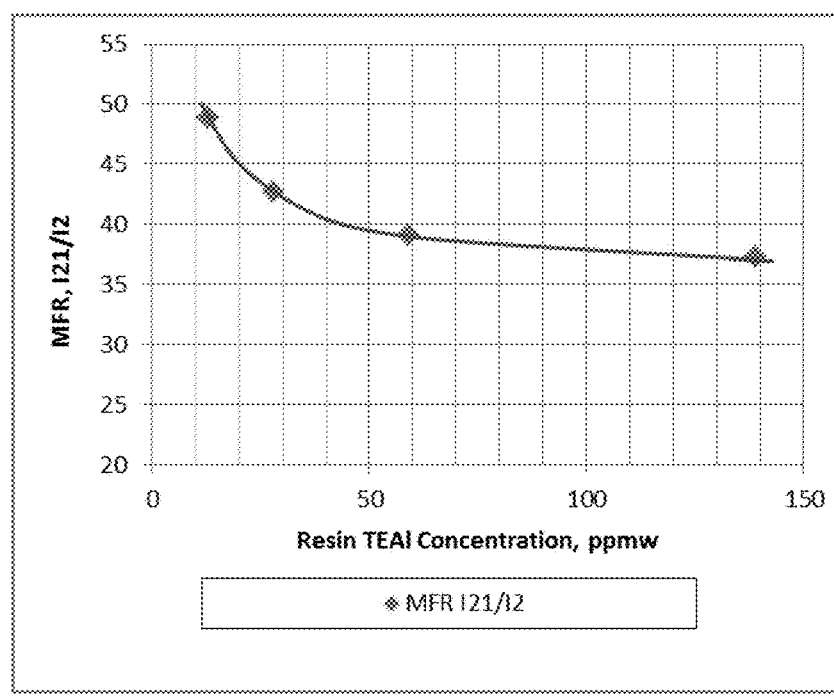
FIG. 7 depicts a graphical representation of the polymer MFR (Melt Flow Ratio) $I_{21}/I_2$ vs. the concentration of co-catalyst in the resin for Example 20 through Example 23.
Figure 8:
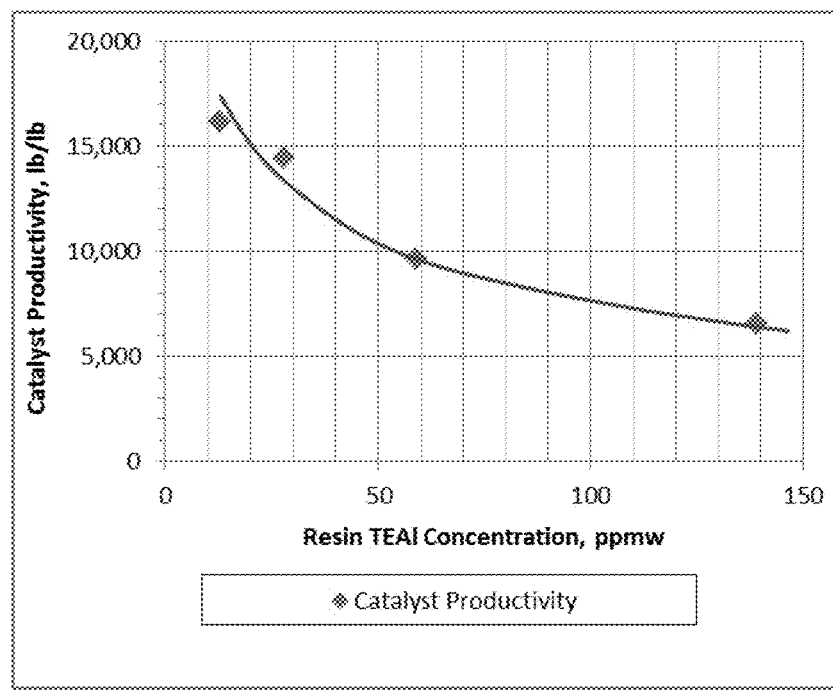
FIG. 8 depicts a graphical representation of the electron donor-free Ziegler-Natta catalyst productivity vs. the concentration of co-catalyst in the resin for Example 20 through Example 23.
Figure 9:
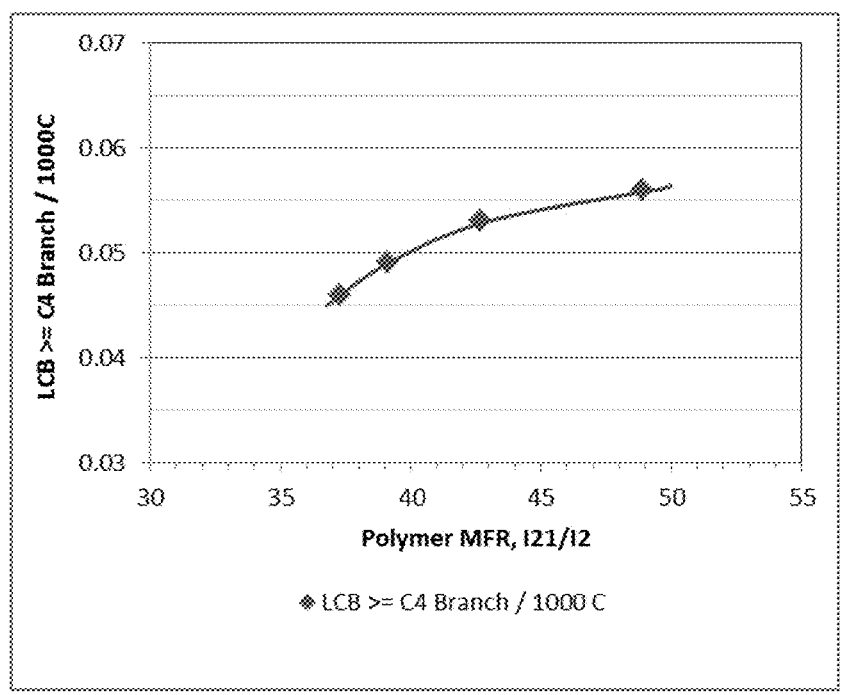
FIG. 9 depicts a graphical representation of the polymer Long Chain Branching (LCB) vs. the polymer MFR ($I_{21}/I_2$) for Example 20 through Example 23.
Figure 10:
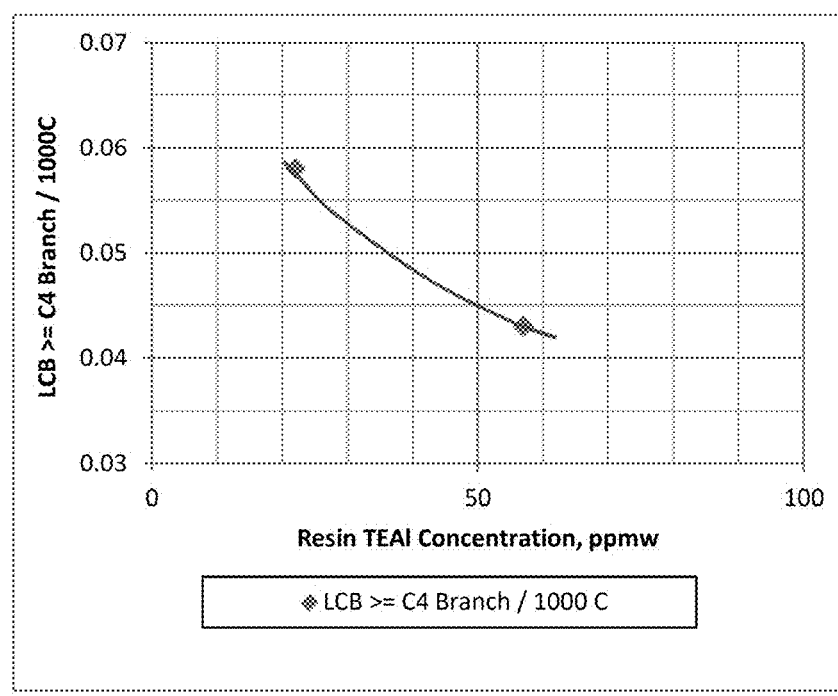
FIG. 10 depicts a graphical representation of the polymer Long Chain Branching (LCB) vs. the concentration of co-catalyst in the resin for Example 30 and Example 31.
Figure 11:
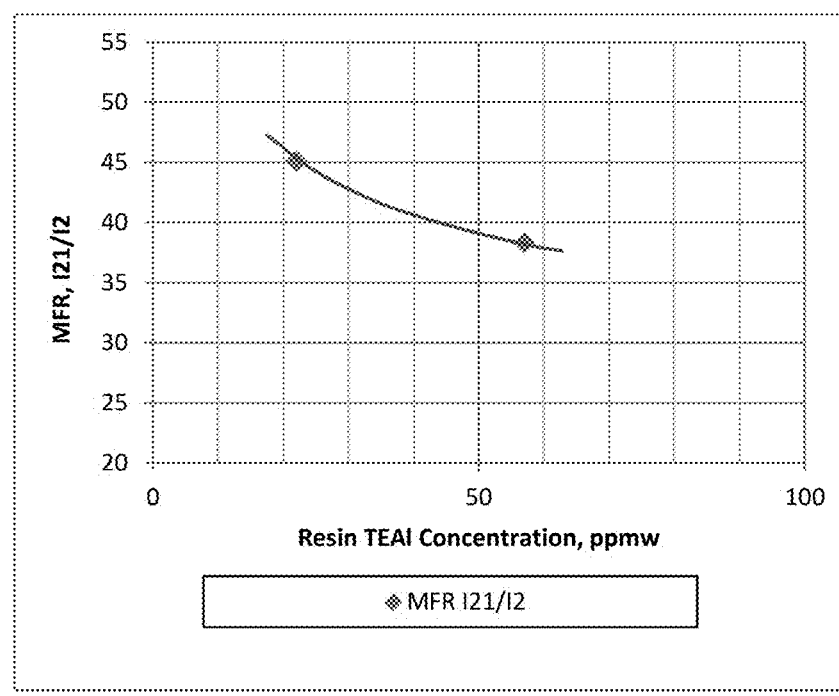
FIG. 11 depicts a graphical representation of the polymer MFR (Melt Flow Ratio) $I_{21}/I_2$ vs. the concentration of co-catalyst in the resin for Example 30 and Example 31.
Figure 12:
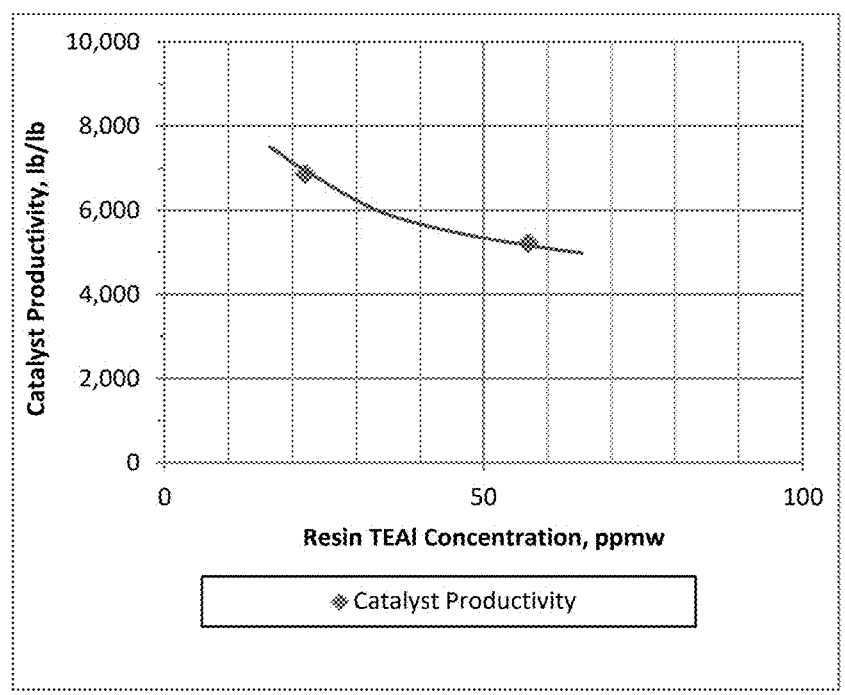
FIG. 12 depicts a graphical representation of the electron donor-free Ziegler-Natta catalyst productivity vs. the concentration of co-catalyst in the resin for Example 30 and Example 31.
Figure 13:
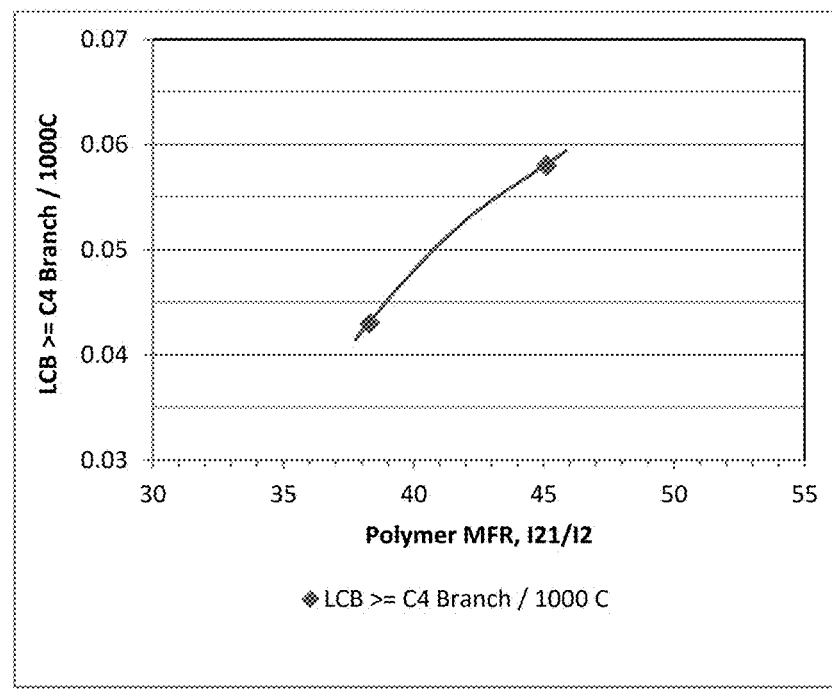
FIG. 13 depicts a graphical representation of the polymer Long Chain Branching (LCB) vs. the polymer MFR ($I_{21}/I_2$) for Example 30 and Example 31.

As discussed more below in the Examples section, FIG. 6 illustrates a predetermined relationship between the LCB for otherwise linear low density polyethylene (LLDPE) polymers versus the concentration of alkyl aluminum co-catalyst (e.g., TEAl) used in forming the polymers. The examples provided in FIG. 6 and the following figures (e.g., FIGS. 6-13) are for LCB resulting from the use of butene monomers, where the LCB is defined as greater than or equal to (≥) four (4) carbons in length. FIG. 10 illustrates a predetermined relationship between the LCB for high density polyethylene (HDPE) polymers versus the concentration of co-catalyst (TEAl) used in forming the polymers. As seen in FIGS. 6 and 10, as the concentration of the TEAl co-catalyst decreases (given in $ppm_w$—parts per million weight) the LCB for the polyethylene polymer increases. FIGS. 7 and 11 illustrate a graphical representation of the polymer MFR ($I_{21}/I_2$) versus the concentration of co-catalyst (TEAl) for the polyethylene polymers where it is seen that as the concentration of the TEAl co-catalyst decreases the MFR for the polyethylene polymer increases. The same trend is repeated with the association between the electron donor-free Ziegler-Natta catalyst productivity versus the concentration of co-catalyst (TEAl) in the polyethylene polymers, as seen in FIGS. 8 and 12. Using these surprising results it is then possible to provide the predetermined relationship between the LCB versus the polymer MFR ($I_{21}/I_2$) for the polyethylene polymer, as seen in FIGS. 9 and 13.

As mentioned, measured values of the MFR ($I_{21}/I_2$) are used with a predetermined relationship to provide values for the LCB in the polyethylene. Based on the data discussed above (data of both the MFR ($I_{21}/I_2$) and the LCB derived from varying the weight concentration of the alkyl aluminum co-catalyst in the polymerization reactor while performing the polymerization reaction) and provided in the Examples section herein, the predetermined relationship between the MFR ($I_{21}/I_2$) and the LCB (≥C4 Branch/1000 C) provides that for LDPE the predetermined relationship is:

$$LCB = 3.3514 \times 10^{-6} \times (\text{LDPE Polymer MFR})^3 - 5.0204 \times 10^{-4} \times (\text{LDPE Polymer MFR})^2 + 0.025348 \times (\text{LDPE Polymer MFR}) - 0.3749$$

For HDPE the predetermined relationship is:

$$LCB = 0.0022 \times (\text{HDPE Polymer MFR}) - 0.0415$$

The LDPE equation for LCB best applies over a range of about 30 MFR to about 60 MFR. The HDPE equation for LCB best applies over a range of about 35 MFR to about 50 MFR.

The measured values for the electron donor-free Ziegler-Natta catalyst productivity of the polyethylene from the polymerization reactor can also be used to determine the amount of LCB of the polyethylene from the polymerization reactor using a measurement of the electron donor-free Ziegler-Natta catalyst productivity with a predetermined relationship between the electron donor-free Ziegler-Natta catalyst productivity and the LCB, as mentioned herein. This predetermined relationship between the electron donor-free Ziegler-Natta catalyst productivity and the LCB can take the form of a linear equation, as seen below. As illustrated below, a first of the predetermined relationships is for the production of the LDPE (based on data provided in the Examples section herein and illustrated in FIG. 14) and a second of the predetermined relationships is for the production of the HDPE (based on data provided in the Examples section herein and illustrated in FIG. 15):

$$LCB = 0.99 \times 10^{-6} \times (\text{LDPE Catalyst Productivity}) + 0.0394$$

$$LCB = 9.15 \times 10^{-6} \times (\text{HDPE Catalyst Productivity}) - 0.0048$$

For the above equations, the preferred range for the predetermined relationship for LDPE catalyst productivity is from about 4,000 lb/lb to about 20,000 lb/lb, where the preferred range for the predetermined relationship for HDPE catalyst productivity is from about 4,500 lb/lb to about 7,500 lb/lb.

The catalyst productivity provided in these equations is measured by Inductively Coupled Plasma Emission Spectroscopy (ICPES). Alternatively, the catalyst productivity can be determined from a material balance around the polymerization reactor based on the weight amount of polymer discharged from the reactor divided by the weight amount of catalyst fed to the reactor.

Using the predetemined equations provided herein, changes in catalyst productivity (particularly the catalyst productivity based on reactor material balance that can be calculated instantly) and/or MFR values can be used to make essentially real time changes in the co-catalyst feed rate to the polymerization reactor. This may allow for control of the catalyst productivity at its desired level before the MFR deviates or deviates greatly from its target value. The LCB can likewise be controlled, adjusted and/or maintained at its desired level. The material balance catalyst productivity is thus a leading indicator of impending changes in polymer composition, which allows for control in real time of the polymerization process. An LCB control model based on material balance productivity (material balance around the reactor including the catalyst feed rate and the polymer production rate) may also be developed incorporating the LCB parameters and equations provided herein. This model may provide excellent instant indication of the catalyst productivity and the LCB of the polymer being produced.

So, the LCB relates to the MFR and to the catalyst productivity, where each of these properties can be related back to the alkyl aluminum co-catalyst concentration used in producing the polymer in a predetermined relationship. Using this predetermined relationship, the amount of LCB of the polyethylene can be determined from the polymerization reactor using the measured MFR ($I_{21}/I_2$) and/or catalyst productivity. Measurable parameters such as the MFR and/or productivity can then be used in essentially real time during polymer production as an indication of the LCB for the polymer. This relationship can then lead to better process control of the polymerization process, where an amount of the LCB can be controlled and/or adjusted by controlling the MFR and/or catalyst productivity through control of and/or changes to the amount of alkyl aluminum co-catalyst (e.g., TEAl) in the polymerization reactor.

The predetermined relationships provided herein can be used in polymerization process control methods for making polyethylene in which the LCB in the polyethylene can be controlled by adjusting an amount of the alkyl aluminum co-catalyst used with an electron donor-free Ziegler-Natta catalyst during the production of the polyethylene. Such process control methods include performing the polymerization reaction is a polymerization reactor to produce the polyethylene, where ethylene, and optionally one or more comonomers in the polymerization reaction is catalyzed by the electron donor-free Ziegler-Natta catalyst and the alkyl aluminum co-catalyst. As seen from the data discussed herein, adjusting the concentration of the alkyl aluminum co-catalyst allows for the manipulation and control of the electron donor-free Ziegler-Natta catalyst productivity and the MFR ($I_{21}/I_2$) of the polyethylene. Surprisingly, the amount of LCB in the polyethylene can be controlled by the concentration of alkyl aluminum co-catalyst used in the polymerization process.

Process control during the production of the polyethylene can also be accomplished using the MFR and/or the electron donor-free Ziegler-Natta catalyst productivity, where these measureable parameters can be used as indicators of the instant LCB when LCB measurements cannot be made during the polymerization reaction. One approach to this process control can include adjusting the weight concentration of the alkyl aluminum co-catalyst present in the polymerization reactor and/or the alkyl aluminum co-catalyst to Ziegler-Natta active metal molar ratio to control the amount of LCB in the polyethylene polymer. As seen in the data discussed above, changes in the concentration of the alkyl aluminum co-catalyst can lead to changes in the electron donor-free Ziegler-Natta catalyst productivity and the MFR of the polyethylene. For example, as the concentration of the alkyl aluminum co-catalyst is reduced for a given polymerization process, the electron donor-free Ziegler-Natta catalyst productivity and the MFR of the polyethylene both increase.

During polyethylene production, the weight concentration of the alkyl aluminum co-catalyst in the polymerization reactor can be adjusted so as to bring the LCB in the polyethylene into compliance with a predetermined product specification set for the desired polyethylene. Examples of suitable polymerization reactors for the present disclosure include those selected from the group consisting of a solution reactor, a slurry loop reactor, a supercritical loop reactor, a stirred gas-phase reactor, or a fluidized-bed gas-phase reactor.

Changes to the weight concentration of the alkyl aluminum co-catalyst can be accomplished in a variety of ways. For example, a weight concentration of the electron donor-free Ziegler-Natta catalyst can be reduced when the weight concentration of the alkyl aluminum co-catalyst present in the polymerization reactor is reduced. A weight concentration of the electron donor-free Ziegler-Natta catalyst can also be increased to maintain a constant production rate of the polyethylene when the weight concentration of the alkyl aluminum co-catalyst present in the polymerization reactor is increased. Adjusting the weight concentration of the alkyl aluminum co-catalyst present in the polymerization reactor can also be accomplished by changing a mole ratio of the alkyl aluminum co-catalyst to active metal in the electron donor-free Ziegler-Natta catalyst. In an additional embodiment, deviations in the catalyst productivity can function as a leading indicator of impending changes in the polymer MFR and/or LCB. This leading indicator of impending changes is then used by responding to the deviations in catalyst productivity by adjusting the weight concentration of the alkyl aluminum co-catalyst in the polymerization reactor whereby the electron donor-free Ziegler-Natta catalyst productivity of the polyethylene from the polymerization reactor is controlled. In addition, deviations in the catalyst productivity functioning as the leading indicator of impending changes in the polymer MFR and/or LCB can also be used in responding to the deviations in catalyst productivity by adjusting a feed rate of the electron donor-free Ziegler-Natta catalyst whereby a constant polyethylene production rate from the polymerization reactor is maintained that corresponds to a change in the catalyst productivity. The concentration of the alkyl aluminum co-catalyst in the polymerization reactor may then be adjusted based on the new calculated catalyst productivity. The weight concentration of the alkyl aluminum co-catalyst in the polymerization reactor, for example, can also be decreased to allow for an increase in productivity of the electron donor-free Ziegler-Natta catalyst relative to the productivity before the change in weight concentration.

As discussed herein, adjusting the weight concentration of the alkyl aluminum co-catalyst present in the polymerization reactor can also cause a variety of changes in the physical properties of the polyethylene produced in the polymerization reactor. For example, adjusting the weight concentration of the alkyl aluminum co-catalyst present in the polymerization reactor can cause changes in the MFR ($I_{21}/I_2$) of the polyethylene from the polymerization reactor. Adjusting the weight concentration of the alkyl aluminum co-catalyst present in the polymerization reactor may also change a production rate of the polyethylene from the polymerization reactor. Adjustments to the weight concentration of the alkyl aluminum co-catalyst present in the polymerization reactor may also change cycle gas molar ratios of either $H_2/C_2$ and $C_4/C_2$ and/or $H_2/C_2$ and $C_6/C_2$. The MFR ($I_{21}/I_2$) of the polyethylene from the polymerization reactor may also be controlled by adjusting one or more of a $H_2/C_2$ gas mole ratio, $H_2/C_2$ weight feed ratio, a $C_4$ to $C_2$ co-monomer gas mole ratio or the $C_4$ to $C_2$ weight feed ratio. Similarly, the MFR ($I_{21}/I_2$) of the polyethylene from the polymerization reactor may also be controlled by adjusting one or more of a $C_6/C_2$ gas mole ratio, $C_6/C_2$ weight feed ratio, a $C_6$ to $C_2$ co-monomer gas mole ratio or the $C_6$ to $C_2$ weight feed ratio.

Comonomer distribution analysis can be performed with Crystallization Elution Fractionation (CEF) (Monrabal, B. et al., *Macromol. Symp.*, 257, p. 71 (2007)). Ortho-dichlorobenzene (ODCB) with 600 ppm antioxidant butylated hydroxytoluene (BHT) can be used as solvent. Sample preparation can be done with an autosampler at 160° C. for about 2 hours under shaking at 4 mg/ml (unless otherwise specified). The injection volume can be about 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization can be at 0.052 ml/min. The flow rate during elution can be at 0.50 ml/min. The data can be collected at one data point/second. The glass beads can be acid washed and the CEF column can be packed with glass beads at 125 μm±6% (MO-SCI Specialty Products) with 0.125 inch stainless steel tubing. The column volume can be about 2.06 ml. The column temperature calibration can be performed using a mixture of NIST Standard Reference Material Linear polyethylene 1475a (1.0 mg/ml) and Eicosane (2 mg/ml) in ODCB. The temperature can be calibrated by adjusting elution heating rate so that NIST linear polyethylene 1475a has a peak temperature at 101° C., and Eicosane has a peak temperature at 30.0° C. The CEF column resolution can be calculated with a mixture of NIST linear polyethylene 1475a (1.0 mg/ml) and hexacontane (Fluka, purum, >97.0%, 1 mg/ml). A baseline separation of hexacontane and NIST polyethylene 1475a can be achieved. The area of hexacontane (from 35.0° C. to 67.0° C.) to the area of NIST 1475a from 67.0° C. to 110.0° C. can be 50 to 50, the amount of soluble fraction below 35.0° C. can be less than 1.8 wt %. The column resolution can be 6.0. The CEF column resolution can be defined as:

$$\text{Resolution} = \frac{\text{peak temperature of } NIST \ 1475a - \text{peak temperature of hexacontrane}}{\text{half-height width of } NIST \ 1475a + \text{half-height width of hexacontrane}}$$

The polyethylene can have a heterogeneous distribution of short chain branching (SCB). As used herein, the terms "heterogeneous branching distribution," "heterogeneously branched," and "heterogeneous distribution of short chain branching" are used interchangeably and refer to: (1) molecules of different chain length contain different levels of comonomer and in particular the molecules of lower chain length contain higher amounts of comonomer i.e., a lower ethylene to comonomer ratio, (2) the polymer is characterized by a broad short chain branching distribution where the comonomer heterogeneity index or (CHI) is <0.5, and (3) the polymer contains a measureable high density (crystalline) fraction shown as a peak at an elution temperature of about 100° C. in any of several known fractionation techniques that involve polymer fractional elution as a function of temperature, e.g., temperature rising elution fractionation (TREF) (see, e.g., U.S. Pat. No. 5,008,204 and J. Wild et al., *Poly. Sci., Poly. Phy. Ed.*, vol. 20, p. 441 (1982)), crystallization analysis fractionation (CRYSTAF) (see, e.g., D. Beigzadeh, J. B. P. Soares, and T. A. Duever; "Modeling of Fractionation in CRYSTAF Using Monte Carlo Simulation of Crystallizable Sequence Lengths: Ethylene/1-octene Copolymers Synthesized with Single-Site-Type Catalysts," *J. Applied Polymer Science*, vol. 80, No. 12, p. 2200 (2001); also B. Morabal, J. Blanco, J. Nieto, and J. B. P. Soares, *Polym. Sci Part A: Polym. Chem.*, vol. 37, p. 89 (1999)), and crystallization elution fraction (CEF), which is discussed and described in WO Publication No. WO2011/002868. The polyethylene can have a comonomer heterogeneity index (CHI) of less 0.5, less than about 0.47, less than about 0.45, less than about 0.43, less than about 0.40, less than about 0.37, less than about 0.35, less than about 0.33, less than about 0.3, less than about 0.27, less than about 0.25, less than about 0.23, or less than about 0.20.

The compounds were measured for melt strength by Rheotens at 190° C. and by dynamic EVF using an ARES Melt rheometer. The terms "melt strength" and "MS" are used interchangeably and refer to the maximum tensile force measured on a molten filament of a polymer melt extruded from a capillary rheometer die at a constant shear rate of 33 reciprocal seconds ($\text{sec}^{-1}$) while the filament is being stretched by a pair of nip rollers that are accelerating the filament at a rate of about 0.24 centimeters per second per second ($\text{cm/sec}^2$) from an initial speed of about 1 cm/sec. The maximum force can be determined from the Force versus take off velocity data as follows: in the absence of draw resonance, the melt strength value is the maximum value immediately before break; in the presence of draw resonance, the melt strength is the average value of twenty data points before the onset of draw resonance, where draw resonance is defined as an oscillation that has an amplitude greater than 10% of the mean value of the oscillation. The molten filament is preferably generated by heating about 10 g of a polymer that is packed into a barrel of an Instron capillary rheometer, equilibrating the polymer at 190° C. for five minutes, and then extruding the polymer at a piston speed of about 2.54 cm/minute (cm/min) through a capillary die with a diameter of about 0.21 cm and a length of about 4.19 cm. The tensile force is preferably measured with a Goettfert Rheotens that is located so that the nip rollers are about 10 cm directly below a point at which the filament exits the capillary die.

The melt strength of the polyethylene can also be represented in the form of an equation. More particularly, the melt strength of the polyethylene can be represented by the equation: melt strength≈$7.6938 \times \exp(-1.56 \times \log(MI))$, where the logarithm is base 10. In one or more embodiments, the polyethylene can have a density greater than or equal to 0.945 g/cm$^3$ and a melt strength greater than or equal to $a \times (3.7463 \times \exp(-1.485 \times \log(MI)))$, where a is equal to 1.5, 1.55, 1.6, 1.65, 1.7, 1.75, 1.8, 1.85, or 1.9. For example, a heterogeneous polyethylene can have a density greater than or equal to 0.945 g/cm$^3$ and a melt strength greater than or equal to $a \times (3.7463 \times \exp(-1.485 \times \log(MI)))$, where a is equal to 1.5, 1.75, or 1.9. In one or more embodiments, the polyethylene can have a density less than 0.945 g/cm$^3$ and a melt strength greater than or equal to $a \times (3.7463 \times \exp(-1.485 \times \log(MI)))$, where a is equal to 1.2, 1.25, 1.3, 1.35, 1.4, 1.45, 1.5, 1.55, 1.6, 1.65, 1.7, 1.75, 1.8, 1.85, or 1.9. For example, a heterogeneous polyethylene can have a density less than 0.945 g/cm$^3$ and a melt strength greater than or equal to $a \times (3.7463 \times \exp(-1.485 \times \log(MI)))$, where a is equal to 1.2, 1.5, or 1.9.

The polyethylene can have a melt strength ranging from a low of about 2 centi-Newtons (cN), about 3 cN, about 3.5 cN, about 4 cN, or about 4.5 cN to a high of about 6 cN, about 8 cN, about 10 cN, about 12 cN, about 14 cN, about 16 cN, about 18 cN, or about 20 cN. For example, the polyethylene can have a melt strength of about 2 cN to about 7 cN, about 2.5 cN to about 6 cN, about 3.3 cN to about 7.3 cN, about 3.6 cN to about 7 cN, or about 2.2 cN to about 6.8 cN. In another example, the polyethylene can have a melt strength of about 3.3 cN to about 16 cN, about 5 cN to about 18 cN, about 6 cN to about 14 cN, about 8 cN to about 20 cN, or about 8.5 cN to about 17 cN. In another example, the polyethylene can have a melt strength of at least 2 cN, at least 3 cN, at least 4 cN, at least 5 cN, at least 6 cN, at least 7 cN, at least 8 cN, at least 9 cN, at least 10 cN, at least 11 cN, at least 12 cN, at least 13 cN, at least 14 cN, at least 15 cN, or at least 16 cN. In another example, the polyethylene can have a melt strength of at least 2.5 cN, at least 3.5 cN, at least 4.5 cN, at least 5.5 cN, at least 6.5 cN, at least 7.5 cN, at least 8.5 cN, at least 9.5 cN, at least 10.5 cN, at least 11.5 cN, at least 12.5 cN, at least 13.5 cN, at least 14.5 cN, at least 15.5 cN, or at least 16.5 cN.

The polyethylene can have a slope of strain hardening (SSH) greater than about 0.75, greater than about 0.80, greater than about 0.85, greater than about 0.90, greater than about 0.95, or greater than about 1.00, as measured by extensional viscosity fixture (EVF). For example, the polyethylene can have a SSH ranging from a low of about 0.76, about 0.78, about 0.80, about 0.83, about 0.85, or about 0.87 to a high of about 0.90, about 0.95, about 1.00, about 1.10, about 1.20, about 1.30, or about 1.40, as measured by EVF. For example, the polyethylene can have a slope of strain hardening greater than about 0.75 to about 1.35, about 0.80 to about 1.30, about 0.90 to about 1.29, about 0.95 to about 1.35, about 1.00 to about 1.35, or about 1.05 to about 1.30, as measured by EVF.

The extensional viscosity can be measured by an extensional viscosity fixture (EVF) of TA Instruments (New Castle, Del.) attached onto an ARES rheometer of TA Instruments at Hencky strain rates of 10 s$^{-1}$, 1 s$^{-1}$, and 0.1 s$^{-1}$ at 150° C. A sample plaque can be prepared on a programmable Tetrahedron bench top press. The program can hold the melt at 177° C. at a pressure of 1,500 psi (10$^7$ Pa) for 5 minutes. The chase is then removed to the bench top to cool. The test samples can be die-cut from the sample plaque using a punch press and a handheld die with the dimensions of about 10 mm×18 mm (Width×Length). The specimen thickness can range from about 0.7 mm to about 1.1 mm.

The TA instruments Extensional Velocity Fixture (EVF) can be used with a conventional Aries rheometer. The rheometer oven that encloses the EVF fixture can be set to a test temperature of about 150° C. for at least 60 minutes prior to zeroing fixtures. The width and thickness of each sample film can be measured at three different locations of the plaque sample and the average values can be entered into the test program (TA Orchestrator version 7.2). Densities of the sample at room temperature and at the test temperature (0.78 g/cm$^3$) can also be entered into the test program to allow for the program to calculate the actual dimensions of the sample film at the test temperature. The density of the sample at room temperature varies from sample to sample and the density measured according to ASTM D-792 can be used. The film specimen can be attached onto each of the two drums of the fixture by a pin. The oven can be closed to let the temperature equilibrate before starting the test. The test was divided into three zones. The first zone is the pre-stretch zone that stretches the film at a strain rate of about 0.005 s$^{-1}$ for 11 seconds. Pre-stretching the film can reduce the film buckling introduced when the film is loaded. This is followed by a relaxation zone of about 60 seconds to minimize or reduce the stress introduced in the pre-stretch step. The third zone is the measurement zone where the film is stretched at the pre-set Hencky strain rate. The data collected in the third zone is that used for analysis.

The extensional viscosity can be measured at about 150° C. Data for the calculation of slope of strain hardening can be collected at a strain rate of about 0.1 s$^{-1}$. The slope of strain hardening SSH can be calculated as follows: (a) data is recorded as viscosity (Pa·s) vs. elapsed time (seconds), (b) viscosity increases with elapsed time; data in the range of elapsed time >1 sec is considered for the purposes of this calculation, (c) the point immediately before breakage, or a decrease in viscosity, or an obvious slippage of the sample signified by a sudden rise or fall in force is noted: value $F_{max}$ and time $t_{max}$; the log of $t_{max}$ is calculated=$Lt_{max}$, (d) with time expressed as $\log_{10}$(time), the range of data to be used for the calculation is between $0.9 \times Lt_{max}$ and $0.75 \times Lt_{max}$ (the point adjacent and less than $0.9 \times Lt_{max}$ and the point adjacent to and greater than $0.75 \times Lt_{max}$ define the upper and lower limits of the range), (e) using the range of step (d), the data are plotted as log(viscosity) vs. log(time), (f) using conventional linear regression techniques known in the art, a line of the form y=m×x+c is fitted to the data (the linear line fit offered in Microsoft Corporation's EXCEL® program is suitable, (g) the slope of strain hardening is equal to m. Since the slope is measured in log space, the slope of strain hardening value (SSH) is a dimensionless number. Additional information with regard to extensional viscosity can be found in *J. Chem. Educ.*, vol. 74, No. 8, p. 899 (1997); and *J. Chem. Educ.*, vol. 72, No. 10, p. 954 (1995).

The electron donor-free Ziegler-Natta catalyst can be used to polymerize one or more olefins to provide one or more polymer products therefrom. Any polymerization process including, but not limited to, high pressure, solution, slurry, and/or gas phase processes can be used. Preferably, a continuous gas phase process utilizing a fluidized bed reactor is used to polymerize ethylene or ethylene and one or more comonomers to provide a polyethylene or a polyethylene copolymer, respectively. The comonomers can be as discussed and described above.

An illustrative fluidized bed reactor can include a reaction zone and a so-called velocity reduction zone. The reaction zone can include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream can be at a rate equal to the rate at which particulate polymer product and monomer associated therewith can be withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed. Finer entrained particles and dust may be removed in a cyclone and/or fine filter. The gas can be passed through a heat exchanger where the heat of polymerization can be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluid bed process can range from 30° C. or 40° C. or 50° C. to 90° C. or 100° C. or 110° C. or 120° C. In general, the reactor temperature can be operated at the highest temperature that can be feasible taking into account the sintering temperature of the polyethylene within the reactor. Regardless of the process used to make the polyethylene, the polymerization temperature or reaction temperature should be below the melting or "sintering" temperature of the polyethylene to be formed. Thus, the upper temperature limit in one embodiment is the melting temperature of the polyethylene produced in the reactor.

Hydrogen gas can be used in olefin polymerization to control the final properties of the polyolefin, such as described in "Polypropylene Handbook," at pages 76-78 (Hanser Publishers, 1996). Increasing concentrations (partial pressures) of hydrogen can increase the melt index (MI) of the polyethylene generated. The MI can thus be influenced by the hydrogen concentration. The amount of hydrogen in the polymerization reactor can be expressed as a mole ratio relative to the total polymerizable monomer, for example, ethylene, or a blend of ethylene and hexene. The amount of hydrogen used in the polymerization process can be an amount sufficient to achieve the desired MI of the final polyolefin resin. In one embodiment, the mole ratio of hydrogen to total monomer ($H_2/C_2$) can be in a range from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range can include any combination of any upper mole ratio limit with any lower mole ratio limit described herein. Expressed another way, the amount of hydrogen in the reactor at any time may range to up to 5,000 ppm$_v$, and up to 4,000 ppm$_v$ in another embodiment, and up to 3,000 ppm$_v$ in yet another embodiment, and between 50 ppm$_v$ and 5,000 ppm$_v$ in yet another embodiment, and between 500 ppm$_v$ and 2,000 ppm$_v$ in another embodiment.

The amount of hydrogen may also be expressed as the weight feed ratio relative to the ethylene feed. For control of melt index it is necessary to adjust the level of hydrogen either as gas mole ratio or the feed ratio.

The one or more reactor pressures in a gas phase process (either single stage or two or more stages) may vary from 690 kPa to 3,448 kPa, and in the range from 1,379 kPa to 2,759 kPa in another embodiment, and in the range from 1,724 kPa to 2,414 kPa in yet another embodiment.

The gas phase reactor can be capable of producing from 227 kg of polymer per hour (kg/hr) to 90,900 kg/hr, and greater than 455 kg/hr in another embodiment, and greater than 4,540 kg/hr in yet another embodiment, and greater than 11,300 kg/hr in yet another embodiment, and greater than 15,900 kg/hr in yet another embodiment, and greater than 22,700 kg/hr in yet another embodiment, and from 29,000 kg/hr to 45,500 kg/hr in yet another embodiment.

In one or more embodiments, a staged reactor employing two or more reactors in series, where one reactor may produce, for example, a high molecular weight component and another reactor may produce a low molecular weight component can be used. In one or more embodiments, the polyolefin can be produced using a staged gas phase reactor. Such commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

A slurry polymerization process can also be used. A slurry polymerization process generally uses pressures in the range of from about 101 kPa to about 5,070 kPa and even greater and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene and comonomers and often hydrogen along with catalyst are added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium can be used the process must be operated above the reaction diluent critical temperature and pressure. In one embodiment, a hexane, isopentane, or isobutane medium can be employed.

One or more co-catalysts, if used, can be combined with the electron donor-free Ziegler-Natta catalyst outside of the polymerization reactor, within the polymerization reactor, or a combination thereof. For example, the electron donor-free Ziegler-Natta catalyst and the co-catalyst can be separately introduced to the polymerization reactor and combined therein. In another example, the electron donor-free Ziegler-Natta catalyst and the co-catalyst can be combined with one another outside or external to the polymerization reactor and introduced as a mixture to the polymerization reactor. In another example, a first portion of the co-catalyst can be combined with the electron donor-free Ziegler-Natta catalyst external the polymerization reactor and a second portion of the co-catalyst can be combined with the mixture of the first portion of the co-catalyst and the electron donor-free Ziegler-Natta catalyst within the polymerization reactor. The co-catalyst can be used in high pressure, solution, slurry, and/or gas phase polymerization processes.

It has been surprisingly and unexpectedly discovered that the inventive catalyst compositions discussed and described herein may produce polyethylene and polyethylene copolymers with increased efficiency and melt flow ratios ($I_{21}/I_2$) when lesser amounts of co-catalyst are employed. Said another way, decreasing the co-catalyst to catalyst ratio may allow for increased catalyst productivity (typically described as pounds of resin produced per pound of catalyst) as well as increased melt flow ratios of the polyethylene or polyethylene copolymers produced. As such in preferred embodiments the concentration of co-catalyst in the co-catalyst/catalyst mixture may be less than about 20 mmol co-catalyst per mmol titanium contained in the electron donor-free Ziegler-Natta catalyst, or less than about 10 mmol co-catalyst per mmol titanium contained in the electron donor-free Ziegler-Natta catalyst, or less than about 5 mmol co-catalyst per mmol titanium contained in the electron donor-free Ziegler-Natta catalyst.

In polymerization processes disclosed herein, it may also be desired to additionally use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependening upon the polymer being produced and the electron donor-free Ziegler-Natta catalyst compound(s) being used. For example, the use of static control agents is disclosed in European Patent No. 0229368 and U.S. Pat. Nos. 4,803,251; 4,555,370; and 5,283,278, and references cited therein.

Control agents such as aluminum stearate may also be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT™ 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE™ (available from Crompton Corporation) or ATMER™ (available from ICI Americas Inc.) family of products).

Other useful continuity additives include, ethyleneimine additives useful in embodiments disclosed herein may include polyethyleneimines having the following general formula:

—(CH₂—CH₂—NH)ₙ— where n can be from about 10 to about 10,000. The polyethyleneimines may be linear, branched, or hyperbranched (i.e., forming dendritic or arborescent polymer structures). They can be a homopolymer or copolymer of ethyleneimine or mixtures thereof (referred to as polyethyleneimine(s) hereafter). Although linear polymers represented by the chemical formula —[CH₂CH₂NH]— may be used as the polyethyleneimine, materials having primary, secondary, and tertiary branches can also be used. Commercial polyethyleneimine can be a compound having branches of the ethyleneimine polymer. Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol™ FG and Lupasol™ WF. Another useful continuity additive can include a mixture of aluminum distearate and an ethoxylated amine type compound, e.g., IRGASTAT™ AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration ranging from about 5 wt % to about 50 wt % or about 10 wt % to about 40 wt %, or about 15 wt % to about 30 wt %. Other useful static control agents and additives are disclosed in U.S. Patent Application Publication No. 2008/0045663.

The continuity additive(s) or static control agent(s) may be added to the reactor in an amount ranging from 0.05 to 200 ppm, based on the weight of all feeds to the reactor, excluding recycle, more preferably in an amount ranging from 2 to 100 ppm; more preferably from 4 to 50 ppm in yet other embodiments.

As discussed above, conventional polyethylenes produced from Ziegler-Natta catalyzed polyethylenes may be, and often are, blended with high pressure low density polyethylenes (LDPE) in an attempt to combine the processibility of the low density polyethylene and the physical attributes of the Ziegler-Natta catalyzed polyethylene. It has been surprisingly and unexpectedly discovered that the Ziegler-Natta catalyzed polyethylenes discussed and described herein can avoid the need or substantially reduce the need for blending LDPE and/or other polymers therewith in order to obtain acceptable processibility. In other words, the polyethylenes discussed and described herein can be used alone or can be blended with one or more additional polymers if so desired. Other suitable polymers that can be blended with the polyethylenes discussed and described herein can include, but are not limited to, high pressure low density polyethylene (LDPE), ethylene vinyl acetate, ethylene ethylacrylate, ethylene acrylic acid, ethylene-styrene interpolymers, polyethylene homopolymers, ethylene/alpha-olefin copolymers made with conventional catalysts and processes known in the art, and the like, or any combination thereof.

A polymer blend containing the polyethylene and one or more other polymers, e.g., LDPE, can be formed using conventional equipment and methods, such as by dry blending the individual components and subsequently melt mixing in a mixer or by mixing the components together directly in a mixer, such as, for example, a Banbury mixer, a Haake mixer, a Brabender internal mixer, or a single or twin-screw extruder, which can include a compounding extruder and a side-arm extruder used directly downstream of a polymerization process. In another example, the polymer blend can be produced in situ using a multistage polymerization reactor arrangement and process. In a multistage reactor arrangement two or more reactors can be connected in series where a mixture of a first polymer, e.g., the polyethylene and catalyst precursor can be transferred from a first reactor to a second reactor where a second polymer, e.g., a metallocene catalyzed polyethylene, can be produced and blended in situ with the first polymer.

A polymer blend that includes the polyethylene can include at least 0.1 percent by weight (wt %) and up to 99.9 wt % of the polyethylene and at least 0.1 wt % and up to 99.9 wt % of the one or more other polymers, based on the combined weight of the polyethylene and the one or more other polymers. For example, the amount of the polyethylene in the polymer blend can range from a low of about 55 wt %, about 60 wt %, about 65 wt %, about 70 wt %, or about 75 wt % to a high of about 80 wt %, about 85 wt %, about 90 wt %, about 95 wt %, or about 99 wt %, based on the combined weight of the polyethylene and the one or more other polymers. In another example, the amount of the polyethylene in the polymer blend can range from about 60 wt % to about 85 wt %, about 75 wt % to about 95 wt %, about 80 wt % to about 95 wt %, about 80 wt % to about 90 wt %, about 85 wt % to about 95 wt %, or about 90 wt % to about 95 wt %, based on the combined weight of the polyethylene and the one or more other polymers.

The polyethylene and/or a polymer blend containing the polyethylene can be used for a wide variety of applications. For example, the polyethylene and/or a polymer blend that includes the polyethylene can be particularly useful in extrusion coating, cast film processes, blown film processes, thermoforming processes, injection molding processes, and lamination processes. Exemplary end uses can include, but are not limited to, coatings, films, film-based products, diaper backsheets, housewrap, wire and cable coatings, articles formed by molding techniques, e.g., injection or blow molding, foaming, casting, and combinations thereof. End uses can also include products made from films, e.g., bags, packaging, and personal care films, pouches, medical products, such as for example, medical films and intravenous (IV) bags. In end uses that include films, either or both of the surfaces of the films produced from the polymer blend can be modified by known and conventional post-forming techniques such as corona discharge, chemical treatment, flame treatment, and the like.

In one example, monolayer films can be prepared from the polyethylene and/or a polymer blend containing the polyethylene. In another example, multilayer films can be prepared from the polyethylene and/or blends thereof. Multilayer films can include one or more layers of film made from polymers other than the polyethylene and/or blends thereof.

To facilitate discussion of different multilayer film structures, the following notation is used herein. Each layer of a film is denoted "A" or "B", where "A" indicates a film layer not containing the polyethylene and "B" indicates a film layer having the polyethylene. Where a film includes more than one A layer or more than one B layer, one or more prime symbols (', ", '", etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner or core layer of the polyethylene disposed between two outer, conventional film layers, i.e. not containing the polyethylene, would be denoted A/B/A'. Similarly, a five-layer film of alternating conventional/polymer blend layers would be denoted A/B/A'/B'/A''. Unless otherwise indicated, the left-to-right or right-to-left order of layers does not matter, nor does the order of prime symbols. For example, an A/B film is equivalent to a B/A film, and an A/A'/B/A'' film is equivalent to an A/B/A'/A'' film, for purposes described herein.

The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 μm each and a B layer of 30 μm is denoted as 20/60/20. Exemplary conventional films can be as discussed and described in, for example, U.S. Pat. Nos. 6,423,420; 6,255,426; 6,265,055; 6,093,480; 6,083,611; 5,922,441; 5,907,943; 5,907,942; 5,902,684; 5,814,399; 5,752,362; 5,749,202; 7,235,607; 7,601,409; RE 38,658; RE 38,429; U.S. Patent Application Publication No. 2007/0260016; and WO Publication No. WO2005/065945.

For the various films described herein, the "A" layer can be formed of any material known in the art for use in multilayer films or in film-coated products. Thus, for example, the A layer can be formed of a second polyethylene (homopolymer or copolymer), i.e., a polyethylene that differs in at least one property from the polyethylenes discussed and described herein, and the second polyethylene can be, for example, a VLDPE, LDPE, LLDPE, MDPE, HDPE, as well as other polyethylenes known in the art. In another example, the A layer can be formed of a polyethylene (homopolymer or copolymer), a non-polyethylene polymer, e.g. a polypropylene, or a blend of a polyethylene and a non-polyethylene polymer.

Illustrative additional polymers (non-polyethylenes) that can be used as or in the A layer can include, but are not limited to, other polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Suitable polyolefins can include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, more preferably $C_3$ to $C_{10}$ alpha-olefins.

In multilayer structures, one or more A layers can also be an adhesion-promoting tie layer, such as PRIMACOR™ ethylene-acrylic acid copolymers available from Dow Chemical Co. and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper.

One or more A layers can be replaced with a substrate layer, such as glass, plastic, paper, metal, etc., or the entire film can be coated or laminated onto a substrate. Thus, although the discussion herein focuses on multilayer films, the films that include the polyethylene can also be used as coatings; e.g., films (monolayer and multilayer) can be coated onto a substrate such as paper, metal, glass, plastic and other materials capable of accepting a coating.

The polymer film can be a multilayer film with any of the following exemplary structures: (a) two-layer films, such as A/B and B/B'; (b) three-layer films, such as A/B/A', A/A'/B, B/A/B' and B/B'/B''; (c) four-layer films, such as A/A'/A''/B, A/A'/B/A'', A/A'/B/W, A/B/A'/B', A/B/B'/A', B/A/A'/B', A/B/B'/B'', B/A/B'/B'' and B/B'/B''/B'''; (d) five-layer films, such as A/A'/A''/A'''/B, A/A'/A''/B/A''', A/A'/B/A''/A''', A/A'/A''/B/B', A/A'/B/A''/B', A/A'/B/B'/A'', A/B/A'/B'/A'', A/B/A'/B'/B'', A/B/A''/B, B/A/A'/A''/B', A/A'/B/B'/B'', A/B/A'/B'/B'', A/B/B'/B''/N, B/A/A'/B'/B'', B/A/B'/A'/B'', B/A/B'/B''/N, A/B/B'/B'''/B'''', B/A/B'/B''/B''', B/B'/A/B''/B''', and B/B'/B''/B'''/B''''; and similar structures for films having six, seven, eight, nine, twenty-four, forty-eight, sixty-four, one hundred, or any other number of layers. It should be appreciated that films having still more layers can be formed using polymer blends, and such films are within the scope of the invention.

The polyethylene and/or a blend thereof can be formed into monolayer and/or multilayer films by any means known including any blown film process known in the art, including bubble and double-bubble processes, cast processes, e.g., cast film and extrusion coating, injection molding, blow-molding, sheet extrusion, and the like. For example, the polyethylene can be extruded in a molten state through a flat die and then cooled to form a film. In another example, the polyethylene can be used as a sealant which can be extrusion coated onto a substrate either in the form of a monolayer or a coextruded extrudate.

In one example, in a typical extrusion coating process, the polyethylene and/or the polyethylene and one or more other polymers, e.g., the polyethylene and a linear polyethylene, can be fed to an extruder where the polyethylene or the polyethylene and one or more other polymers is/are melted, mixed, and extruded through the slit die at a temperature typically in the range of about 275° C. to about 340° C. A mixing screw with barrier elements can be utilized. The extrudate can contact a chill roll which may be high gloss, matt, or embossed. A typical chill roll temperature can range from about 25° C. to 35° C. As is known in the art, a multi-layer co-extrusion can be performed with two or more layers with at least one of the layers including the polyethylene or a polymer blend including the polyethylene. The die width, die gap, extrusion rate, and substrate are chosen to provide the desired extrudate width, thickness, and production rate. Both the substrate and the coated surface can be surface treated with such techniques as are known in the art such as corona or plasma treatment. The extruded surface may be further treated with techniques such as embossing, silane treatment for the preparation of release papers, and other techniques and methods as are known in the art.

In another example, cast films can be prepared using a cast film line machine as follows. Pellets of the polyethylene, alone or mixed with one or more other polymers, can be melted at a temperature typically ranging from about 275° C. to about 325° C. for cast polymers (depending upon the particular polymer(s) used), with the specific melt temperature being chosen to match the melt viscosity of the particular polymer(s). In the case of a multilayer cast film, the two or more different melts can be conveyed to a coextrusion adapter that combines the two or more melt flows into a multilayer, coextruded structure. This layered flow can be distributed through a single manifold film extrusion die to the desired width. The die gap opening is typically about 600 μm (0.025 inches). The material can then be drawn down to the final gauge. The material draw down ratio is typically about 21:1 for 20 μm (0.8 mils) films. A vacuum box, edge pinners, air knife, or any combination thereof, can be used to pin the melt exiting the die opening to a primary chill roll maintained at about 32° C. (80° F.). The resulting film can be collected on a winder. The film thickness can be monitored by a gauge monitor, and the film can be edge trimmed by a trimmer. A typical cast line rate is from about 76.2 m to about 610 m (250 ft to about 2,000 feet) per minute. One skilled in the art will appreciate that higher rates may be used for similar processes such as extrusion coating. One or more optional treaters can be used to surface treat the film, if desired. Such chill roll casting processes and apparatus can be as discussed and described in, for example, The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed, such as extrusion coating.

The total thickness of the resulting monolayer and/or multilayer films can vary based, at least in part, on the particular end use application. A total film thickness of about 5 μm to about 100 μm, more typically about 10 μm to about 50 μm, can be suitable for most applications. Those skilled in the art will appreciate that the thickness of individual layers for multilayer films can be adjusted based on desired end use performance, end use product, equipment capability, and other factors.

Films made from the polyethylene or a polymer blend of the polyethylene and one or more other polymers as discussed and described herein and/or the process of making the films can have improved properties. For example, films that include the polyethylene can be produced with reduced motor load and/or increased draw-down rates during extrusion of the film as compared to traditional polymer blends. The reduction in motor load depends on the particular equipment used for extrusion. It has been surprisingly and unexpectedly discovered that the polyethylene and/or a polymer blend of the polyethylene and LDPE discussed and described herein can substantially reduce the motor load required to extrude the polyethylene and/or the polymer blend by about 10% or more, about 12% or more, about 14% or more, about 16% or more, about 18% or more, about 20% or more, about 22% or more, about 24% or more, about 26% or more, about 28% or more, or about 30% or more or more as compared to a comparative polyethylene and/or a comparative polymer blend containing the same LDPE and a traditional polyethylene when both the polyethylene and the comparative polyethylene have a melt index ($I_2$) of about 1 g/10 min and the LDPE has a melt index ($I_2$) of about 1.9 g/10 min.

A variety of additives can be employed in the polyethylene compositions and/or polymer blends containing the polyethylene discussed and described herein depending upon the performance characteristics required by a particular application. The additives can be included in the polyethylene and/or in a product formed from the polyethylene, such as an extruded film, as desired. In one example, the polyethylene discussed and described herein can include from about 0.1 wt % to about 40 wt % additives, based on the total weight of the polyethylene. In another example, the polyethylene can include from about 5 wt % to about 25 wt % additives, based on the total weight of the polyethylene.

Examples of such additives include, but are not limited to, tackifiers, waxes, functionalized polymers such as acid modified polyolefins and/or anhydride modified polyolefins, antioxidants (e.g., hindered phenolics such as IRGANOX® 1010 or IRGANOX® 1076 available from Ciba-Geigy), (e.g., IRGAFOS® 168 available from Ciba-Geigy), oils, compatabilizers, fillers, adjuvants, adhesion promoters, plasticizers, low molecular weight polymers, blocking agents, antiblocking agents, anti-static agents, release agents, anti-cling additives, colorants, dyes, pigments, processing aids, UV stabilizers, heat stabilizers, neutralizers, lubricants, surfactants, nucleating agents, flexibilizers, rubbers, optical brighteners, colorants, diluents, viscosity modifiers, oxidized polyolefins, and any combination thereof. Additives can be combined with one or both of the first or linear polyethylene and/or may be combined with the blend of the first and linear polyethylene as further individual components, in masterbatches, or in any combination thereof.

Examples

To provide a better understanding of the foregoing discussion, the following non-limiting examples are provided. All parts, proportions and percentages are by weight unless otherwise indicated.

Electron donor-free Ziegler Natta catalysts were used to produce the polymers of Examples 1-19. Ziegler-Natta type catalysts were used to produce the comparative examples C1-C17. The electron donor-free Ziegler-Natta catalyst used to produce the polymers of Examples 1-9 was prepared according to the following procedure. About 613 g of Davison 955 silica purchased from W. R. Grace & Co. that had been previously calcined at 600° C. was charged to a 6 liter mix tank under an inert nitrogen atmosphere. About 2.3 kg of dry, degassed hexane was added to the mix tank and the slurry was heated to a temperature of about 60° C. with mixing. About 865 g of a 1.2 M n-butylethylmagnesium (BEM) solution in heptane (19.6 wt % BEM) was added to the silica/hexane slurry over the course of about 1 hour and was mixed for an additional hour at 60° C. to produce a first reacted product. About 198 g of dimethyldichlorosilane (DMDCS) was added to the first reacted product over the course of about 1 hour and was mixed for an additional hour at 60° C. to produce a second reacted product. About 290 g of titanium (IV) chloride was diluted with about 100 g of hexane before being added to the second reacted product over the course of about 1 hour and was held at a temperature of about 60° C. and further mixed for about 1 hour and then the volatiles were removed therefrom under reduced pressure to produce the electron donor-free Ziegler-Natta catalyst capable of introducing Long Chain Branching (LCB) in the polymer. The LCB-capable electron donor-free Ziegler-Natta catalyst was in the form of a free-flowing powder. A second batch of the same catalyst used to produce the polymers of Examples 1-9 was prepared and was used to produce the polymers of Examples 16-19. The second batch of catalyst was prepared according to the same procedure as the first batch. Both catalysts were analyzed for Ti, Mg, Cl⁻ and hexane content, the results of which are shown in Table 1 below.

TABLE 1

| Catalyst | Cl⁻ (mmol/g) | Mg (mmol/g) | Ti (mmol/g) | Mg/Ti | Residual Hexane (wt %) |
|---|---|---|---|---|---|
| Used to Produce the Polymers of Examples 1-9 | 4.82 | 1.58 | 0.86 | 1.84 | 0.04 |

TABLE 1-continued

| Catalyst | Cl⁻ (mmol/g) | Mg (mmol/g) | Ti (mmol/g) | Mg/Ti | Residual Hexane (wt %) |
|---|---|---|---|---|---|
| Used to Produce the Polymers of Examples 16-19 | 4.24 | 1.72 | 0.70 | 2.46 | <0.01 |

The electron donor-free Ziegler-Natta catalyst used to prepare the polymers of Examples 10, 11, and 13-15 was prepared according to the following procedure. About 415 g of Davison 955 silica purchased from W. R. Grace & Co. that had been previously calcined at 600° C. was added to a 6 liter mix tank under an inert nitrogen atmosphere. About 1.4 kg of dry, degassed hexane was added to the mix tank and the slurry was heated to a temperature of about 30° C. with mixing. About 524 g of a 1.3 M n-butylethylmagnesium (BEM) solution in heptane (19.9 wt % BEM) was added to the silica/hexane slurry over the course of about 30 minutes and was mixed for an additional 19 hours at 30° C. to produce a first reacted product. About 1,210 g of a 1.0 M ethylaluminum dichloride (EADC) solution in hexane (17.4 wt %) was added over a 30 minute period to the first reacted product and was mixed for an additional 4 hours at 30° C. to produce a second reacted product. About 21.6 g of tetraisopropyltitanate (TIPT) was added to the second reacted product and mixed for an additional 16 hours at 30° C. and then the volatiles were removed under reduced pressure to form the electron donor-free Ziegler-Natta catalyst. The electron donor-free Ziegler-Natta catalyst was a free-flowing powder.

The electron donor-free Ziegler-Natta catalyst used to prepare the polymer of Example 12 was prepared according to the following procedure. About 465 g of Davison 955 silica purchased from W. R. Grace & Co. that had been previously calcined at about 600° C. was added to a 6 liter mix tank under an inert atmosphere of nitrogen. About 1.5 kg of dry, degassed hexane was added to the mix tank and the slurry was heated to a temperature of about 30° C. with mixing. About 1,200 g of a 1.2 M n-butylethylmagnesium (BEM) solution in heptane (19.6 wt % BEM) was added to the silica/hexane slurry over the course of about 30 minutes with mixing to produce a first mixture. The first mixture was mixed for an additional 19 hours at 30° C., after which the solids were filtered off. The solids were then suspended in about 1.6 liters of hexane and mixed for about five minutes and then filtered off. This wash/filter cycle was repeated two additional times for a total of three wash/filter cycles. About 1.4 liters of hexane was added to the solids and the slurry was heated to about 30° C. with mixing. About 1,630 g of a 1.0 M ethylaluminum dichloride (EADC) solution in hexane (17.4 wt %) was added over a 30 minute period to produce a second mixture. The second mixture was mixed for an additional 4 hours at a temperature of about 30° C. About 24.2 g of tetraisopropyltitanate (TIPT) was added to the second mixture to produce the electron donor-free Ziegler-Natta catalyst or catalyst composition. The electron donor-free Ziegler-Natta catalyst composition was mixed for an additional 16 hours at 30° C., after which the solids were filtered off. The solids were then suspended in about 1.6 liters of hexane and mixed for about five minutes before being filtered off. This wash/filter cycle was repeated two additional times for a total of three wash/filter cycles. Next, the volatiles of the electron donor-free Ziegler-Natta catalyst composition were removed under reduced pressure. A catalyst in the form of a free-flowing powder was recovered.

It should be noted that the electron donor-free Ziegler-Natta catalysts used to produce the polymers of Examples 1-19 were prepared without the addition of any electron donors as discussed and described above. As such, the Ziegler-Natta catalyst can be referred to as a "donor free catalyst." The electron donor-free Ziegler-Natta catalysts used to prepare the polymers of Examples 10-15 were analyzed for Ti, Mg, Al, and content, the results of which are shown in Table 2 below.

TABLE 2

| Catalyst | Cl⁻ (mmol/g) | Mg (mmol/g) | Ti (mmol/g) | Al (mmol/g) | Mg/Ti |
|---|---|---|---|---|---|
| Used to Produce the Polymers of Examples 10, 11, and 13-15 | 4.41 | 1.20 | 0.12 | 2.22 | 10.30 |
| Used to Produce the Polymer of Example 12 | 4.45 | 1.91 | 0.12 | 0.95 | 15.90 |

A gas phase fluidized bed polymerization reactor of the UNIPOL™ PE Process design having a nominal diameter of about 35.6 cm (about 14 inches) was used for the continuous production of both linear low density polyethylene (LLDPE) and high density polyethylene (HDPE). In these cases, the cycle gas blower was situated upstream of the cycle gas heat exchanger in the gas recirculation loop but the two could have been reversed to reduce the gas temperature where it entered the heat exchanger. The cycle pipe was about 5.1 cm (about 2 inches) in diameter and its flow rate was manipulated by a ball valve in the cycle line to control the superficial gas velocity in the fluid bed at the desired rate. Monomers and gaseous components were added upstream of the cooler before the blower, at the blower impeller or after the blower. The electron donor-free Ziegler-Natta catalyst system was continuously added in discrete small aliquots via an about 0.317 cm (about 0.125 inch) tube directly to the fluidized bed at a height about 0.1 m to 2 m above the distributor plate and most preferably at about the 0.2 m to about 1.2 m range using a nitrogen carrier gas flow at a location about 15% to about 50% of the reactor diameter. Triethylaluminum (TEAl) was utilized as a co-catalyst and added to the reactor as a solution in hexane. Where a continuity additive was used, a 50/50 mixture of a hydroxyethyl stearyl amine and aluminum distearate continuity additive slurry was metered to the reactor from an agitated slurry feeding vessel to maintain the desired concentration in the bed based on polymer production rate using an inert hydrocarbon, such as isopentane, as a carrier medium. Polymer product was withdrawn periodically from the reactor through a discharge isolation tank in aliquots of about 0.2 kg to 5 kg to maintain a desired approximate average fluidized bed level or weight.

The polymerization conditions and results for the production of the polymers of Examples 1-19 is shown in Tables 3A-C below. For $H_2/C_2$ mass feed ratio in the tables below the term mlb/lb refers to millipounds of hydrogen per pound of ethylene.

TABLE 3A

| Examples | Ex. 1 | Ex. 2 | Ex. 3 | Ex. 4 | Ex. 5 | Ex. 6 | Ex. 7 |
|---|---|---|---|---|---|---|---|
| Polymer Type | HDPE | HDPE | HDPE | HDPE | HDPE | HDPE | HDPE |
| Catalyst Ti Content (wt %) | 4.11 | 4.11 | 4.11 | 4.11 | 4.11 | 4.11 | 4.11 |
| Catalyst Al Content (wt %) | 0.11 | 0.11 | 0.11 | 0.11 | 0.11 | 0.11 | 0.11 |
| Catalyst Mg Content (wt %) | 3.84 | 3.84 | 3.84 | 3.84 | 3.84 | 3.84 | 3.84 |
| Prod Rate (lbs/hr) | 34.1 | 38 | 33.8 | 37 | 38.2 | 39.5 | 36 |
| Residence Time (hrs) | 3.2 | 2.9 | 3.3 | 3 | 3 | 2.8 | 3 |
| $C_2$ Partial Pressure (psia) | 120 | 120 | 101 | 120 | 120 | 120 | 120 |
| $H_2/C_2$ (m/m) | 0.135 | 0.180 | 0.182 | 0.182 | 0.282 | 0.218 | 0.169 |
| $C_4/C_2$ Conc. Ratio (m/m) | 0.0113 | 0.0178 | 0.0126 | 0.0171 | 0.0089 | 0.0205 | 0.0224 |
| $C_6/C_2$ Conc. Ratio (m/m) | — | — | — | — | — | — | — |
| $H_2/C_2$ Mass Feed Ratio (mlb/lb) | 1.21 | 1.86 | 1.94 | 1.86 | 3.07 | 2.09 | 1.78 |
| $C_4/C_2$ Mass Feed Ratio (lb/lb) | 0.0068 | 0.0096 | 0.0096 | 0.0095 | 0.0066 | 0.0108 | 0.0110 |
| $C_6/C_2$ Mass Feed Ratio (lb/lb) | — | — | — | — | — | — | — |
| Isopentane (mole %) | 0.19 | 0.17 | 0.3 | 0.16 | 0.28 | 0.3 | 0.3 |
| RX Pressure (psig) | 346 | 346 | 346 | 346 | 346 | 346 | 346 |
| RX Temperature (° C.) | 102 | 102 | 102 | 102 | 102 | 102 | 102 |
| Gas Velocity (ft/sec) | 1.9 | 1.91 | 1.66 | 1.93 | 1.97 | 1.96 | 1.96 |
| Bed Weight (lbs) | 110 | 110 | 111 | 110 | 115 | 110 | 110 |
| Fluid Bulk Density (lb/ft$^3$) | 13.9 | 13.3 | 12.6 | 13.2 | 15 | 12.5 | 12.2 |
| Co-catalyst ID | TEAl | TEAl | TEAl | TEAl | TEAl | TEAl | TEAl |
| Co-catalyst Conc. (wt %) | 1.0 | 1.0 | 1.0 | 1.0 | 1.0 | 1.0 | 1.0 |
| Co-catalyst Feed, (cc/hr) | 75.1 | 75 | 135.3 | 74.8 | 151.5 | 150.5 | 150.3 |
| Reactor Co-catalyst Conc. - Prod. Rate Basis (ppmw) | 30 | 27 | 55 | 28 | 54 | 52 | 57 |
| Cont. Additive | None | None | None | None | None | None | None |
| Continuity Additive Conc. (wt %) | — | — | — | — | — | — | — |
| Continuity Additive Feed (cc/hr) | — | — | — | — | — | — | — |
| Reactor Cont. Additive Conc. - Prod Rate Basis (ppmw) | — | — | — | — | — | — | — |
| Cat. Prod. - Ti ICPES Basis (g PE/g Catalyst) | 9,536 | 10,883 | — | — | — | — | — |
| Material Balance Cat. Prod, (g PE/g Catalyst) | 13,008 | 15,077 | 13,967 | 14,680 | 10,464 | 14,070 | 15,220 |
| $I_2$ Melt Index (dg/min) | 0.40 | 1.01 | 1.02 | 1.03 | 3.24 | 2.12 | 1.13 |
| MFR, $I_{21}/I_2$ | 40.0 | 37.8 | 36.4 | 38.8 | 33.8 | 33.8 | 35.4 |
| Polymer Density (g/cc) | 0.9548 | 0.9549 | 0.9555 | 0.9544 | 0.9597 | 0.9562 | 0.9532 |

TABLE 3B

| Examples | Ex. 8 | Ex. 9 | Ex. 10 | Ex. 11 | Ex. 12 | Ex. 13 |
|---|---|---|---|---|---|---|
| Polymer Type | HDPE | HDPE | HDPE | HDPE | HDPE | HDPE |
| Catalyst Ti Content (wt %) | 4.11 | 4.11 | 0.59 | 0.59 | 0.56 | 0.59 |
| Catalyst Al Content (wt %) | 0.11 | 0.11 | 2.57 | 2.57 | 5.99 | 2.57 |
| Catalyst Mg Content (wt %) | 3.84 | 3.84 | 4.65 | 4.65 | 2.92 | 4.65 |
| Prod Rate (lbs/hr) | 36.4 | 33.5 | 33.7 | 29.8 | 23.9 | 32.2 |
| Residence Time (hrs) | 3 | 3.3 | 3.4 | 3.9 | 4.8 | 3.6 |
| $C_2$ Partial Pressure (psia) | 120 | 120 | 120 | 120 | 120 | 120 |
| $H_2/C_2$ (m/m) | 0.155 | 0.162 | 0.245 | 0.153 | 0.258 | 0.16 |
| $C_4/C_2$ Conc. Ratio (m/m) | 0.0182 | 0.0141 | 0.0096 | 0.0094 | 0.0082 | 0.0090 |
| $C_6/C_2$ Conc. Ratio (m/m) | — | — | — | — | — | — |
| $H_2/C_2$ Mass Feed Ratio (mlb/lb) | 1.61 | 1.90 | 2.72 | 1.66 | 3.48 | 1.85 |
| $C_4/C_2$ Mass Feed Ratio (lb/lb) | 0.0097 | 0.0086 | 0.0095 | 0.0074 | 0.0082 | 0.0076 |
| $C_6/C_2$ Mass Feed Ratio (lb/lb) | — | — | — | — | — | — |
| Isopentane (mole %) | 0.31 | 0.3 | 0.16 | 0.18 | 0.75 | 0.17 |
| RX Pressure (psig) | 346 | 346 | 347 | 347 | 347 | 347 |
| RX Temperature (° C.) | 102 | 102 | 102 | 102 | 102 | 102 |
| Gas Velocity (ft/sec) | 1.95 | 1.95 | 1.8 | 1.8 | 1.8 | 1.81 |
| Bed Weight (lbs) | 109 | 109 | 115 | 115 | 115 | 115 |
| Fluid Bulk Density (lb/ft$^3$) | 12.3 | 12.6 | 17.9 | 17.8 | 16.8 | 17.7 |
| Co-catalyst ID | TEAl | TEAl | TEAl | TEAl | TEAl | TEAl |
| Co-catalyst Conc. (wt %) | 1.0 | 1.0 | 1.0 | 1.0 | 1.0 | 1.0 |
| Co-catalyst Feed (cc/hr) | 149.9 | 149.9 | 74.8 | 74.9 | 373.9 | 74.8 |
| Reactor Co-catalyst Conc. - Prod. Rate Basis (ppmw) | 56 | 61 | 30 | 34 | 214 | 32 |
| Cont. Additive | None | None | None | None | None | None |
| Continuity Additive Conc. (wt %) | — | — | — | — | — | — |
| Continuity Additive Feed (cc/hr) | — | — | — | — | — | — |
| Reactor Cont. Additive Conc. - Prod Rate Basis (ppmw) | — | — | — | — | — | — |
| Cat. Prod. - Ti ICPES Basis (g PE/g Catalyst) | — | 9,222 | — | — | 1,422 | 3,758 |
| Material Balance Cat. Prod, (g PE/g Catalyst) | 14,460 | 12,184 | 4,629 | 3,801 | 1,705 | 4,106 |
| $I_2$ Melt Index (dg/min) | 0.86 | 0.84 | 0.40 | 0.43 | 0.94 | 0.960 |

TABLE 3B-continued

| Examples | Ex. 8 | Ex. 9 | Ex. 10 | Ex. 11 | Ex. 12 | Ex. 13 |
|---|---|---|---|---|---|---|
| MFR, $I_{21}/I_2$ | 37.7 | 37.3 | 33.0 | 32.8 | 30.6 | 30.5 |
| Polymer Density (g/cc) | 0.9544 | 0.9553 | 0.9531 | 0.9541 | 0.9531 | 0.9541 |

TABLE 3C

| Examples | Ex. 14 | Ex. 15 | Ex. 16 | Ex. 17 | Ex. 18 | Ex. 19 |
|---|---|---|---|---|---|---|
| Polymer Type | HDPE | HDPE | HDPE | HDPE | LLDPE | LLDPE |
| Catalyst Ti Content (wt %) | 0.59 | 0.59 | 3.34 | 3.34 | 3.34 | 3.34 |
| Catalyst Al Content (wt %) | 2.57 | 2.57 | 0.167 | 0.167 | 0.167 | 0.167 |
| Catalyst Mg Content (wt %) | 4.65 | 4.65 | 4.18 | 4.18 | 4.18 | 4.18 |
| Prod Rate (lbs/hr) | 31.3 | 33 | 35.1 | 30.4 | 36.1 | 32.1 |
| Residence Time (hrs) | 3.6 | 3.4 | 2.81 | 3.05 | 2.89 | 2.9 |
| $C_2$ Partial Pressure (psia) | 120 | 120 | 120.2 | 120.1 | 80 | 80 |
| $H_2/C_2$ (m/m) | 0.119 | 0.121 | 0.1583 | 0.1796 | 0.1248 | 0.1102 |
| $C_4/C_2$ Conc. Ratio (m/m) | 0.0052 | 0.0048 | 0.0178 | 0.0175 | — | 0.376 |
| $C_6/C_2$ Conc. Ratio (m/m) | — | — | — | — | 0.139 | — |
| $H_2/C_2$ Mass Feed Ratio (mlb/lb) | 1.09 | 1.13 | 3.52 | 3.65 | 1.92 | 1.79 |
| $C_4/C_2$ Mass Feed Ratio (lb/lb) | 0.0052 | 0.0050 | 0.0135 | 0.0128 | — | 0.191 |
| $C_6/C_2$ Mass Feed Ratio (lb/lb) | — | — | — | — | 0.160 | — |
| Isopentane (mole %) | 0.18 | 0.18 | 0.19 | 0.23 | 1.74 | 1.28 |
| RX Pressure (psig) | 347 | 347 | 346.4 | 346.6 | 346.6 | 346 |
| RX Temperature (° C.) | 102 | 102 | 102 | 102 | 88 | 88 |
| Gas Velocity (ft/sec) | 1.82 | 1.85 | 1.81 | 1.73 | 1.93 | 1.8 |
| Bed Weight (lbs) | 114 | 113 | 99 | 93 | 104 | 93 |
| Fluid Bulk Density (lb/ft$^3$) | 17.5 | 18.2 | 10.3 | 11.7 | 13.4 | 10.8 |
| Co-catalyst ID | TEAl | TEAl | TEAl | TEAl | TEAl | TEAl |
| Co-catalyst Conc. (wt %) | 1.0 | 1.0 | 1.0 | 1.0 | 1.0 | 1.0 |
| Co-catalyst Feed (cc/hr) | 75.3 | 39.9 | 135.6 | 135.6 | 129.2 | 135.5 |
| Reactor Co-catalyst Conc. - Prod. Rate Basis (ppmw) | 33 | 17 | 53 | 61 | 49 | 58 |
| Cont. Additive | None | None | None | None | Yes | Yes |
| Continuity Additive Conc. (wt %) | — | — | — | — | 15 | 15 |
| Continuity Additive Feed (cc/hr) | — | — | — | — | 1.5 | 0.5 |
| Reactor Cont. Additive Conc. - Prod Rate Basis (ppmw) | — | — | — | — | 15.6 | 5.8 |
| Cat. Prod. - Ti ICPES Basis (g PE/g Catalyst) | 4,014 | 4,538 | — | 10,050 | 9,386 | 8,743 |
| Material Balance Cat. Prod, (g PE/g Catalyst) | 3,992 | 4,205 | 13,181 | 14,495 | 10,300 | 11,438 |
| $I_2$ Melt Index (dg/min) | 1.00 | 2.48 | 0.72 | 0.94 | 0.99 | 1.00 |
| MFR, $I_{21}/I_2$ | 31.0 | 32.8 | 40.7 | 37.5 | 42.0 | 37.3 |
| Polymer Density (g/cc) | 0.9550 | 0.9576 | 0.9525 | 0.9538 | 0.9216 | 0.9180 |

The UCAT® A2020 (available from Univation Technologies LLC) was used to produce the polymers of comparative examples C1 and C2. The SYLOPOL® 5006 catalyst, acquired from Grace Davison, was used to produce the polymers of comparative examples C3-C11. The polymerization results for comparative examples C1-C11 are shown in Tables 4A-B below.

TABLE 4A

| Examples | C1 | C2 | C3 | C4 | C5 | C6 |
|---|---|---|---|---|---|---|
| Polymer Type | HDPE | HDPE | HDPE | HDPE | HDPE | HDPE |
| Catalyst Ti Content (wt %) | 1.06 | 1.06 | 1.31 | 1.31 | 1.31 | 1.31 |
| Catalyst Al Content (wt %) | 2.93 | 2.93 | 5.10 | 5.10 | 5.10 | 5.10 |
| Catalyst Mg Content (wt %) | 1.66 | 1.66 | 3.17 | 3.17 | 3.17 | 3.17 |
| Prod Rate (lbs/hr) | 34.2 | 38.7 | 38.3 | 35.2 | 33.3 | 38.7 |
| Residence Time (hrs) | 3.2 | 2.9 | 3.0 | 3.3 | 3.5 | 3.0 |
| $C_2$ Partial Pressure (psia) | 100 | 120 | 120 | 120 | 120 | 120 |
| $H_2/C_2$ (m/m) | 0.418 | 0.180 | 0.257 | 0.268 | 0.360 | 0.346 |
| $C_4/C_2$ Conc. Ratio (m/m) | 0.0109 | 0.0078 | 0.0062 | 0.0056 | 0.0078 | 0.0102 |
| $C_6/C_2$ Conc. Ratio (m/m) | — | — | — | — | — | — |
| $H_2/C_2$ Mass Feed Ratio (mlb/lb) | 1.780 | 1.85 | 3.03 | 3.17 | 5.17 | 4.60 |
| $C_4/C_2$ Mass Feed Ratio (lb/lb) | 0.0078 | 0.0053 | 0.0051 | 0.0051 | 0.0062 | 0.0073 |
| $C_6/C_2$ Mass Feed Ratio (lb/lb) | — | — | — | — | — | — |
| Isopentane (mole %) | 3.55 | 4.11 | 0.38 | 0.29 | 0.28 | 0.29 |
| RX Pressure (psig) | 347 | 347 | 347 | 347 | 347 | 347 |
| RX Temperature (° C.) | 102 | 102 | 102 | 102 | 102 | 102 |
| Gas Velocity (ft/sec) | 2.00 | 1.98 | 2.00 | 1.99 | 1.97 | 1.97 |
| Bed Weight (lbs) | 111 | 112 | 115 | 115 | 116 | 115 |
| Fluid Bulk Density (lb/ft$^3$) | 15.2 | 15.3 | 17.6 | 17.5 | 17.6 | 17.4 |
| Co-catalyst ID | TEAl | TEAl | TEAl | TEAl | TEAl | TEAl |

TABLE 4A-continued

| Examples | C1 | C2 | C3 | C4 | C5 | C6 |
|---|---|---|---|---|---|---|
| Co-catalyst Conc. (wt %) | 2.5 | 2.5 | 1.0 | 1.0 | 1.0 | 1.0 |
| Co-catalyst Feed (cc/hr) | 299.0 | 300.1 | 150.6 | 149.6 | 150.5 | 150.3 |
| Reactor Co-catalyst Conc. - Prod Rate Basis (ppmw) | 299 | 265 | 54 | 58 | 62 | 53 |
| Cont. Additive | None | None | None | None | None | None |
| Continuity Additive Conc. (wt %) | — | — | — | — | — | — |
| Continuity Additive Feed (cc/hr) | — | — | — | — | — | — |
| Reactor Cont. Additive Conc. - Prod Rate Basis (ppmw) | — | — | — | — | — | — |
| Cat. Prod. - Ti ICPES Basis (g PE/g Catalyst) | — | 3,464 | — | 5,928 | — | — |
| Material Balance Cat. Prod, (g PE/g Catalyst) | 6,734 | 5,518 | 13,421 | 11,861 | 10,809 | 12,538 |
| $I_2$ Melt Index (dg/min) | 0.94 | 1.03 | 0.41 | 0.43 | 1.05 | 1.04 |
| MFR, $I_{21}/I_2$ | 24.4 | 23.6 | 35.0 | 35.8 | 32.5 | 33.4 |
| Polymer Density (g/cc) | 0.9529 | 0.9545 | 0.9532 | 0.9537 | 0.9544 | 0.9538 |

TABLE 4B

| Examples | C7 | C8 | C9 | C10 | C11 |
|---|---|---|---|---|---|
| Polymer Type | HDPE | HDPE | HDPE | HDPE | HDPE |
| Catalyst Ti Content (wt %) | 1.31 | 1.31 | 1.31 | 1.31 | 1.31 |
| Catalyst Al Content (wt %) | 5.10 | 5.10 | 5.10 | 5.10 | 5.10 |
| Catalyst Mg Content (wt %) | 3.17 | 3.17 | 3.17 | 3.17 | 3.17 |
| Prod Rate (lbs/hr) | 37.3 | 36.7 | 39.1 | 42.8 | 17.9 |
| Residence Time (hrs) | 3.1 | 3.2 | 3.0 | 2.7 | 6.4 |
| $C_2$ Partial Pressure (psia) | 120 | 120 | 120 | 120 | 100 |
| $H_2/C_2$ (m/m) | 0.340 | 0.334 | 0.338 | 0.404 | 0.344 |
| $C_4/C_2$ Conc. Ratio (m/m) | 0.0096 | 0.0092 | 0.0096 | 0.0015 | 0.0164 |
| $C_6/C_2$ Conc. Ratio (m/m) | — | — | — | — | — |
| $H_2/C_2$ Mass Feed Ratio (mlb/lb) | 4.85 | 4.66 | 4.62 | 5.65 | 5.23 |
| $C_4/C_2$ Mass Feed Ratio (lb/lb) | 0.0071 | 0.0070 | 0.0071 | 0.0024 | 0.0163 |
| $C_6/C_2$ Mass Feed Ratio (lb/lb) | — | — | — | — | — |
| Isopentane (mole %) | 0.14 | 0.28 | 0.53 | 0.26 | 0.33 |
| RX Pressure (psig) | 347 | 347 | 347 | 347 | 347 |
| RX Temperature (° C.) | 102 | 102 | 102 | 102 | 100 |
| Gas Velocity (ft/sec) | 1.97 | 1.97 | 1.97 | 1.97 | 1.97 |
| Bed Weight (lbs) | 116 | 116 | 117 | 118 | 115 |
| Fluid Bulk Density (lb/ft$^3$) | 16.2 | 17.3 | 17.8 | 18.2 | 17.3 |
| Co-catalyst ID | TEAl | TEAl | TEAl | TEAl | TEAl |
| Co-catalyst Conc. (wt %) | 1.0 | 1.0 | 1.0 | 1.0 | 1.0 |
| Co-catalyst Feed (cc/hr) | 74.8 | 149.7 | 300.4 | 149.5 | 150.0 |
| Reactor Co-catalyst Conc. - Prod Rate Basis (ppmw) | 27 | 56 | 105 | 48 | 114 |
| Cont. Additive | None | None | None | None | None |
| Continuity Additive Conc. (wt %) | — | — | — | — | — |
| Continuity Additive Feed (cc/hr) | — | — | — | — | — |
| Reactor Cont. Additive Conc. - Prod Rate Basis (ppmw) | — | — | — | — | — |
| Cat. Prod. - Ti ICPES Basis (g PE/g Catalyst) | 8,037 | 6,121 | 4,651 | — | — |
| Material Balance Cat. Prod, (g PE/g Catalyst) | 14,653 | 11,890 | 8,715 | 9,699 | 10,182 |
| $I_2$ Melt Index (dg/min) | 0.91 | 0.78 | 1.03 | 1.03 | 1.04 |
| MFR, $I_{21}/I_2$ | 33.4 | 34.4 | 32.3 | 37.8 | 31.9 |
| Polymer Density (g/cc) | 0.9531 | 0.9535 | 0.9539 | 0.9590 | 0.9507 |

The polymer of comparative example C12 was TUFLIN® HS-7098 NT 7 (a copolymer of ethylene and hexene) and was acquired from The Dow Chemical Company. The polymer of comparative example C13 was DFDA 7047 NT 7 (a copolymer of ethylene and butene) and was acquired from The Dow Chemical Company. The polymer of comparative example C14 was produced with LDPE 501i polyethylene and was acquired from The Dow Chemical Company. The polymer of comparative example C16 was AFFINITY™ PL 1880G (a copolymer of ethylene and octene) and was acquired from The Dow Chemical Company. The polymer of comparative example C17 was EXCEED® 1018CA (a copolymer of ethylene and hexene) and was acquired from ExxonMobil Chemical.

Comparative example C15 was produced using a 2-liter autoclave gas phase reactor. The following procedure was used to produce the polymer of comparative example C15. The sealed reactor was cycled several times through a heat and nitrogen purge step to ensure that the reactor was clean and under an inert nitrogen atmosphere. About 1 L of liquid isobutane was added to the sealed reactor at ambient temperature. A charge of about 1.3 ml of 1M triethyl aluminum was added to the reactor from a shot cylinder using nitrogen pressure. The reactor agitator was turned on and set to 800 rpm. Hydrogen (3.83 L) and 20 ml of 1-hexene were added to the reactor. The reactor was heated to a temperature of about 85° C. and ethylene was added to achieve a 125 psi partial pressure. A nominal 35 mg charge of UCAT® A2020

(available from Univation Technologies LLC) was added to the reactor from a shot cylinder using nitrogen pressure. The polymerization proceeded at about 85° C. and ethylene was added continuously to maintain the reactor at constant pressure. After one hour, the reactor was cooled to ambient temperature, vented, opened, and the polymer product was recovered.

Selected properties for the polymers of Examples 1-19 and comparative examples C1-C17 are shown in Table 5 below.

the comparative examples C3, C9, and C12-C15 includes all three properties in combination with one another. Indeed, it is believed that polyethylenes having the unique combination of MWD, SSH, MFR, and heterogeneous short chain branching distribution associated with Ziegler-Natta polymers are unique to the inventive LCB-capable donor-free Ziegler-Natta catalyst polyethylenes.

Another property measured for selected examples, namely, Examples 16-19 and comparative examples C12, C13, and C16 was the comonomer heterogeneity index

TABLE 5

| Ex. | Comonomer | MI ($I_2$) | Density (g/cm$_3$) | Mw | Mz | MWD | MFR ($I_{21}/I_2$) | MS (cN) | EVF Slope (SSH) | CHI |
|---|---|---|---|---|---|---|---|---|---|---|
| Ex. 1 | Butene | 0.40 | 0.9548 | 143760 | 615200 | 5.99 | 40.0 | 14.0 | 0.928 | — |
| Ex. 2 | Butene | 1.01 | 0.9549 | 121260 | 570400 | 6.26 | 37.8 | 8.5 | — | — |
| Ex. 3 | Butene | 1.02 | 0.9555 | 120310 | 520500 | 5.84 | 36.4 | 7.3 | — | — |
| Ex. 4 | Butene | 1.03 | 0.9544 | 122190 | 575100 | 6.27 | 38.8 | 8.5 | — | — |
| Ex. 5 | Butene | 3.24 | 0.9597 | 94390 | 404600 | 5.88 | 33.8 | 3.3 | — | — |
| Ex. 6 | Butene | 2.12 | 0.9562 | 98230 | 382100 | 5.50 | 33.8 | 4.8 | — | — |
| Ex. 7 | Butene | 1.13 | 0.9532 | 109100 | 389300 | 4.97 | 35.4 | 6.7 | — | — |
| Ex. 8 | Butene | 0.86 | 0.9544 | 118900 | 436600 | 5.48 | 37.7 | 8.3 | — | — |
| Ex. 9 | Butene | 0.84 | 0.9553 | 120400 | 439100 | 5.03 | 37.3 | 8.0 | 1.284 | — |
| Ex. 10 | Butene | 0.40 | 0.9531 | 165200 | 629200 | 6.08 | 33.0 | 6.8 | 0.452 | — |
| Ex. 11 | Butene | 0.43 | 0.9541 | 162830 | 617600 | 6.14 | 32.8 | 6.5 | — | — |
| Ex. 12 | Butene | 0.94 | 0.9531 | 135950 | 524700 | 5.94 | 30.6 | 3.7 | — | — |
| Ex. 13 | Butene | 0.96 | 0.9541 | 134060 | 551900 | 6.08 | 30.5 | 3.7 | — | — |
| Ex. 14 | Butene | 1.00 | 0.9550 | 134250 | 566700 | 6.27 | 31.0 | 3.8 | 0.631 | — |
| Ex. 15 | Butene | 2.48 | 0.9576 | 113320 | 649900 | 6.83 | 32.8 | 2.2 | — | — |
| Ex. 16 | Butene | 0.72 | 0.9525 | 132210 | 529500 | 5.58 | 40.7 | 8.2 | 1.030 | 0.459 |
| Ex. 17 | Butene | 0.94 | 0.9538 | 128910 | 581900 | 6.11 | 37.5 | 8.2 | — | 0.093 |
| Ex. 18 | Hexene | 0.99 | 0.9216 | 119000 | 483900 | 6.40 | 42.0 | 6.5 | 1.085 | 0.227 |
| Ex. 19 | Butene | 1.00 | 0.9180 | 116055 | 443400 | 5.55 | 37.3 | 5.8 | 1.174 | 0.391 |
| C1 | Butene | 0.94 | 0.9529 | 120400 | 330700 | 3.95 | 24.4 | 3.3 | — | — |
| C2 | Butene | 1.03 | 0.9545 | 118600 | 329400 | 4.26 | 23.6 | 2.9 | — | — |
| C3 | Butene | 0.41 | 0.9532 | 159300 | 631900 | 5.52 | 35.0 | 6.7 | 0.665 | — |
| C4 | Butene | 0.43 | 0.9537 | 154100 | 636400 | 5.96 | 35.8 | 6.4 | — | — |
| C5 | Butene | 1.05 | 0.9544 | 123300 | 465700 | 5.33 | 32.5 | 3.7 | — | — |
| C6 | Butene | 1.04 | 0.9538 | 127000 | 524700 | 5.62 | 33.4 | 3.6 | — | — |
| C7 | Butene | 0.91 | 0.9531 | 125800 | 446500 | 5.20 | 33.4 | 4.0 | — | — |
| C8 | Butene | 0.78 | 0.9535 | 133000 | 545600 | 5.71 | 34.4 | 4.5 | — | — |
| C9 | Butene | 1.03 | 0.9539 | 123500 | 447000 | 5.30 | 32.3 | 3.6 | 0.371 | — |
| C10 | Butene | 1.03 | 0.9590 | 118100 | 417800 | 5.50 | 37.8 | 4.0 | — | — |
| C11 | Butene | 1.04 | 0.9507 | 124400 | 496200 | 5.65 | 31.9 | 3.6 | — | — |
| C12 | Hexene | 1.00 | 0.9220 | 123300 | 387280 | 4.22 | 26.5 | 3.7 | 0.062 | 0.228 |
| C13 | Butene | 1.00 | 0.9180 | 125000 | 371660 | 3.97 | 24.5 | 3.7 | 0.086 | 0.395 |
| C14 | N/A (LDPE) | 1.85 | 0.9202 | 76700 | 304400 | 4.58 | 53.7 | 6.1 | 0.706 | 0.833 |
| C15 | None | 0.41 | 0.9498 | 157140 | 510900 | 4.69 | 23.0 | 7.2 | 0.157 | — |
| C16 | Octene | 0.98 | 0.9019 | 105141 | 189379 | 2.28 | 30.1 | 3.72 | 0.447 | 0.947 |
| C17 | Hexene | 1.00 | 0.9180 | 84951 | 152680 | 2.13 | 15.9 | 2.54 | 0.060 | 0.730 |

As shown in Table 5 above, the molecular weight distribution (MWD), slope of strain hardening (SSH), and melt flow ratio (MFR) for selected examples, namely, Examples 1, 9, 10, 14, 16, 18, and 19 and comparative examples C3, C9, and C12-C15, were measured. As shown, Examples 1, 9, 16, 18, and 19 all had a MWD ranging from about 5.03 to about 6.4, a SSH greater than 0.75, and a MFR greater than or equal to 8.33+(4.17×MWD). In contrast, not one of (CHI). The CHI was determined according to following procedure. The data used and shown in Table 6 for the following CHI measurement procedure was the data acquired for Ex. 19. For clarity and ease of description some data is omitted from Table 6. However, the full range of experimental data for the data shown in Table 6 is shown in the graph depicted in FIG. 1, which shows the Calculation of CHI from the CEF Data.

TABLE 6

| Temp. (° C.) $T_i$ | Response | | Area | | |
|---|---|---|---|---|---|
| | Measured | Zeroed $H_i$ | Trapezoid | Cumulative ($S_i$) $S_i$ | Cum_Norm × 10 nSi | Calculated Comonomer $C_i$ |
| 34.855 | 0 | 0 | 0 | 0 | 0 | 0.112792905 |
| 34.902 | −0.001 | 0 | 0 | 0 | 0 | 0.112701549 |

TABLE 6-continued

| | Temp. (° C.) $T_i$ | Response | | Area | | Calculated |
|---|---|---|---|---|---|---|
| | | Measured | Zeroed $H_i$ | Trapezoid | Cumulative ($S_i$) $S_i$ | Cum_Norm × 10 $nS_i$ | Comonomer $C_i$ |

| | Temp. (° C.) $T_i$ | Measured | Zeroed $H_i$ | Trapezoid | $S_i$ | $nS_i$ | $C_i$ | |
|---|---|---|---|---|---|---|---|---|
| | 34.948 | 0.001 | 0 | 0.001 | 0.001 | 0 | 0.112612785 | |
| | 34.998 | −0.001 | 0 | 0 | 0.001 | 0 | 0.112514719 | |
| | 35.048 | −0.002 | 0 | 0 | 0.001 | 0 | 0.1124192 | n = 1 |
| | 35.1 | 0 | 0 | 0 | 0.001 | 0 | 0.112317822 | |
| | 35.148 | 0 | 0 | 0 | 0.001 | 0 | 0.112224333 | |
| | 35.197 | −0.001 | 0 | 0 | 0.001 | 0 | 0.1121294 | |
| | 35.244 | −0.003 | 0 | 0 | 0.001 | 0 | 0.112038638 | |
| | | | | Data omitted for clarity | | | | |
| | 77.64 | 1.797 | 1.797 | 0.073 | 27.468 | 3.075 | 0.036890771 | |
| | 77.681 | 1.801 | 1.801 | 0.093 | 27.561 | 3.085 | 0.036824825 | |
| | 77.732 | 1.807 | 1.807 | 0.086 | 27.647 | 3.095 | 0.036741541 | |
| $hT_i$ | 77.779 | 1.816 | 1.816 | 0.104 | 27.751 | 3.106 | 0.0366649 | $ahC_i$ |
| | 77.836 | 1.821 | 1.821 | 0.076 | 27.827 | 3.115 | 0.036572069 | |
| | | | | Data omitted for clarity | | | | |
| | 85.257 | 2.481 | 2.481 | 0.152 | 44.306 | 4.959 | 0.024718997 | |
| | 85.318 | 2.481 | 2.481 | 0.124 | 44.431 | 4.973 | 0.024622744 | |
| | 85.368 | 2.48 | 2.48 | 0.095 | 44.525 | 4.984 | 0.024543881 | |
| $T_m$ | 85.406 | 2.478 | 2.478 | 0.121 | 44.646 | 4.997 | 0.0244839 | $C_m$ |
| | 85.455 | 2.478 | 2.478 | 0.127 | 44.773 | 5.011 | 0.024407127 | |
| | 85.506 | 2.48 | 2.48 | 0.119 | 44.892 | 5.025 | 0.024326748 | |
| | 85.554 | 2.479 | 2.479 | 0.123 | 45.015 | 5.039 | 0.024251338 | |
| | 85.604 | 2.476 | 2.476 | 0.119 | 45.134 | 5.052 | 0.024173364 | |
| | | | | Data omitted for clarity | | | | |
| | 93.123 | 2.397 | 2.397 | 0.138 | 62.302 | 6.973 | 0.012529889 | |
| | 93.18 | 2.41 | 2.41 | 0.119 | 62.421 | 6.987 | 0.012442021 | |
| | 93.229 | 2.425 | 2.425 | 0.109 | 62.53 | 6.999 | 0.012366879 | |
| $lT_i$ | 93.274 | 2.441 | 2.441 | 0.089 | 62.619 | 7.009 | 0.0122987 | $alC_i$ |
| | 93.311 | 2.455 | 2.455 | 0.107 | 62.726 | 7.021 | 0.012242985 | |
| | 93.354 | 2.47 | 2.47 | 0.146 | 62.872 | 7.037 | 0.012176941 | |
| | 93.413 | 2.487 | 2.487 | 0.129 | 63.001 | 7.052 | 0.012087362 | |
| | | | | Data omitted for clarity | | | | |
| | 104.879 | 0.005 | 0.005 | 0 | 89.341 | 10 | 0 | |
| | 104.915 | 0.005 | 0.005 | 0 | 89.341 | 10 | 0 | |
| | 104.95 | 0.004 | 0.004 | 0 | 89.341 | 10 | 0 | n = N |
| | 105.002 | 0.003 | 0.003 | | | | | |
| | Calculated parameters | | | | | | | |
| | C 0.5 ($lC_i$) | 0.01224 | | In this example, N = 1441 | | | | |
| | CHI | 0.391 | | | | | | |
| | C 1.5 ($lC_i$) | 0.03673 | | | | | | |
| | M50 | 34.973 | | | | | | |
| | Total Wt | 89.341 | | | | | | |

The Crystallization Elution Fractionation (CEF) data was tabulated from a temperature of 35° C. to 105° C. as Temperature (T) vs. Response Height (H). Response data points less than 0 were set to zero for purposes of the calculation. The data was collected at a frequency of a temperature interval of 0.5° C. or less (e.g., an interval of 0.2° C.). The cumulative curve was calculated according to the following steps: (1) $S_i=(T_{i+1}-T_i)\times(H_i+H_{i+1})/2+\Sigma(S_1 \ldots S_{i-i})$, where H is the response (mass=dWf/dT), (2) i=1 . . . N−1, (3) N=the total number of points that range from the point closest to and greater than T=35.0° C. to the point closest to and less than T=105.0° C. inclusive, and (4) $S_i$ was normalized according to: $nS_i=10\times S_i/S_N$. The median temperature $T_m$ was the point where $nS_i$ is closest to 5.0. The comonomer content at $T_m$ was $C_m$ and was calculated according to the following steps: (1) $C_m=1-\exp(0.5533-(207.0/(273.12+T_m)))$, and (2) $C_i$ was calculated for each measured $T_i$: $C_i=1-\exp(0.5533-(207.0/(273.12+T_i)))$. The mass fraction ($M_{50}$) within the region $0.5\times C_i$ to $1.5\times C_i$ was calculated according to the following steps: (1) $lC_i=0.5\times C_i$; (2) $hC_i=1.5\times C_i$; (3) Limits of the range used was set by determining the $C_i$ values calculated closest to $lC_i$ and $hC_i$: (a) $alC_i=C_i$ closest to and greater than $lC_i$; and (b) $ahC_i=C_i$ closest to and less than $hC_i$; (4) The $T_i$ values equivalent to $alC_i$ and $ahC_i$ were identified: (a) $lT_i \equiv alC_i$, and (b) $hT_i \equiv ahC_i$; (5) The mass fraction in this region was calculated as in step 4 but within the range $lT_i$ and $hT_i$ inclusive (a) $M50=\Sigma(T_{i+1}-T_i)\times(H_i+H_{i+1})/2$ where i represents the data points in the range $lT_i$ to $hT_{i-1}$ inclusive CHI=$M50/S_N$.

Figure 2:
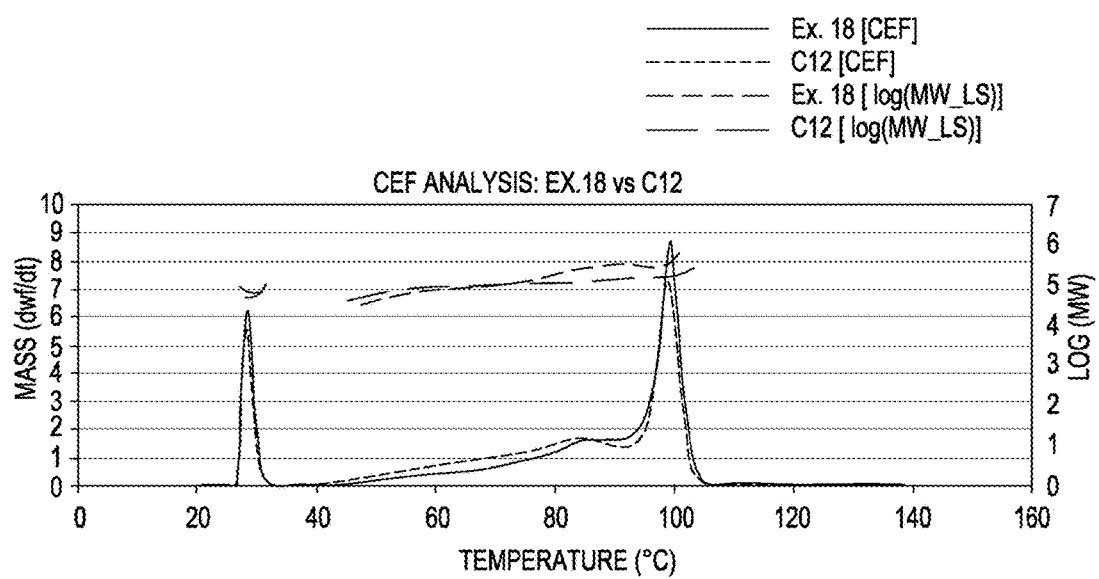
FIGS. 2 and 3 depict graphical representations that compare the CEF data of Example 18 to comparative example C12 and the CEF data of Example 19 to comparative example C13, respectively.
Figure 3:
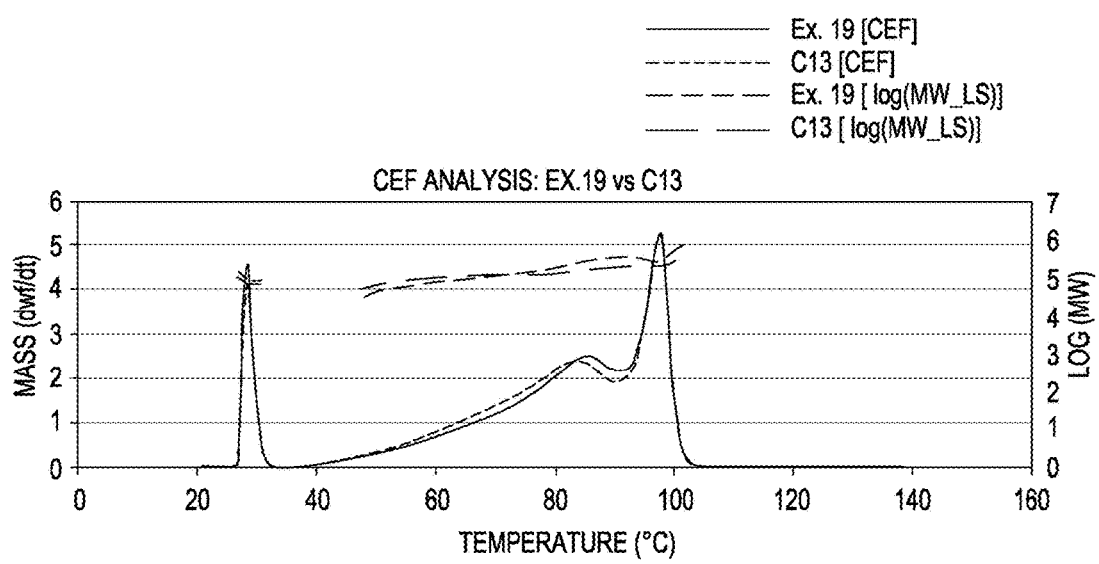

The CEF data comparing Ex. 18 to C12 and Ex. 19 to C13 are shown in the graphs depicted in FIGS. 2 and 3, respectively.

Slope of Strain Hardening

Figure 4:
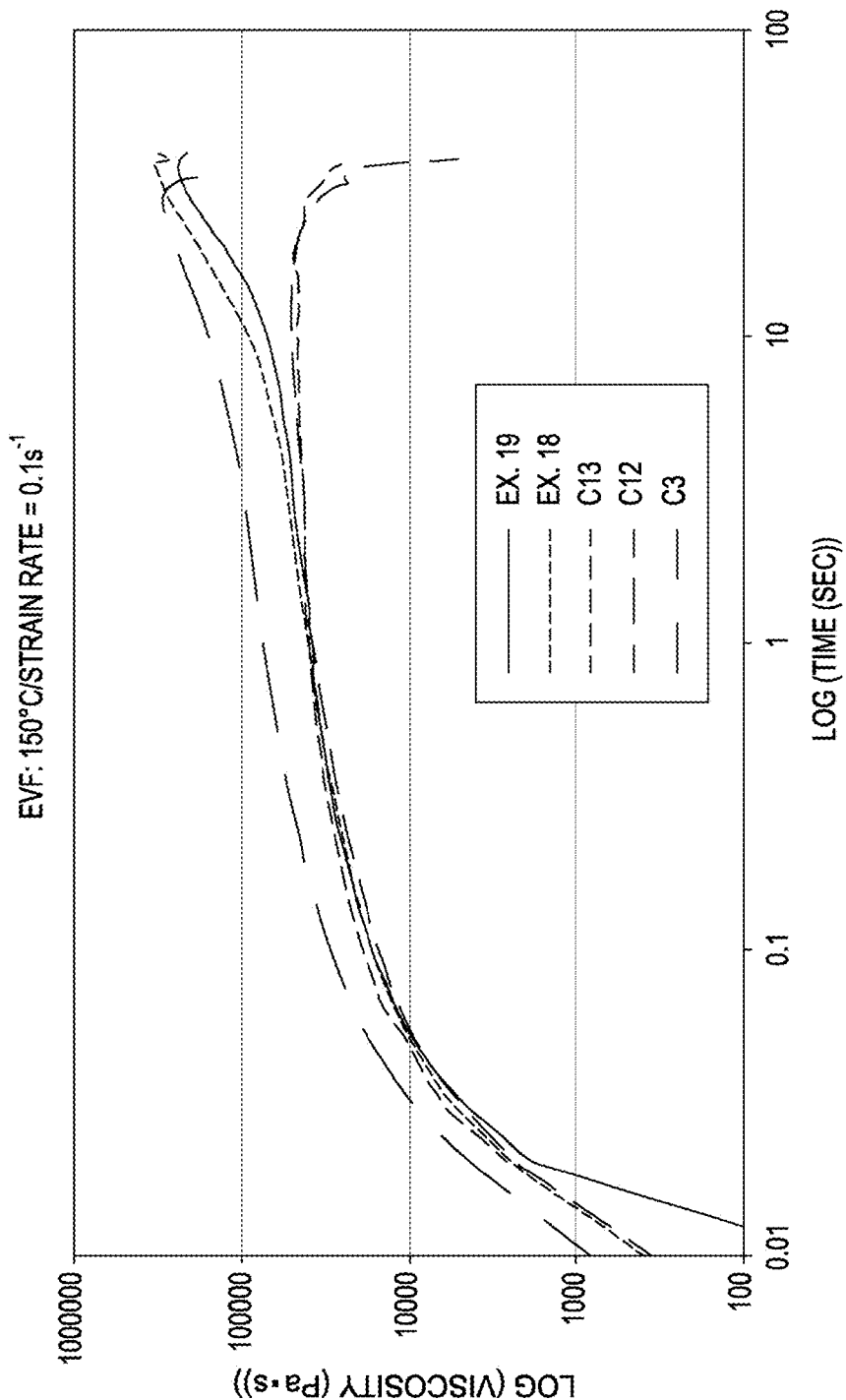
FIG. 4 depicts the graphical representations of the Extensional Viscosity Fixture (EVF) data at a strain hardening rate of $0.1 \text{ s}^{-1}$ at 150° C. for Examples 18 and 19 and comparative examples C12, C13, and C3.

The slope of strain hardening (SSH) as measured by extensional viscosity fixture was determined for Examples 1, 9, 10, 14, 16, 18, and 19 and comparative examples C3, C9, and C12-C15, the values of which are shown in Table 5. The extensional viscosity fixture (EVF) analysis comparing Examples 18 and 19 to comparative examples C3, C12, and C13 is also graphically shown in FIG. 4. As shown in FIG. 4, Examples 18 and 19 surprisingly and unexpectedly had a significant increase in the extensional viscosity at a strain hardening rate of 0.1 s$^{-1}$ and at a temperature of 150° C., measured according to the extensional viscosity fixture test discussed and described above.

Melt Strength

Figure 5:
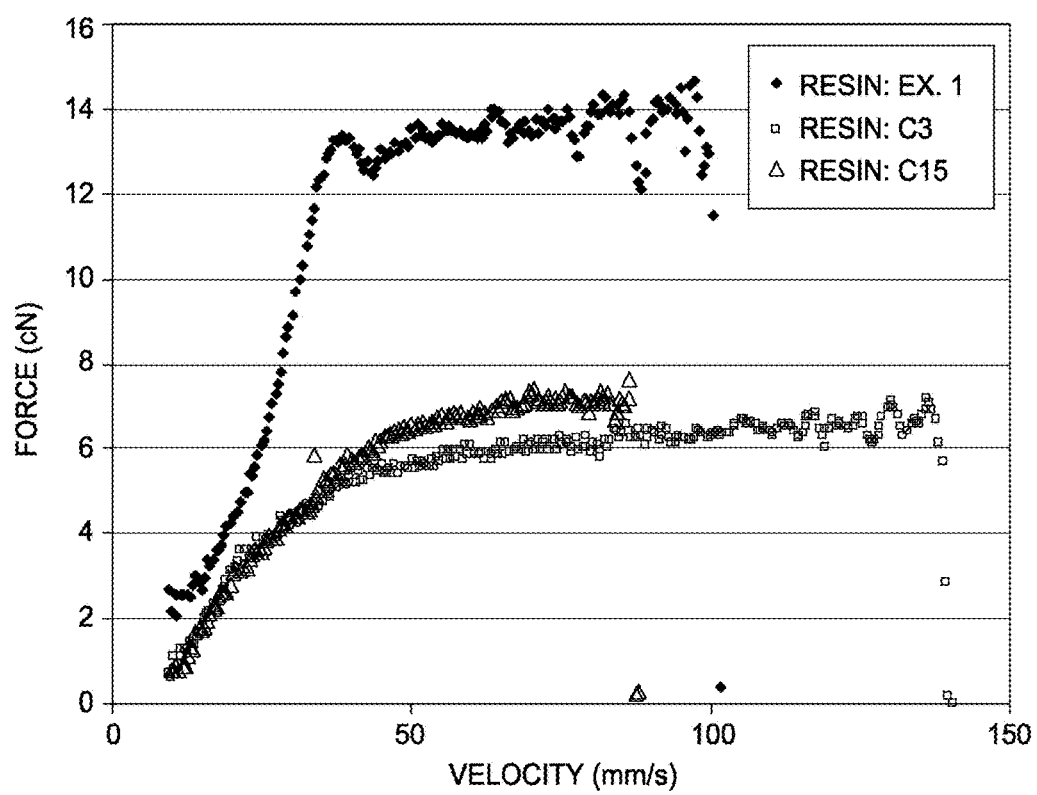
FIG. 5 depicts a graphical representation of the melt strength for Example 1 and comparative examples C3 and C15.

The melt strength for Example 1 was compared to comparative examples C3 and C15 all having a melt index ($I_2$) of about 0.4 g/10 min. FIG. 5 depicts the graphical representation of the melt strength for Ex. 1, C3, and C15. As shown in FIG. 5, the melt strength of the polyethylene of Ex. 1 surprisingly and unexpectedly far exceeds the melt strength of comparative examples C3 and C15.

Blown Film Experiments

Mono-layer films were formed from the polyethylenes of Examples 18 and 19 and comparative examples C12 and C13 via a blown film process. Depending on the particular example, a LDPE resin (LDPE 501i manufactured by The Dow Chemical Company) was blended with the examples in various amounts ranging from none or zero up to about 30 wt %, based on the combined weight of the Ex. 18, 19, C12, or C13 polyethylene and the LDPE 501i resin. The LDPE 501i resin had a melt index ($I_2$) of 1.9 MI and was acquired from Dow Chemical. The blown films had a nominal thickness of 25 μm or 12.5 μm. The commercially available comparative resins (C12 and C13) were chosen because those resins have a very close match with the inventive polyethylenes in terms of melt index and density. More particularly, the polyethylenes of Ex. 18 and comparative example C12 were both ethylene/hexene copolymers of melt index 1.0 and density 0.922 g/cm³; and the polyethylenes of Ex. 19 and comparative example C13 were both ethylene/butene copolymers that had a melt index 1.0 and density 0.918 g/cm³. As such, Ex. 18 was compared to C12 and Ex. 19 was compared to C13.

The blend components, i.e., the LDPE and the inventive polyethylene (Ex. 18 or 19) or the LDPE and the comparative polyethylene (C13 or C14) were weighed and tumble-blended in a rotating drum blender. The films were blown on a Colin blown film apparatus capable of three layer co-extrusion that required operation of all three extruders. As such, even though a monolayer film was formed, all three extruders were used and were fed with the same resin or resin blend.

The Colin blown film apparatus included three extruders, i.e., Extruder A, B, and C. Extruders A and C each had a 25 mm barrel diameter and a 25:1 L/D single flight forwarding screw. Extruder B had a 30 mm barrel diameter and a 25:1 L/D single flight forwarding screw. The combined resin from the three extruders was fed to an annular die which had a die diameter of 60 mm, a die gap of 2 mm, and a maximum take-off speed of about 30 m/min. The blow up ratio (BUR) was about 2.5:1. The BUR is equal to the ratio of the Bubble Diameter to Die Diameter. The films were produced at the 25 μm or 12.5 μm thickness by adjusting the take-off rate. Each extruder A, B, and C was operated at 50% of the maximum take-off rate to allow for variations in motor load and pressure to be accommodated without requiring a change in screw speed. Bubble stability was studied by measuring the minimum air flow rate at which the bubble would be stable for 5 seconds when blowing the 12.5 μm thick film samples. The experiments performed, extruder data, and bubble data are shown in Table 7 below.

TABLE 7

Blown Film Experiment

| LDPE 501i (wt %) | Melt Temp. (° C.) in Each Extruder | | | Motor Current (Amps) in Each Extruder | | | Extruder Pressure (psi) | | | Resin Throughput per Extruder (lb/hr) | | | Film Bubble | |
|---|---|---|---|---|---|---|---|---|---|---|---|---|---|---|
| | A | B | C | A | B | C | A | B | C | A | B | C | Frostline Height (cm) | Layflat (cm) |
| C12 | | | | | | | | | | | | | | |
| 0 | 185 | 185 | 181 | 3.0 | 3.1 | 4.6 | 174 | 172 | 209 | 1.9 | 1.9 | 2.5 | — | — |
| 5 | 186 | 185 | 181 | 2.9 | 3.0 | 4.4 | 171 | 70 | 204 | 1.9 | 1.9 | 2.5 | 4.0 | 23.0 |
| 10 | 185 | 186 | 181 | 2.8 | 2.9 | 4.3 | 170 | 168 | 203 | 1.9 | 1.9 | 2.5 | 4.0 | 23.1 |
| 15 | 185 | 186 | 181 | 2.6 | 2.8 | 4.1 | 163 | 165 | 196 | 1.9 | 1.9 | 2.4 | 4.0 | 23.3 |
| 30 | 184 | 183 | 183 | 2.5 | 2.5 | 3.8 | 175 | 155 | 185 | 1.9 | 1.8 | 2.4 | 3.5 | 23.0 |
| Ex. 18 | | | | | | | | | | | | | | |
| 0 | 205 | 184 | 184 | 2.5 | 2.5 | 3.7 | 137 | 136 | 161 | 2.0 | 1.9 | 2.5 | — | — |
| 5 | — | 184 | 184 | 2.5 | 2.4 | 3.5 | 136 | 136 | 159 | 2.0 | 1.9 | 2.5 | — | — |
| 10 | — | 183 | 183 | 2.4 | 2.3 | 3.5 | 134 | 133 | 157 | 1.9 | 1.9 | 2.4 | — | — |
| 15 | 184 | 184 | 184 | 2.3 | 2.3 | 3.3 | 129 | 131 | 154 | 2.0 | 1.9 | 2.5 | 4.0 | 23.5 |
| 30 | 183 | 184 | 184 | 2.2 | 2.2 | 3.1 | 123 | 123 | 144 | 1.9 | 1.9 | 2.4 | 3.0 | 23.5 |
| C13 | | | | | | | | | | | | | | |
| 0 | 186 | 186 | 186 | 3.6 | 3.7 | 5.2 | 192 | 189 | 226 | 2.0 | 2.1 | 2.6 | — | — |
| 5 | 186 | 185 | 185 | 3.5 | 3.6 | 5.0 | 187 | 186 | 220 | 2.0 | 2.0 | 2.5 | 4.5 | 23.5 |
| 10 | 185 | 186 | 186 | 3.3 | 3.5 | 4.7 | 182 | 180 | 214 | 2.0 | 2.0 | 2.5 | 4.5 | 23.5 |
| 15 | 186 | 185 | 185 | 3.1 | 3.3 | 4.5 | 178 | 177 | 210 | 1.9 | 2.0 | 2.5 | 4.5 | 23.5 |
| 30 | 185 | 184 | 184 | 3.0 | 2.9 | 3.9 | 170 | 157 | 188 | 1.9 | 1.9 | 2.3 | 4.0 | 23.3 |
| Ex. 19 | | | | | | | | | | | | | | |
| 0 | 184 | 186 | 186 | 2.8 | 2.8 | 4.1 | 146 | 146 | 174 | 2.0 | 2.0 | 2.5 | — | — |
| 5 | 183 | 185 | 185 | 2.7 | 2.8 | 4.0 | 144 | 144 | 169 | 2.0 | 2.0 | 2.5 | — | 23.4 |
| 10 | 183 | 184 | 184 | 2.6 | 2.7 | 3.8 | 142 | 143 | 167 | 2.0 | 2.0 | 2.5 | 4.0 | 23.4 |
| 15 | 183 | 183 | 183 | 2.7 | 2.8 | 3.7 | 142 | 141 | 167 | 2.0 | 1.9 | 2.5 | 4.0 | 23.5 |
| 30 | 184 | 184 | 184 | 2.6 | 2.5 | 3.4 | 137 | 137 | 156 | 2.0 | 1.9 | 2.4 | 3.5 | 23.5 |

The terms "processability of a polymer" and "polymer processability" are used interchangeably and refer to the ability to maximize production rate. As such, a highly processable polymer is capable of being converted at a higher rate than a polymer with less processability. Extrusion processability can be limited, for example, by the limit of the drive motor (measured as power consumption in Amps) and the pressure build up within the extruder at various locations including at the entrance to the die. In blown film processes, the maximum production rate can also be limited by the stability of the bubble. It will be understood by those skilled in the art that there are many forms of bubble instability any of which can limit the maximum production rate even if the extruder system is capable of higher throughput with the particular polymer or polymer blend involved. In demonstrating the advantages of the inventive polyethylenes, the minimum air-ring air flow required to maintain a stable bubble for at least five seconds at a take-off rate providing 12.5 μm (0.5 mil) film was measured. A lower minimum air flow is indicative of a more stable bubble. The inventive polyethylenes had improved processability over the comparative polyethylenes, some of which are shown in Table 8.

TABLE 8

Blown film experiment

| Blend Composition - LDPE 501i (wt %) | Extruder data | | Bubble Stability Min air flow for stable bubble at 12.5 μm (% of max flow) |
|---|---|---|---|
| | Motor Load (Amps) | Pressure (psi) | |
| C12 | | | |
| 0 | 10.7 | 209 | 43 |
| 5 | 10.3 | 204 | 42 |
| 10 | 10.0 | 203 | 41 |
| 15 | 9.5 | 196 | 41 |
| 30 | 8.8 | 185 | 39 |
| Ex. 18 | | | |
| 0 | 8.7 | 161 | 41 |
| 5 | 8.4 | 159 | 40 |
| 10 | 8.2 | 157 | 39 |
| 15 | 7.9 | 154 | 41 |
| 30 | 7.5 | 144 | 38 |
| C13 | | | |
| 0 | 12.5 | 226 | 43 |
| 5 | 12.1 | 220 | 44 |
| 10 | 11.5 | 214 | 44 |
| 15 | 10.9 | 210 | 43 |
| 30 | 9.8 | 188 | 41 |
| Ex. 19 | | | |
| 0 | 9.7 | 174 | 42 |
| 5 | 9.5 | 169 | 42 |
| 10 | 9.1 | 167 | 42 |
| 15 | 9.2 | 167 | 42 |
| 30 | 8.5 | 156 | 41 |

For all polymers that included the addition of the LDPE 501i a reduced motor load was expected with respect to the pure polyethylene. Both of Examples 18 and 19 had a lower motor load than the comparative examples C12 and C13, respectively, at all levels of added LDPE 501i when comparing equal blend compositions. Surprisingly and unexpectedly, the pure polyethylenes of Examples 18 and 19, i.e., no LDPE was added, also exhibited less motor load than the comparative examples blended with any level of LDPE 501i up to and including 30 wt % LDPE 501i in spite of the LDPE 501i having a melt index of 1.85 g/10 min.

Both of Examples 18 and 19 exhibited a substantially lower extruder pressure than the comparative examples C12 and C13, respectively, at all levels of added LDPE 501i when comparing equal blend compositions. Surprisingly and unexpectedly, the pure polyethylenes of Examples 18 and 19, i.e., no LDPE was added, also exhibited substantially less extruder pressure than the comparative examples blended with any level of LDPE 501i up to and including 30 wt % LDPE 501i in spite of the LDPE 501i having a melt index of 1.85 g/10 min.

Both of Examples 18 and 19 exhibited a greater or similar bubble stability than the comparative examples C12 and C13 respectively at all levels of added LDPE 501i when comparing equal blend compositions. Surprisingly and unexpectedly, the pure polyethylenes of Examples 18 and 19, i.e., no LDPE was added, exhibited improved bubble stability compared to the comparative resins blended with up to 15% LDPE 501i.

Taken individually and together these results demonstrate that the inventive polyethylenes of Examples 18 and 19 have substantially superior processability compared to conventional Ziegler-Natta resins and allow the converter to maintain or increase throughput without the added cost of obtaining and handling LDPE commonly used to improve the processability of conventional Ziegler-Natta LLDPE. Although demonstrated here for blown film production, it is expected that these benefits will equally apply to any conversion process involving the extrusion of polymer, including, but limited to, cast processes, e.g., cast film and extrusion coating, injection molding, blow-molding, and sheet extrusion. In particular, the ability to eliminate or reduce the use of LDPE and yet maintain or increase processability is highly advantageous as it is well known in the art that LDPE added to Ziegler-Natta LLDPE generally reduces the physical properties compared to the pure Ziegler-Natta resin. To compensate for this, converters will often increase the gauge of the film thus reducing the benefits of the increased production rate obtained through the addition of LDPE.

Tensile properties of Examples 18 and 19 and comparative examples C12 and C13 and blends with LDPE 501i are shown in Table 9 below. The measured tensile properties were Elmendorf Tear in machine direction (MD) and cross direction (CD) with respect to film take-off direction and puncture. These properties were measured for both the 25 μm and the 12.5 μm films.

TABLE 9

Physical Properties of Films Tested

| Blend Composition - LDPE 501i (wt %) | Film gauge: 25 μm | | | Film gauge: 12.5 μm | | |
|---|---|---|---|---|---|---|
| | Puncture Force (ft · lb/in3) | Elmendorf Tear | | Puncture Force (ft · lb/in3) | Elmendorf Tear | |
| | | CD (g) | MD (g) | | CD (g) | MD (g) |
| C12 | | | | | | |
| 0 | 218 | 541 | 406 | 209 | 277 | 582 |
| 5 | 171 | 533 | 344 | 177 | 301 | 674 |
| 10 | 172 | 567 | 270 | 179 | 300 | 672 |
| 15 | 148 | 578 | 210 | 137 | 311 | 726 |
| 30 | 128 | 585 | 161 | 111 | 309 | 684 |
| Ex. 18 | | | | | | |
| 0 | 160 | 467 | 106 | 145 | 364 | 823 |
| 5 | 150 | 518 | 108 | 138 | 346 | 769 |
| 10 | 120 | 556 | 66 | 127 | 401 | 913 |
| 15 | 122 | 516 | 106 | 113 | 424 | 1025 |
| 30 | 104 | 561 | 100 | 97 | 379 | 975 |
| C13 | | | | | | |
| 0 | 216 | 305 | 155 | 215 | 253 | 559 |
| 5 | 188 | 325 | 147 | 168 | 229 | 491 |
| 10 | 175 | 369 | 103 | 154 | 258 | 568 |

TABLE 9-continued

Physical Properties of Films Tested

| Blend Composition - LDPE 501i (wt %) | Film gauge: 25 μm | | | Film gauge: 12.5 μm | | |
|---|---|---|---|---|---|---|
| | Puncture Force (ft·lb/in3) | Elmendorf Tear | | Puncture Force (ft·lb/in3) | Elmendorf Tear | |
| | | CD (g) | MD (g) | | CD (g) | MD (g) |
| 15 | 155 | 380 | 90 | 131 | 266 | 585 |
| 30 | 108 | 372 | 51 | 106 | 212 | 468 |
| Ex. 19 | | | | | | |
| 0 | 134 | 338 | 97 | 121 | 244 | 537 |
| 5 | 121 | 366 | 76 | 112 | 249 | 567 |
| 10 | 101 | 390 | 58 | 105 | 275 | 607 |
| 15 | 92 | 362 | 54 | 101 | 277 | 647 |
| 30 | 86 | 428 | | 79 | 292 | 675 |

Puncture is reported as puncture force (foot pounds per cubic inch or ft·lb/in$^3$). In all examples, the puncture of the pure polyethylene films of Examples 18 and 19, i.e., no LDPE 501i was added, was less than the pure comparative resins, but the puncture of the pure inventive resins exceeds the blends of comparative resins containing about 20% or more LDPE 501i.

Some observations between the puncture of the ethylene/hexene copolymer films of Ex. 18 and C12 were as follows. The 25 μm pure polyethylene film of Ex. 18 had superior puncture to the 25 μm thick comparative film of C12 that contained 15 wt % LDPE 501i. The Ex. 18 film with 5 wt % LDPE had the same puncture as the C12 film that contained 15% LDPE. The 12.5 μm pure polyethylene film of Ex. 18 had superior puncture to the comparative resin C12 containing 15 wt % LDPE 501i. The Ex. 18 film with 5 wt % LDPE had the same puncture as C12 containing 15 wt % LDPE. To achieve equivalent motor load to the pure polyethylene film of Ex. 18, 30 wt % LDPE 501i loading in the comparative example C12 was required. An even greater amount of LDPE 501i would be required to achieve equivalent extruder pressure. Accordingly, through the use of the inventive polyethylene of Ex. 18 it was possible to achieve improved puncture performance while at the same time enjoying the benefits of increased processability.

Some observations between the puncture of the ethylene/butene copolymer films of Ex. 19 and C13 were as follows. The 25 μm pure polyethylene film of Ex. 19 had superior puncture to the comparative resin C13 that contained 30 wt % LDPE 501i and via interpolation, similar puncture to a 22 wt % blend. The film of Ex. 19 that contained 5 wt % LDPE had superior puncture compared to the film of C13 that contained 30 wt % LDPE. The 12.5 μm pure polyethylene film of Ex. 19 had superior puncture to the comparative C13 film that contained 30 wt % LDPE 501i. The film of Ex. 19 that contained 10 wt % LDPE had the same puncture as the film of C13 that contained 30 wt % LDPE. To achieve equivalent motor load to the pure polyethylene film of Ex. 19, 30 wt % LDPE 501i loading in comparative example C13 was required. An even greater amount of LDPE 501i would be required to achieve equivalent extruder pressure. Accordingly, through the use of the inventive polyethylene of Ex. 19 it was possible to achieve improved puncture performance while at the same time enjoying the benefits of increased processability.

The effect the addition of the LDPE 501i to the tear properties was very dependent on the gauge of film produced under the conditions of the experiments. At 25 μm, the cross direction tear or CD tear (also referred to as transverse direction or TD tear) increased with increasing LDPE loading whereas the machine direction or MD tear decreased. In contrast, at 12.5 μm, the CD and MD tear both increased with the addition of LDPE up to about 15 wt %. At higher levels the CD and MD tear values tended to decrease slightly. The inventive polyethylenes of Examples 18 and 19 were found to be particularly suitable for thin gage film applications requiring good tear performance.

Some observations between the tear properties of the ethylene/hexene copolymer films (Ex. 18 vs. C12) were as follows. The CD tear for the 25 μm films of Ex. 18 and C12 were substantially the same at all LDPE loadings, including zero loading. With both Ex. 18 and C12, the CD tear tended to increase with increased LDPE loading. The MD tear for the 25 μm film of Ex. 18 was substantially reduced compared to the pure comparative polyethylene of C12. The MD tear of Ex. 18 was essentially unaffected by the level of LDPE loading maintaining a value of about 100 g whereas the tear of C12 dropped from about 400 g with zero LDPE to about 160 g with 30 wt % LDPE. The CD tear of the 12.5 μm film of Ex. 18 and all blends of Ex. 18 containing LDPE 501i exceeded the CD tear of the comparative films of C13. The CD tear tended to increase with increasing LDPE composition. The CD tear of Ex. 18 reached a maximum at 15 wt % LDPE loading with a value of about 425 g and the maximum tear reached with the C13 films was also at a loading of 15 wt % LDPE with a value of about 310 g. The MD tear for all of the 12.5 μm films of Ex. 18 exceeded the MD tear of the comparative films of C13. For both Ex. 18 and C12, the MD tear tended to increase with increasing LDPE loading. The MD tear of Ex. 18 reached a maximum at 15 wt % LDPE loading with a value of about 1,025 g and the MD tear of C13 also reached a maximum at 15 wt % LDPE with a value of about 725 g. The inventive polyethylene/hexene copolymer of Ex. 19 was particularly advantageous when formed into thin gauge film (12.5 μm) by the blown film process. Indeed, not only were the CD and MD tear properties of the pure polyethylene of Ex. 18 substantially improved compared to C12 at any LDPE 501i loading, the inventive polyethylene copolymer of Ex. 18, in the absence of LDPE provided superior processability. The pure polyethylene copolymer of Ex. 18, i.e., no LDPE was added, was less advantageous at the thicker gauge (25 μm); however, in situations where a converter uses a high loading of LDPE (e.g., 15 wt % or more) then the pure polyethylene copolymer of Ex. 18 would provide similar CD and MD tear properties with superior processability.

Some observations between the tear properties of the ethylene/butene copolymer films (Ex. 19 vs. C13) were as follows. The CD tear of the 25 μm films of the inventive polyethylene copolymer Ex. 19 and the comparative copolymer C13 were substantially the same at all LDPE loadings, including zero loading. With both Ex. 19 and C13, the CD tear tended to increase with increased LDPE loading. The MD tear for the 25 μm films for the pure polyethylene copolymer of Ex. 19 was about 100 g, which was lower than the pure comparative resin C13 (about 155 g). The MD tear for both Ex. 19 and C13 films reduced in an approximately linear fashion when the LDPE was added. The MD tear of the pure Ex. 19 film was about the same as that of the C13 film that contained 10 wt % LDPE and was superior to the C13 films that contained higher levels of LDPE 501i.

The CD tear for the 12.5 μm films for all the polyethylene copolymers of Ex. 19 was substantially the same as that of the comparative C13 films up to about 15 wt % LDPE 501i. At 30 wt % LDPE loading the CD tear of the Ex. 19 film was about 290 g, while the CD tear of the corresponding C13 film was about 210 g. For both Ex. 19 and C13, the CD tear tended to increase with increasing LDPE loading. The CD tear of Ex. 19 reached a maximum at 30 wt % LDPE loading with a value of about 290 g, while the CD tear of the C13 film reached a maximum at 15 wt % LDPE loading with a value of about 265 g.

The MD tear of the Ex. 19 films and the C13 films were about equal at about 540 g and 560 g respectively. The MD tear of the Ex. 19 films increased in approximately a linear fashion, reaching a value of about 675 g at 30 wt % LDPE 501i loading. The MD tear of the C13 films was substantially unaffected by the addition of LDPE 501i up to about 15 wt % LDPE. At 30 wt % LDPE loading, however, the C13 films showed a substantial decrease in MD tear.

The inventive Ex. 19 polyethylene copolymer films were particularly advantageous when formed into thin gauge films (12.5 μm, for example) by the blown film process. The CD and MD tear properties of the pure polyethylene films of Ex. 19 were generally similar to the comparative polyethylene films of C13 at any LDPE 501i loading, while the inventive polyethylene copolymer of Ex. 19, in the absence of LDPE loading, provided superior processibility. The inventive polyethylene copolymer of Ex. 19 was also advantageous for the production of thicker gauge films (25 μm, for example), especially when compared to the comparative polyethylene copolymer of C13 at greater than about 10 wt % LDPE loading. In situations where a converter currently uses a high loading of LDPE (e.g., 10 wt % or more) then the pure polyethylene copolymer of Ex. 19 would provide similar CD and MD tear properties with superior processibility.

Optics (clarity and haze) were also measured for the 25 μm films of Examples 18 and 19 and comparative examples C12 and C13. The clarity and haze values are shown in Table 10 below.

TABLE 10

Optics of 1 mil Films Tested

| Blend composition - LDPE501i (wt %) | Optics testing: B1470 ASTM lab Film gauge: 25 μm | |
| --- | --- | --- |
| | Clarity (%) | Haze (%) |
| C12 | | |
| 0 | 87.5 | 12.4 |
| 5 | 89.4 | 10.2 |
| 10 | 90.6 | 8.7 |
| 15 | 92.3 | 7.1 |
| 30 | 94.0 | 5.5 |
| Ex. 18 | | |
| 0 | 95.9 | 6.0 |
| 5 | 95.2 | 6.7 |
| 10 | 95.5 | 6.0 |
| 15 | 95.4 | 5.7 |
| 30 | 94.7 | 5.4 |
| C13 | | |
| 0 | 99.5 | 4.9 |
| 5 | 99.5 | 3.7 |
| 10 | 99.3 | 3.0 |
| 15 | 99.4 | 2.6 |
| 30 | 98.1 | 2.5 |
| Ex. 19 | | |
| 0 | 98.2 | 5.2 |
| 5 | 97.4 | 5.0 |
| 10 | 97.7 | 4.6 |
| 15 | 97.4 | 4.5 |
| 30 | 96.2 | 5.0 |

The clarity values shown in Table 10 are reported as the percentage of incident light. The clarity and haze values were measured according to ASTM D1746 and D1003, respectively. The clarity of all inventive polyethylene copolymer Ex. 18 films exceeded the clarity of all corresponding comparative C12 films. The clarity of the C12 films increased from 87.5% to 94.0% as LDPE loading was increased from zero to 30%. The clarity of the Ex. 18 films remained substantially unchanged as the LDPE loading was increased, with a value close to 95.5% in all cases.

The clarity for both inventive and comparative ethylene/butene copolymer films of Ex. 19 and C13 were substantially unchanged at all loadings of LDPE 501i. The clarity of the pure polyethylene copolymer of Ex. 19 was about 98.2% and that of the pure copolymer of C13 was about 99.5%.

The haze of all inventive polyethylene copolymer films of Ex. 18 was less than the haze of the corresponding comparative films of C12. The haze of the comparative C13 films decreased from 12.4% to 5.5% as the LDPE loading increased from zero to 30 wt %. The haze of the inventive polyethylene copolymer of Ex. 18 was substantially unchanged by addition of LDPE, with a value of about 6% for pure Ex. 18 and about 5.4% for the 30 wt % LDPE loading.

The haze for the Ex. 19 films remained substantially unchanged at all loadings of LDPE 501i with a value close to about 5%. The haze for the C13 films decreased with increased loading of LDPE 501i from 4.9% to 2.5%.

The optics of the inventive ethylene/hexene copolymer of Ex. 18 was superior to the optics of the comparative ethylene/hexene copolymer of C13 and in particular was superior to the optics of the comparative copolymer containing up to 30 wt % LDPE 501i. This, in addition to the superior processibility of the inventive resins indicates the inventive copolymer of Ex. 18 would be advantageous in situations where good optics are required.

Additional Polymerization Experiments

A third and a fourth batch of the same catalyst used to produce the polymers of Examples 1-9 and Examples 16-19 were prepared and were used to produce the polymers of Examples 20-25 and 26-32, respectively. These third and fourth batches of catalyst were prepared according to the same general procedure as outlined above for the first batch for Examples 1-9 and 16-19, with minor changes that would be obvious to the skilled person in view of Table 11 below. As such, these catalysts were also prepared without the addition of any electron donors as discussed and described above and these catalysts can also be referred to as a "donor free catalysts." These catalysts were analyzed for Ti, Mg, and content, the results of which are shown in Table 11 below.

TABLE 11

| Catalyst | Cl⁻ (mmol/g) | Mg (mmol/g) | Ti (mmol/g) | Mg/Ti |
|---|---|---|---|---|
| Used to Produce the Polymers of Examples 20-25 | 4.38 | 1.50 | 0.949 | 1.58 |
| Used to Produce the Polymers of Examples 26-32 | 4.67 | 1.49 | 0.804 | 1.85 |

A gas phase fluidized bed polymerization reactor of the UNIPOL™ PE Process design having a nominal diameter of about 35.6 cm (about 14 inches) was used for the continuous production of both linear low density polyethylene (LLDPE), medium density polyethylene (MDPE), and high density polyethylene (HDPE). The polymerization process was as generally described above for Examples 1-19. The polymer of Comparative Example C18 was produced using UCAT™ A4520 Catalyst, available from Univation Technologies, LLC.

The polymerization conditions and results for the production of the polymers of Examples 20-32 is shown in Tables 12A-B below.

TABLE 12A

| Examples | C18 | Ex. 20 | Ex. 21 | Ex. 22 | Ex. 23 | Ex. 24 |
|---|---|---|---|---|---|---|
| Polymer Type | LLDPE | LLDPE | LLDPE | LLDPE | LLDPE | LLDPE |
| Catalyst Ti Content (wt %) | * | 4.54 | 4.54 | 4.54 | 4.54 | 4.54 |
| Catalyst Al Content (wt %) | * | 0.11 | 0.11 | 0.11 | 0.11 | 0.11 |
| Catalyst Mg Content (wt %) | * | 3.64 | 3.64 | 3.64 | 3.64 | 3.64 |
| Prod Rate (lbs/hr) | 43.3 | 36.0 | 35.3 | 37.3 | 32.5 | 37.5 |
| Residence Time (hrs) | 2.6 | 2.6 | 2.6 | 2.4 | 2.8 | 2.8 |
| $C_2$ Partial Pressure (psia) | 100.00 | 80.32 | 80.48 | 80.26 | 79.85 | 80.05 |
| $H_2/C_2$ (m/m) | 0.130 | 0.102 | 0.114 | 0.134 | 0.0905 | 0.128 |
| $C_4/C_2$ Conc. Ratio (m/m) | 0.374 | 0.328 | 0.336 | 0.342 | 0.322 | 0.000 |
| $C_6/C_2$ Conc. Ratio (m/m) | 0.000 | 0.000 | 0.000 | 0.000 | 0.000 | 0.142 |
| $H_2/C_2$ Mass Feed Ratio (mlb/lb) | 1.16 | 0.902 | 1.05 | 1.07 | 0.824 | 0.975 |
| $C_4/C_2$ Mass Feed Ratio (lb/lb) | 0.130 | 0.126 | 0.124 | 0.126 | 0.129 | — |
| $C_6/C_2$ Mass Feed Ratio (lb/lb) | — | — | — | — | — | 0.140 |
| Isopentane (mole %) | 0.48 | 3.17 | 2.35 | 2.19 | 3.00 | 2.62 |
| RX Pressure (psig) | 355.5 | 355.5 | 355.6 | 355.2 | 355.3 | 355.7 |
| RX Temperature (° C.) | 88.0 | 88.0 | 88.0 | 88.0 | 88.0 | 88.0 |
| Gas Velocity (ft/sec) | 1.82 | 1.71 | 1.72 | 1.71 | 1.69 | 1.68 |
| Bed Weight (lbs) | 114 | 94 | 90 | 90 | 91 | 105 |
| Fluid Bulk Density (lb/ft³) | 14.96 | 11.04 | 11.02 | 11.49 | 10.26 | 13.70 |
| Co-catalyst ID | TEAl | TEAl | TEAl | TEAl | TEAl | TEAl |
| Co-catalyst Conc. (wt %) | 2.5 | 1.0 | 1.0 | 1.0 | 1.0 | 1.0 |
| Co-catalyst Feed (cc/hr) | 288.7 | 154.2 | 73.6 | 36.3 | 330.5 | 80.9 |
| Reactor Co-catalyst Conc. - Prod. Rate Basis (ppmw) | 228 | 59 | 28 | 13 | 139 | 29 |
| Cont. Additive | No | Yes | Yes | Yes | Yes | Yes |
| Continuity Additive Conc. (wt %) | 0 | 20 | 20 | 20 | 20 | 20 |
| Continuity Additive Feed (cc/hr) | 0.00 | 1.00 | 1.00 | 1.00 | 1.00 | 1.00 |
| Reactor Cont. Additive Conc. - Prod Rate Basis (ppmw) | 0.00 | 10.41 | 10.61 | 10.04 | 11.53 | 9.99 |
| Cat. Prod. - Ti ICPES Basis (g PE/g Catalyst) | 5,152¹ | 9,660 | 14,459 | 16,157 | 6,542 | 11,407 |
| $I_2$ Melt Index (dg/min) | 1.07 | 0.95 | 0.78 | 0.71 | 0.90 | 0.70 |
| MFR, $I_{21}/I_2$ | 24.8 | 39.1 | 42.7 | 48.9 | 37.3 | 71.3 |
| Polymer Density (g/cc) | 0.918 | 0.918 | 0.918 | 0.918 | 0.918 | 0.918 |
| ≥$C_4$ Branch ²/1000 C. | — | 0.049 | 0.053 | 0.056 | 0.046 | — |

* UCAT™ A4520 Catalyst available from Univation Technologies, LLC.
¹ Estimated by material balance rather than Ti ICPES Basis.
² Branches four carbons or longer.

TABLE 12B

| Examples | Ex. 25 | Ex. 26 | Ex. 27 | Ex. 28 | Ex. 29 | Ex. 30 | Ex. 31 | Ex. 32 |
|---|---|---|---|---|---|---|---|---|
| Polymer Type | LLDPE | LLDPE | MDPE | HDPE | HDPE | HDPE | HDPE | HDPE |
| Catalyst Ti Content (wt %) | 3.85 | 3.85 | 3.85 | 3.85 | 3.85 | 3.85 | 3.85 | 3.85 |
| Catalyst Al Content (wt %) | 0.10 | 0.10 | 0.10 | 0.10 | 0.10 | 0.10 | 0.10 | 0.10 |
| Catalyst Mg Content (wt %) | 3.62 | 3.62 | 3.62 | 3.62 | 3.62 | 3.62 | 3.62 | 3.62 |
| Prod Rate (lbs/hr) | 36.0 | 36.6 | 39.0 | 36.3 | 33.0 | 33.0 | 38.8 | 34.0 |
| Residence Time (hrs) | 3.0 | 2.6 | 3.3 | 3.0 | 2.5 | 2.7 | 2.8 | 2.9 |
| $C_2$ Partial Pressure (psia) | 79.95 | 79.91 | 80.75 | 120.12 | 120.12 | 120.32 | 118.90 | 120.61 |
| $H_2/C_2$ (m/m) | 0.147 | 0.130 | 0.152 | 0.553 | 0.098 | 0.213 | 0.172 | 0.098 |
| $C_4/C_2$ Conc. Ratio (m/m) | 0.000 | 0.000 | 0.000 | 0.000 | 0.025 | 0.016 | 0.013 | 0.000 |
| $C_6/C_2$ Conc. Ratio (m/m) | 0.147 | 0.146 | 0.114 | 0.046 | 0.000 | 0.000 | 0.000 | 0.0085 |
| $H_2/C_2$ Mass Feed Ratio (mlb/lb) | 1.10 | 0.980 | 1.08 | 8.00 | 1.22 | 2.55 | 2.13 | 1.55 |
| $C_4/C_2$ Mass Feed Ratio (lb/lb) | — | — | — | — | 0.0142 | 0.0107 | 0.0091 | — |
| $C_6/C_2$ Mass Feed Ratio (lb/lb) | 0.141 | 0.143 | 0.0991 | 0.046 | — | — | — | 0.0105 |
| Isopentane (mole %) | 2.49 | 2.73 | 2.82 | 1.91 | 2.30 | 2.16 | 1.85 | 1.61 |
| RX Pressure (psig) | 355.9 | 355.7 | 355.4 | 355.9 | 356.1 | 356.2 | 354.4 | 344.8 |
| RX Temperature (° C.) | 88.0 | 88.0 | 80.8 | 102.0 | 102.0 | 102.0 | 102.1 | 101.9 |

TABLE 12B-continued

| Examples | Ex. 25 | Ex. 26 | Ex. 27 | Ex. 28 | Ex. 29 | Ex. 30 | Ex. 31 | Ex. 32 |
|---|---|---|---|---|---|---|---|---|
| Gas Velocity (ft/sec) | 1.64 | 1.59 | 1.61 | 1.69 | 1.70 | 1.74 | 1.75 | 1.87 |
| Bed Weight (lbs) | 103 | 104 | 106 | 91 | 97 | 109 | 99 | 102 |
| Fluid Bulk Density (lb/ft$^3$) | 13.84 | 13.51 | 14.32 | 11.09 | 14.21 | 16.19 | 12.68 | 11.96 |
| Co-catalyst ID | TEAl | TEAl | TEAl | TEAl | TEAl | TEAl | TEAl | TEAl |
| Co-catalyst Conc. (wt %) | 1.0 | 1.0 | 1.0 | 1.0 | 1.0 | 1.0 | 1.0 | 1.0 |
| Co-catalyst Feed, (cc/hr) | 40.0 | 80.0 | 80.9 | 35.0 | 50.5 | 53.2 | 160.9 | 90.7 |
| Reactor Co-catalyst Conc. - Prod. Rate Basis (ppmw) | 15 | 30 | 28 | 13 | 21 | 22 | 57 | 36 |
| Cont. Additive | Yes | Yes | Yes | Yes | Yes | Yes | Yes | Yes |
| Continuity Additive Conc. (wt %) | 20 | 20 | 20 | 20 | 20 | 20 | 20 | 20 |
| Continuity Additive Feed (cc/hr) | 1.0 | 1.0 | 1.0 | 1.0 | 1.0 | 1.0 | 1.0 | 2.50 |
| Reactor Cont. Additive Conc. - Prod Rate Basis (ppmw) | 10.41 | 10.25 | 9.61 | 10.32 | 11.36 | 11.36 | 9.65 | 27.56 |
| Cat. Prod. - Ti ICPES Basis (g PE/g Catalyst) | 10,462 | 10,026 | 11,257 | 17,265 | 8,443 | 6,863 | 5,224 | 10,577 |
| I$_2$ Melt Index (dg/min) | 0.77 | 0.90 | 0.83 | 24.93 | 0.27 | 0.99 | 1.05 | 0.23 |
| MFR, I$_{21}$/I$_2$ | 71.5 | 68.3 | 56.5 | 31.6 | 41.8 | 45.1 | 38.3 | 40.3 |
| Polymer Density (g/cc) | 0.917 | 0.919 | 0.926 | 0.953 | 0.946 | 0.954 | 0.954 | 0.951 |
| ≥C$_4$ Branch $^1$/1000 C. | — | — | — | — | — | 0.058 | 0.043 | — |

$^1$ Branches four carbons or longer.

Selected properties for the polymers of Examples 20-32 are shown in Tables 13A-B below.

TABLE 13A

| Ex. | Type | Comonomer | MI (I$_2$) | Density (g/cm$_3$) | MS (cN) | ≥C$_4$ Branch$^1$/1000 C. |
|---|---|---|---|---|---|---|
| C18 | LLDPE | Butene | 1.07 | 0.918 | 2.9 | —* |
| Ex. 20 | LLDPE | Butene | 0.95 | 0.918 | 5.7 | 0.049 |
| Ex. 21 | LLDPE | Butene | 0.78 | 0.918 | 7.2 | 0.053 |
| Ex. 22 | LLDPE | Butene | 0.71 | 0.918 | 8.1 | 0.056 |
| Ex. 23 | LLDPE | Butene | 0.90 | 0.918 | 5.3 | 0.046 |
| Ex. 24 | LLDPE | Hexene | 0.70 | 0.918 | 7.8 | —* |
| Ex. 25 | LLDPE | Hexene | 0.77 | 0.917 | 8.5 | —* |
| Ex. 26 | LLDPE | Hexene | 0.90 | 0.919 | 6.4 | —* |
| Ex. 27 | MDPE | Hexene | 0.83 | 0.926 | 10.2 | —* |
| Ex. 28 | HDPE | Hexene | 24.93 | 0.953 | 2.2 | —* |
| Ex. 29 | HDPE | Butene | 0.27 | 0.946 | 16.0 | —* |
| Ex. 30 | HDPE | Butene | 0.99 | 0.954 | 10.6 | 0.058 |
| Ex. 31 | HDPE | Butene | 1.05 | 0.954 | 7.3 | 0.043 |
| Ex. 32 | HDPE | Hexene | 0.23 | 0.951 | 14.1 | —* |

$^1$Branches four carbons or longer.
*Value was not measured.

TABLE 13B

| Ex. | Type | Comonomer | M$_w$ (Da, RI Detector$^1$) | M$_w$ (Da, LS Detector$^2$) | MWD (RI Detector) | MWD (LS Detector) | Mw (LS)/ Mw (RI) |
|---|---|---|---|---|---|---|---|
| C18 | LLDPE | Butene | 115,325 | 127,826 | 3.98 | 4.43 | 1.11 |
| Ex. 20 | LLDPE | Butene | 122,929 | 180,402 | 5.58 | 7.46 | 1.47 |
| Ex. 21 | LLDPE | Butene | 123,322 | 185,595 | 5.39 | 7.43 | 1.50 |
| Ex. 22 | LLDPE | Butene | 125,605 | 196,961 | 5.62 | 7.92 | 1.57 |
| Ex. 23 | LLDPE | Butene | 125,548 | 181,811 | 6.29 | 7.94 | 1.45 |
| Ex. 24 | LLDPE | Hexene | 128,928 | 202,948 | 6.21 | 8.74 | 1.57 |
| Ex. 25 | LLDPE | Hexene | 126,727 | 213,203 | 7.12 | 10.41 | 1.68 |
| Ex. 26 | LLDPE | Hexene | 123,659 | 192,221 | 6.69 | 9.18 | 1.55 |
| Ex. 27 | MDPE | Hexene | 114,092 | 188,634 | 6.02 | 8.80 | 1.65 |
| Ex. 28 | HDPE | Hexene | 53,997 | 146,807 | 5.99 | 13.90 | 2.72 |
| Ex. 29 | HDPE | Butene | 140,390 | 223,984 | 5.30 | 7.12 | 1.60 |
| Ex. 30 | HDPE | Butene | 101,800 | 177,166 | 5.90 | 9.09 | 1.74 |
| Ex. 31 | HDPE | Butene | 109,748 | 181,933 | 5.27 | 7.77 | 1.66 |
| Ex. 32 | HDPE | Hexene | 157,361 | 237,391 | 5.70 | 7.85 | 1.51 |

$^1$Refractive index detector.
$^2$Light scattering detector.

Without wishing to be bound by theory, it is believed that the ratio of the M$_w$ calculated using the LS light scattering detector to the M$_w$ calculated using the RI refractive index detector, M$_w$ (LS)/M$_w$ (RI), is related to the long chain branching present in the polymer. The polyethylene can have a M$_w$ (LS)/M$_w$ (RI) value of from about 1.4 to about 3.0, from about 1.4 to 2.8, or from about 1.45 to 2.72.

FIG. 6 depicts a graphical representation of the polymer Long Chain Branching (LCB) for the LLDPE polymers of Examples 20 through 23 versus the concentration of co-catalyst (TEAl) used in forming the polymer. As seen in FIG. 6, as the concentration of the TEAl co-catalyst decreases (given in ppm$_w$—parts per million weight) the LCB for the LLDPE polymer increases. Referring now to FIG. 7, there is seen a graphical representation of the polymer MFR (Melt Flow Ratio) I$_{21}$/I$_2$ versus the concentration of co-catalyst for the LLDPE polymers of Example 20 through Example 23. Again, as the concentration of the TEAl co-catalyst decreases the MFR for the LLDPE polymer increases. The same trend is repeated with the association between the electron donor-free Ziegler-Natta catalyst productivity versus the concentration of co-catalyst in the LLDPE polymers for Example 20 through Example 23, as seen in FIG. 8. Using these surprising results it is then possible to provide a relationship between the LCB versus the polymer MFR (I$_{21}$/I$_2$) for the LLDPE of Examples 20 through Example 23 as seen in FIG. 9.

The same surprising trend seen for the LLDPE of Examples 20 through 23 is also seen for the HDPE of Examples 30 and 31. As seen in FIGS. 10 through 13, as the concentration of the TEAl co-catalyst decreases the MFR for the HDPE polymer increases. The same trend is repeated with the association between the electron donor-free Ziegler-Natta catalyst productivity versus the concentration of co-catalyst in the HDPE polymers for Example 30 and Example 31, as seen in FIG. 12. Using these surprising results it is then possible to provide a relationship between the LCB versus the polymer MFR ($I_{21}/I_2$) for the HDPE for Example 30 and 31, as seen in FIG. 13.

Figure 14:
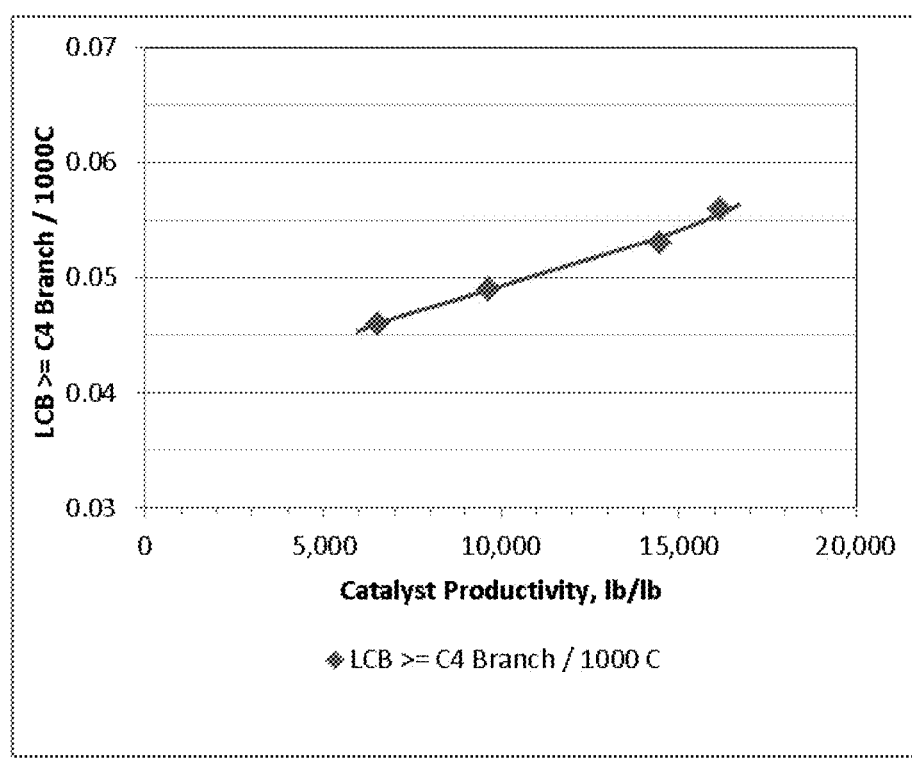
FIG. 14 depicts a graphical representation of the polymer Long Chain Branching (LCB) vs. the electron donor-free Ziegler-Natta catalyst productivity for Example 20 through Example 23.
Figure 15:
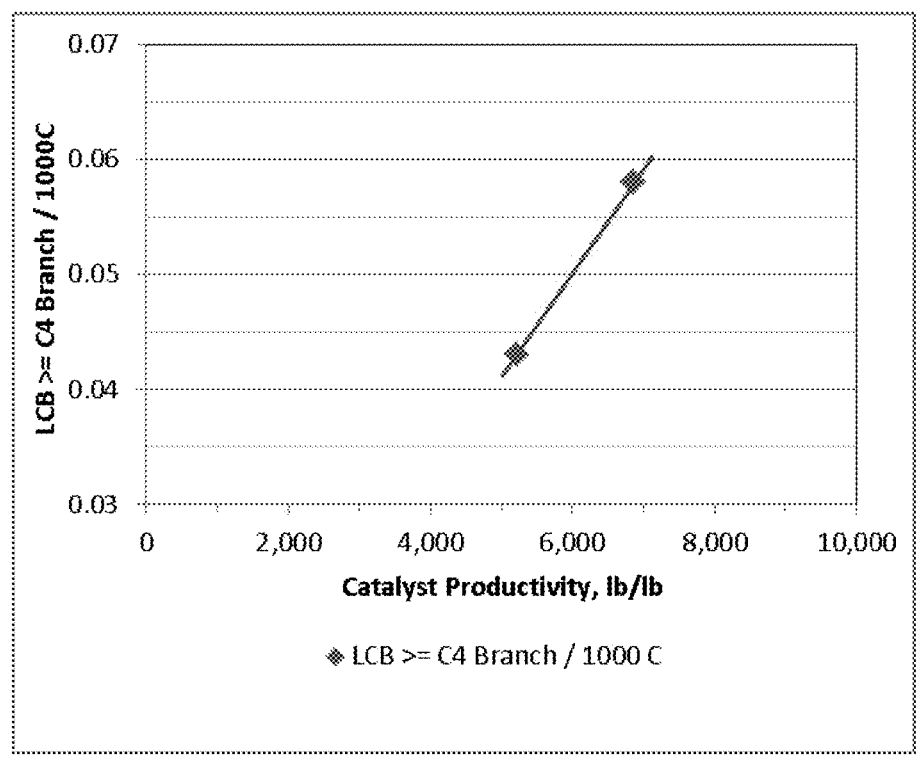
FIG. 15 depicts a graphical representation of the polymer Long Chain Branching (LCB) vs. the electron donor-free Ziegler-Natta catalyst productivity for Example 30 and Example 31.

FIG. 14 and FIG. 15 provide a further association between the polymer LCB and the electron donor-free Ziegler-Natta catalyst productivity for Example 20 through Example 23 (FIG. 14) and for Example 30 and Example 31 (FIG. 15). Using such associations, the catalyst productivity, particularly the material balance catalyst productivity, can be used to rapidly provide LCB information during the production of LLDPE and/or HDPE as provided herein.

So, it becomes apparent that the LCB relates to the MFR and to the productivity, where each of these properties can be related back to the alkyl aluminum co-catalyst concentration used in producing the polymer in a predetermined relationship. Using this predetermined relationship, the amount of LCB of the polyethylene can be determined from the polymerization reactor using the measured MFR ($I_{21}/I_2$). Measurable parameters such as the MFR and/or productivity can then be used in essentially real time during polymer production as an indication of the LCB for the polymer. This relationship can then lead to better process control of the polymerization process, where an amount of the LCB can be controlled and/or adjusted by controlling the MFR through control of and/or changes to the amount of co-catalyst (TEAl) in the polymerization reactor.

All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow. Such embodiments include the following:

Embodiment 1 includes a polymerization method, comprising: performing a polymerization reaction in a polymerization reactor to produce polyethylene, wherein the polymerization reaction is catalyzed by an electron donor-free Ziegler-Natta catalyst and an alkyl aluminum co-catalyst with ethylene and optionally one or more comonomers to produce the polyethylene; removing a portion of the polyethylene from the polymerization reactor; measuring a melt flow ratio ($I_{21}/I_2$) of the polyethylene removed from the polymerization reactor; and determining an amount of long chain branching (LCB) of the polyethylene from the polymerization reactor using the measured melt flow ratio and a predetermined relationship between the melt flow ratio ($I_{21}/I_2$) and the LCB. In Embodiment 2, the polymerization method of embodiment 1 further includes adjusting a weight concentration of the alkyl aluminum co-catalyst present in the polymerization reactor to control the LCB of the polyethylene produced in the polymerization reactor. In Embodiment 3, the polymerization process of embodiment 2 provides that decreasing the weight concentration of the alkyl aluminum co-catalyst present in the polymerization reactor increases the LCB of the polyethylene produced in the polymerization reactor. In Embodiment 4, the polymerization method of embodiment 2 provides that reducing a weight concentration of the electron donor-free Ziegler-Natta catalyst when the weight concentration of the alkyl aluminum co-catalyst present in the polymerization reactor is reduced. In embodiment 5, the polymerization method of embodiment 2 further includes increasing a weight concentration of the electron donor-free Ziegler-Natta catalyst to maintain a constant production rate of the polyethylene when the weight concentration of the alkyl aluminum co-catalyst present in the polymerization reactor is increased. In embodiment 6, the polymerization method of embodiment 2 provides that adjusting the weight concentration of the alkyl aluminum co-catalyst present in the polymerization reactor is done by changing a mole ratio of the alkyl aluminum co-catalyst to active metal in the electron donor-free Ziegler-Natta catalyst. In embodiment 7, the polymerization method of embodiment 2 provides that adjusting the weight concentration of the alkyl aluminum co-catalyst present in the polymerization reactor changes the melt flow ratio ($I_{21}/I_2$) of the polyethylene from the polymerization reactor. In embodiment 8, the polymerization method of embodiment 2 provides that adjusting the weight concentration of the alkyl aluminum co-catalyst present in the polymerization reactor changes a production rate of the polyethylene from the polymerization reactor. In embodiment 9, the polymerization method of embodiment 2 provides that adjusting the weight concentration of the alkyl aluminum co-catalyst present in the polymerization reactor changes cycle gas molar ratios of $H_2/C_2$ and $C_4/C_2$. In embodiment 10, the polymerization method of embodiment 2 provides that adjusting the weight concentration of the alkyl aluminum co-catalyst present in the polymerization reactor changes cycle gas molar ratios of $H_2/C_2$ and $C_6/C_2$. In embodiment 11, the polymerization process control method of embodiment 1 further includes controlling the melt flow ratio ($I_{21}/I_2$) of the polyethylene from the polymerization reactor by adjusting one or more of a $H_2/C_2$ gas mole ratio, $H_2/C_2$ weight feed ratio, a $C_4$ to $C_2$ co-monomer gas mole ratio or the $C_4$ to $C_2$ weight feed ratio. In embodiment 12, the polymerization method of embodiment 1 further includes controlling the melt flow ratio ($I_{21}/I_2$) of the polyethylene from the polymerization reactor by adjusting one or more of a $H_2/C_2$ gas mole ratio, $H_2/C_2$ weight feed ratio, a $C_6$ to $C_2$ co-monomer gas mole ratio or the $C_6$ to $C_2$ weight feed ratio. In embodiment 13, the polymerization method of embodiment 1 further includes varying a weight concentration of the alkyl aluminum co-catalyst in the polymerization reactor while performing the polymerization reaction, thereby implementing a predetermined change in at least the LCB. In embodiment 14, the polymerization method of embodiment 13 includes generating melt flow ratio ($I_{21}/I_2$) data and LCB data from polyethylene produced while varying the weight concentration of the alkyl aluminum co-catalyst in the polymerization reactor; and developing the predetermined relationship between the melt flow ratio ($I_{21}/I_2$) and the LCB from the melt flow ratio ($I_{21}/I_2$) data and LCB data. In embodiment 15, the polymerization method of embodiment 1 provides that the weight concentration of the alkyl aluminum co-catalyst in the polymerization reactor is adjusted so as to bring the LCB in the polyethylene into compliance with a predetermined product specification set. In embodiment 16, the polymerization method of embodiment 1 further includes controlling the melt flow ratio ($I_{21}/I_2$) of the polyethylene from the polymerization reactor by adjusting the weight concentration of the alkyl aluminum co-catalyst in the polymerization reactor. In embodiment 17, the polymerization method of embodiment 1 further includes adjusting a feed rate of the electron donor-free Ziegler-Natta catalyst to maintain a constant polyethylene production rate and therefore introducing catalyst productivity changes from the polymerization reactor, where deviations in catalyst productivity function as a leading indicator to impending changes in the polymer MFR and/or LCB. In embodiment 18, the polymerization method of embodiment 1 further includes decreasing the weight concentration of the alkyl aluminum co-catalyst in the polymerization reactor thereby increasing productivity of the electron donor-free Ziegler-Natta catalyst relative to the productivity before the change in weight concentration. In embodiment 19, the polymerization method of embodiment 1 has the polyethylene with a LCB of greater than about 0.01 per 1,000 carbon atoms and less than about 0.07 per 1,000 carbon atoms. In embodiment 20, the polymerization method of embodiment 1 has the polyethylene LCB between about 0.05 and 0.06 per 1,000 carbon atoms. In embodiment 21, the polymerization method of embodiment 1 has the LCB composed of 4 or more carbon atoms. In embodiment 22, the polymerization method of embodiment 1 has the polyethylene with a ratio of weight-average molecular weight calculated using a light scattering (LS) detector to weight-average molecular weight calculated using a refractive index (RI) detector, $M_w$ (LS)/$M_w$ (RI), of from about 1.4 to about 3.0. In embodiment 23, the polymerization method of embodiment 1 has the polyethylene with a melt flow ratio ($I_{21}/I_2$) ranging from about 35 to about 55. In embodiment 24, the polymerization method of embodiment 1 has the polyethylene with a density of from 0.91 g/cm$^3$ to about 0.965 g/cm$^3$. In embodiment 25, the polymerization method of embodiment 1 provides that the electron donor-free Ziegler-Natta catalyst is formed by a process that comprises: combining one or more supports with one or more magnesium-containing compounds under reaction conditions to form a first reacted product; combining one or more chloro substituted silanes with the first reacted product under reaction conditions to form a second reacted product; and combining one or more titanium halides with the second reacted product under reaction conditions to form the electron donor-free Ziegler-Natta catalyst, wherein the one or more supports comprises silica, alumina, or a combination thereof, wherein the one or more magnesium-containing compounds has the formula: $R^1$—Mg—$R^2$, wherein $R^1$ and $R^2$ are independently selected from the group consisting of hydrocarbyl groups and halogen atoms. In embodiment 26, the polymerization method of embodiment 1 includes selecting the polymerization reactor from the group consisting of a solution reactor, a slurry loop reactor, a supercritical loop reactor, a stirred-bed gas-phase reactor, or a fluidized-bed, gas-phase reactor. In embodiment 27, the polymerization method of embodiment 1 has the alkyl aluminum co-catalyst selected from triethylaluminum (TEAl), triisobutylaluminum, tri-n-butylaluminum, tri-n-hexylaluminum, tri-n-octylaluminum, trimethylaluminum, or any combination thereof. In embodiment 28, the polymerization process control method of embodiment 27 has the alkyl aluminum co-catalyst being the TEAl co-catalyst.

Embodiment 29 is a polymerization process control method that includes: performing a polymerization reaction in a polymerization reactor to produce polyethylene, wherein the polymerization reaction is catalyzed by an electron donor-free Ziegler-Natta catalyst and an alkyl aluminum co-catalyst with ethylene and optionally one or more comonomers to produce the polyethylene; removing a portion of the polyethylene from the polymerization reactor; measuring a melt flow ratio ($I_{21}/I_2$) of the polyethylene removed from the polymerization reactor to determine the amount of long chain branching (LCB) using a predetermined relationship between the melt flow ratio ($I_{21}/I_2$) and the LCB; and controlling an amount of long chain branching (LCB) of the polyethylene from the polymerization reactor by adjusting a weight concentration of the alkyl aluminum co-catalyst present in the polymerization reactor. In embodiment 30, the polymerization process control method of embodiment 29 provides that controlling the amount of LCB includes decreasing the weight concentration of the alkyl aluminum co-catalyst present in the polymerization reactor to increase the LCB of the polyethylene produced in the polymerization reactor. In embodiment 31, the polymerization process control method of embodiment 29 includes reducing a weight concentration of the electron donor-free Ziegler-Natta catalyst when the weight concentration of the alkyl aluminum co-catalyst present in the polymerization reactor is reduced. In embodiment 32, the polymerization process control method of embodiment 29 includes increasing a weight concentration of the electron donor-free Ziegler-Natta catalyst to maintain a constant production rate of the polyethylene when the weight concentration of the alkyl aluminum co-catalyst present in the polymerization reactor is increased. In embodiment 33, the polymerization process control method of embodiment 29 provides that adjusting the weight concentration of the alkyl aluminum co-catalyst present in the polymerization reactor is done by changing a mole ratio of the alkyl aluminum co-catalyst to active metal in the electron donor-free Ziegler-Natta catalyst. In embodiment 34, the polymerization process control method of embodiment 29 provides that adjusting the weight concentration of the alkyl aluminum co-catalyst present in the polymerization reactor changes the melt flow ratio ($I_{21}/I_2$) of the polyethylene from the polymerization reactor. In embodiment 35, the polymerization process control method of embodiment 29 provides that adjusting the weight concentration of the alkyl aluminum co-catalyst present in the polymerization reactor changes a production rate of the polyethylene from the polymerization reactor. In embodiment 36, the polymerization process control method of embodiment 29 provides that adjusting the weight concentration of the alkyl aluminum co-catalyst present in the polymerization reactor changes cycle gas molar ratios of $H_2/C_2$ and $C_4/C_2$. In embodiment 37, the polymerization process control method of embodiment 29 provides that adjusting the weight concentration of the alkyl aluminum co-catalyst present in the polymerization reactor changes cycle gas molar ratios of $H_2/C_2$ and $C_6/C_2$. In embodiment 38, the polymerization process control method of embodiment 29 further includes controlling the melt flow ratio ($I_{21}/I_2$) of the polyethylene from the polymerization reactor by adjusting one or more of a $H_2/C_2$ gas mole ratio, $H_2/C_2$ weight feed ratio, a $C_4$ to $C_2$ co-monomer gas mole ratio or the $C_4$ to $C_2$ weight feed ratio. In embodiment 39, the polymerization process control method of embodiment 29 further includes controlling the melt flow ratio ($I_{21}/I_2$) of the polyethylene from the polymerization reactor by adjusting one or more of a $H_2/C_2$ gas mole ratio, $H_2/C_2$ weight feed ratio, a $C_6$ to $C_2$ co-monomer gas mole ratio or the $C_6$ to $C_2$ weight feed ratio. In embodiment 40, the polymerization process control method of embodiment 29 further includes varying a weight concentration of the alkyl aluminum co-catalyst in the polymerization reactor while performing the polymerization reaction, thereby changing the melt flow ratio ($I_{21}/I_2$) of the polyethylene from the polymerization reactor to make a predetermined change in at least the LCB or to bring the LCB in the polyethylene into compliance with a predetermined product specification set. In embodiment 41, the polymerization process control method of embodiment 40 further includes generating melt flow ratio ($I_{21}/I_2$) data and LCB data from polyethylene produced while varying the weight concentration of the alkyl aluminum co-catalyst in the polymerization reactor; and developing the predetermined relationship between the melt flow ratio ($I_{21}/I_2$) and the LCB from the melt flow ratio ($I_{21}/I_2$) data and LCB data. In embodiment 42, the polymerization process control method of embodiment 29 provides that the weight concentration of the alkyl aluminum co-catalyst in the polymerization reactor is adjusted so as to bring the LCB in the polyethylene into compliance with a predetermined product specification set and/or to control the melt flow ratio ($I_{21}/I_2$) of the polyethylene from the polymerization reactor. In embodiment 43, the polymerization process control method of embodiment 29 further includes adjusting a feed rate of the electron donor-free Ziegler-Natta catalyst to maintain a constant polyethylene production rate from the polymerization reactor, where deviations in catalyst productivity function as a leading indicator to impending changes in the polymer MFR and/or LCB. In embodiment 44, the polymerization process control method of embodiment 29 further includes decreasing the weight concentration of the alkyl aluminum in the polymerization reactor thereby increasing productivity of the electron donor-free Ziegler-Natta catalyst relative to the productivity before the change in weight concentration. In embodiment 45, the polymerization process control method of embodiment 29 provides that the polyethylene has LCB greater than about 0.01 per 1,000 carbon atoms and less than about 0.07 per 1,000 carbon atoms. In embodiment 46, the polymerization process control method of embodiment 29 provides that the polyethylene has LCB between about 0.05 and 0.06 per 1,000 carbon atoms. In embodiment 47, the polymerization process control method of embodiment 29 provides that the LCB is composed of 4 or more carbon atoms. In embodiment 48, the polymerization process control method of embodiment 29 provides that the polyethylene has a ratio of weight-average molecular weight calculated using a light scattering (LS) detector to weight-average molecular weight calculated using a refractive index (RI) detector, $M_w$ (LS)/$M_w$ (RI), of from about 1.4 to about 3.0. In embodiment 49, the polymerization process control method of embodiment 29 provides that the polyethylene has a melt flow ratio ($I_{21}/I_2$) ranging from about 35 to about 55 or a density of from 0.91 g/cm$^3$ to about 0.965 g/cm$^3$. In embodiment 50, the polymerization process control method of embodiment 29 provides that the electron donor-free Ziegler-Natta catalyst is formed by a process that includes combining one or more supports with one or more magnesium-containing compounds under reaction conditions to form a first reacted product; combining one or more chloro substituted silanes with the first reacted product under reaction conditions to form a second reacted product; and combining one or more titanium halides with the second reacted product under reaction conditions to form the electron donor-free Ziegler-Natta catalyst, wherein the one or more supports comprises silica, alumina, or a combination thereof wherein the one or more magnesium-containing compounds has the formula: $R^1$—Mg—$R^2$, wherein $R^1$ and $R^2$ are independently selected from the group consisting of hydrocarbyl groups and halogen atoms. In embodiment 51, the polymerization process control method of embodiment 29 provides that the polymerization reactor is selected from the group consisting of a solution reactor, a slurry loop reactor, a supercritical loop reactor, a stirred-bed gas-phase reactor, or a fluidized-bed, gas-phase reactor. In embodiment 52, the polymerization process control method of embodiment 29 provides that the alkyl aluminum co-catalyst is selected from triethylaluminum (TEAl), triisobutylaluminum, tri-n-butylaluminum, tri-n-hexylaluminum, tri-n octylaluminum, trimethylaluminum, or any combination thereof. In embodiment 53, the polymerization process control method of embodiment 29 provides the alkyl aluminum co-catalyst is the TEAl co-catalyst.

Embodiment 54 is a polymerization process control method that includes performing a polymerization reaction in a polymerization reactor to produce polyethylene, where the polymerization reaction is catalyzed by an electron donor-free Ziegler-Natta catalyst and an alkyl aluminum co-catalyst with ethylene to produce the polyethylene; measuring an electron donor-free Ziegler-Natta catalyst productivity of the polyethylene from the polymerization reactor; and determining an amount of long chain branching (LCB) of the polyethylene from the polymerization reactor using the measured electron donor-free Ziegler-Natta catalyst productivity and a predetermined relationship between the electron donor-free Ziegler-Natta catalyst productivity and the LCB. In embodiment 55, the polymerization process control method of embodiment 54 further includes adjusting a weight concentration of the alkyl aluminum co-catalyst present in the polymerization reactor to control the LCB of the polyethylene produced in the polymerization reactor. In embodiment 56, the polymerization process control method of embodiment 55 provides that decreasing the weight concentration of the alkyl aluminum co-catalyst present in the polymerization reactor increases the LCB of the polyethylene produced in the polymerization reactor. In embodiment 57, the polymerization process control method of embodiment 55 includes reducing a weight concentration of the electron donor-free Ziegler-Natta catalyst when the weight concentration of the alkyl aluminum co-catalyst present in the polymerization reactor is reduced. In embodiment 58, the polymerization process control method of embodiment 55 includes increasing a weight concentration of the electron donor-free Ziegler-Natta catalyst to maintain a constant production rate of the polyethylene when the weight concentration of the alkyl aluminum co-catalyst present in the polymerization reactor is increased, where adjusting the weight concentration of the alkyl aluminum co-catalyst present in the polymerization reactor is done by changing a mole ratio of the alkyl aluminum co-catalyst to active metal in the electron donor-free Ziegler-Natta catalyst or where adjusting the weight concentration of the alkyl aluminum co-catalyst present in the polymerization reactor changes the melt flow ratio ($I_{21}/I_2$) of the polyethylene from the polymerization reactor. In embodiment 59, the polymerization process control method of embodiment 55 provides that adjusting the weight concentration of the alkyl aluminum co-catalyst present in the polymerization reactor changes a production rate of the polyethylene from the polymerization reactor. In embodiment 60, the polymerization process control method of embodiment 55 provides that adjusting the weight concentration of the alkyl aluminum co-catalyst present in the polymerization reactor changes cycle gas molar ratios of $H_2/C_2$ and $C_4/C_2$. In embodiment 61, the polymerization process control method of embodiment 55 provides that adjusting the weight concentration of the alkyl aluminum co-catalyst present in the polymerization reactor changes cycle gas molar ratios of $H_2/C_2$ and $C_6/C_2$. In embodiment 62, the polymerization process control method of embodiment 54 further includes controlling the melt flow ratio ($I_{21}/I_2$) of the polyethylene from the polymerization reactor by adjusting one or more of a $H_2/C_2$ gas mole ratio, $H_2/C_2$ weight feed ratio, a $C_4$ to $C_2$ co-monomer gas mole ratio or the $C_4$ to $C_2$ weight feed ratio. In embodiment 63, the polymerization process control method of embodiment 54 further includes controlling the melt flow ratio ($I_{21}/I_2$) of the polyethylene from the polymerization reactor by adjusting one or more of a $H_2/C_2$ gas mole ratio, $H_2/C_2$ weight feed ratio, a $C_6$ to $C_2$ co-monomer gas mole ratio or the $C_6$ to $C_2$ weight feed ratio. In embodiment 64, the polymerization process control method of embodiment 54 further includes varying a weight concentration of the alkyl aluminum co-catalyst in the polymerization reactor while performing the polymerization reaction, thereby implementing a predetermined change in at least the LCB so as to bring the LCB in the polyethylene into compliance with a predetermined product specification set. In embodiment 65, the polymerization process control method of embodiment 64 includes: generating electron donor-free Ziegler-Natta catalyst productivity data and LCB data from polyethylene produced while varying the weight concentration of the alkyl aluminum co-catalyst in the polymerization reactor; and developing the predetermined relationship between the electron donor-free Ziegler-Natta catalyst productivity and the LCB from the electron donor-free Ziegler-Natta catalyst productivity data and LCB data. In embodiment 66, the polymerization process control method of embodiment 54 further includes controlling the electron donor-free Ziegler-Natta catalyst productivity of the polyethylene from the polymerization reactor by adjusting the weight concentration of the alkyl aluminum co-catalyst in the polymerization reactor. In embodiment 67, the polymerization process control method of embodiment 54 further includes adjusting a feed rate of the electron donor-free Ziegler-Natta catalyst to maintain a constant polyethylene production rate from the polymerization reactor, where deviations in catalyst productivity function as a leading indicator to impending changes in the polymer MFR and/or LCB or where decreasing the weight concentration of the alkyl aluminum in the polymerization reactor increases the productivity of the electron donor-free Ziegler-Natta catalyst relative to the productivity before the change in weight concentration. In embodiment 68, the polymerization process control method of embodiment 54 provides that the polyethylene has LCB greater than about 0.01 per 1,000 carbon atoms and less than about 0.07 per 1,000 carbon atoms. In embodiment 69, the polymerization process control method of embodiment 54 provides that the polyethylene has LCB between about 0.05 and 0.06 per 1,000 carbon atoms. In embodiment 70, the polymerization process control method of embodiment 54 provides that the LCB is composed of 4 or more carbon atoms. In embodiment 71, the polymerization process control method of embodiment 54 provides that the polyethylene has a ratio of weight-average molecular weight calculated using a light scattering (LS) detector to weight-average molecular weight calculated using a refractive index (RI) detector, $M_w$ (LS)/$M_w$ (RI), of from about 1.4 to about 3.0. In embodiment 72, the polymerization process control method of embodiment 54 provides that the polyethylene has a melt flow ratio ($I_{21}/I_2$) ranging from about 35 to about 55 or a density of from 0.91 g/cm$^3$ to about 0.965 g/cm$^3$. In embodiment 73, the polymerization process control method of embodiment 54 provides that the electron donor-free Ziegler-Natta catalyst is formed by a process that includes: combining one or more supports with one or more magnesium-containing compounds under reaction conditions to form a first reacted product; combining one or more chloro substituted silanes with the first reacted product under reaction conditions to form a second reacted product; and combining one or more titanium halides with the second reacted product under reaction conditions to form the electron donor-free Ziegler-Natta catalyst, wherein the one or more supports comprises silica, alumina, or a combination thereof wherein the one or more magnesium-containing compounds has the formula: $R^1$—Mg—$R^2$, wherein $R^1$ and $R^2$ are independently selected from the group consisting of hydrocarbyl groups and halogen atoms. In embodiment 74, the polymerization process control method of embodiment 54 provides that the polymerization reactor is selected from the group consisting of a solution reactor, a slurry loop reactor, a supercritical loop reactor, a stirred-bed gas-phase reactor, or a fluidized-bed, gas-phase reactor. In embodiment 75, the polymerization process control method of embodiment 54 provides that the alkyl aluminum co-catalyst is selected from triethylaluminum (TEAl), triisobutylaluminum, tri-n-butylaluminum, tri-n-hexylaluminum, tri-n-octylaluminum, trimethylaluminum or any combination thereof.

What is claimed is:

1. A polymerization process control method, comprising:
    performing a polymerization reaction in a polymerization reactor to produce polyethylene, wherein the polymerization reaction is catalyzed by an electron donor-free Ziegler-Natta catalyst and an alkyl aluminum co-catalyst with ethylene and optionally one or more comonomers to produce the polyethylene;
    removing a portion of the polyethylene from the polymerization reactor;
    measuring a melt flow ratio ($I_{21}/I_2$) of the polyethylene removed from the polymerization reactor to determine the amount of long chain branching (LCB) using a predetermined relationship between the melt flow ratio ($I_{21}/I_2$) and the LCB; and
    controlling an amount of long chain branching (LCB) of the polyethylene from the polymerization reactor by adjusting a weight concentration of the alkyl aluminum co-catalyst present in the polymerization reactor.

2. The polymerization process control method of claim 1, wherein adjusting the weight concentration of the alkyl aluminum co-catalyst present in the polymerization reactor is done by changing a mole ratio of the alkyl aluminum co-catalyst to active metal in the electron donor-free Ziegler-Natta catalyst.

3. The polymerization process control method of claim 1, further including varying a weight concentration of the alkyl aluminum co-catalyst in the polymerization reactor while performing the polymerization reaction, thereby changing the melt flow ratio ($I_{21}/I_2$) of the polyethylene from the polymerization reactor to make a predetermined change in at least the LCB or to bring the LCB in the polyethylene into compliance with a predetermined product specification set.

4. The polymerization process control method of claim 3, including:
    generating melt flow ratio ($I_{21}/I_2$) data and LCB data from polyethylene produced while varying the weight concentration of the alkyl aluminum co-catalyst in the polymerization reactor; and developing the predetermined relationship between the melt flow ratio ($I_{21}/I_2$) and the LCB from the melt flow ratio ($I_{21}/I_2$) data and LCB data.

5. The polymerization process control method of claim 1, wherein controlling the amount of LCB includes decreasing the weight concentration of the alkyl aluminum co-catalyst present in the polymerization reactor to increase the LCB of the polyethylene produced in the polymerization reactor.

6. The polymerization process control method of claim 1, wherein the polyethylene has LCB greater than about 0.01 per 1,000 carbon atoms and less than about 0.07 per 1,000 carbon atoms; and wherein the polyethylene has a melt flow ratio ($I_{21}/I_2$) ranging from about 35 to about 55 or a density of from 0.91 g/cm$^3$ to about 0.965 g/cm$^3$.

7. The polymerization process control method of claim 1, wherein the electron donor-free Ziegler-Natta catalyst is formed by a process that comprises:

combining one or more supports with one or more magnesium-containing compounds under reaction conditions to form a first reacted product;

combining one or more chloro substituted silanes with the first reacted product under reaction conditions to form a second reacted product; and combining one or more titanium halides with the second reacted product under reaction conditions to form the electron donor-free Ziegler-Natta catalyst, wherein the one or more supports comprises silica, alumina, or a combination thereof wherein the one or more magnesium-containing compounds has the formula: $R^1$—Mg—$R^2$, wherein $R^1$ and $R^2$ are independently selected from the group consisting of hydrocarbyl groups and halogen atoms.

8. The polymerization process control method of claim 1, wherein the alkyl aluminum co-catalyst is triethylaluminum (TEAl), triisobutylaluminum, tri-n-butylaluminum, tri-n-hexylaluminum, tri-n-octylaluminum, trimethylaluminum or any combination thereof.

9. The polymerization process control method of claim 1, wherein the polymerization reactor is selected from the group consisting of a solution reactor, a slurry loop reactor, a supercritical loop reactor, a stirred-bed gas-phase reactor, or a fluidized-bed, gas-phase reactor.

10. A polymerization method, comprising:

performing a polymerization reaction in a polymerization reactor to produce polyethylene, wherein the polymerization reaction is catalyzed by an electron donor-free Ziegler-Natta catalyst and an alkyl aluminum co-catalyst with ethylene and optionally one or more comonomers to produce the polyethylene;

removing a portion of the polyethylene from the polymerization reactor;

measuring a melt flow ratio ($I_{21}/I_2$) of the polyethylene removed from the polymerization reactor; and determining an amount of long chain branching (LCB) of the polyethylene from the polymerization reactor using the measured melt flow ratio and a predetermined relationship between the melt flow ratio ($I_{21}/I_2$) and the LCB.

* * * * *